(12) United States Patent
Yabe et al.

(10) Patent No.: US 12,518,458 B2
(45) Date of Patent: Jan. 6, 2026

(54) INFORMATION PROCESSING SYSTEM, INFORMATION PROCESSING METHOD, AND COMPUTER PROGRAM

(71) Applicant: GREE, INC., Tokyo (JP)

(72) Inventors: Ryo Yabe, Tokyo (JP); Shuhei Asada, Tokyo (JP); Ken Watanabe, Kanagawa (JP)

(73) Assignee: GREE HOLDINGS, INC., Tokyo (JP)

( * ) Notice: Subject to any disclaimer, the term of this patent is extended or adjusted under 35 U.S.C. 154(b) by 0 days.

(21) Appl. No.: 18/601,454

(22) Filed: Mar. 11, 2024

(65) Prior Publication Data

US 2024/0221271 A1 Jul. 4, 2024

Related U.S. Application Data

(63) Continuation of application No. 17/893,779, filed on Aug. 23, 2022, now Pat. No. 11,989,811.

(30) Foreign Application Priority Data

Oct. 29, 2021 (JP) .................................. 2021-177158
Oct. 29, 2021 (JP) .................................. 2021-177159
(Continued)

(51) Int. Cl.
*G06T 13/40* (2011.01)
*G06T 13/80* (2011.01)
(Continued)

(52) U.S. Cl.
CPC .............. *G06T 13/40* (2013.01); *G06T 13/80* (2013.01); *H04N 21/4312* (2013.01); *H04N 21/4781* (2013.01)

(58) Field of Classification Search
None
See application file for complete search history.

(56) References Cited

U.S. PATENT DOCUMENTS

2017/0072307 A1    3/2017 Perry et al.
2019/0255446 A1*   8/2019 Essiounine ............. A63F 13/87
(Continued)

FOREIGN PATENT DOCUMENTS

CN    110694273 A    1/2020
JP    2014-23720 A   2/2014
(Continued)

OTHER PUBLICATIONS

Super Mario 3 Battle Game (URL: https://www.youtube.com/watch?v=w7qWFa59hSU, all pages, 2015).*
(Continued)

*Primary Examiner* — Frank S Chen
(74) *Attorney, Agent, or Firm* — Oliff PLC

(57) ABSTRACT

A first video generator generates first information for displaying, as a first video, a character object of a first user and a first object. A second video generator displays the first object and a third object different from the second object. An association portion associates the character object of the first user with a fourth object associated with the third object when the character object of the first user and the third object have a predetermined relationship. The second video generator displays the fourth object in association with the character object of the first user when the fourth object is associated with the character object of the first user by the association portion.

12 Claims, 54 Drawing Sheets

(30) Foreign Application Priority Data

Oct. 29, 2021 (JP) ................................. 2021-177160
Dec. 21, 2021 (JP) ................................. 2021-206823

(51) Int. Cl.
*H04N 21/431* (2011.01)
*H04N 21/478* (2011.01)

(56) References Cited

U.S. PATENT DOCUMENTS

| | | | |
|---|---|---|---|
| 2019/0291011 A1* | 9/2019 | Benedetto | ............... A63F 13/86 |
| 2020/0269129 A1 | 8/2020 | Kira et al. | |
| 2021/0203702 A1 | 7/2021 | Kurabuchi | |
| 2021/0204014 A1 | 7/2021 | Kawakami et al. | |
| 2021/0213357 A1 | 7/2021 | Morishita | |
| 2022/0021949 A1* | 1/2022 | Hu | ........................ A63F 13/92 |
| 2022/0347559 A1 | 11/2022 | Tsuchiya | |

FOREIGN PATENT DOCUMENTS

| | | |
|---|---|---|
| JP | 2015-184689 A | 10/2015 |
| JP | 2019-057291 A | 4/2019 |
| JP | 2019-133568 A | 8/2019 |
| JP | 2019-144942 A | 8/2019 |
| JP | 2019-186797 A | 10/2019 |
| JP | 2020-038468 A | 3/2020 |
| JP | 2021-007213 A | 1/2021 |
| JP | 2021-53365 A | 4/2021 |
| JP | 2021-152785 A | 9/2021 |
| JP | 6941245 B1 | 9/2021 |

OTHER PUBLICATIONS

Dead Space, https://www.youtube.com/watch?v=CEr-oNmuvus, Jul. 14, 2020 (Year: 2020).*
Feb. 27, 2023 Office Action issued in Japanese Patent Application No. 2021-177159.
Feb. 28, 2023 Office Action issued in Japanese Patent Application No. 2021-177160.
Mar. 26, 2024 Office Action issued in Japanese Patent Application No. 2023-048880.
Jun. 19, 2025 Notice of Reasons for Refusal issued in Japanese Patent Application No. 2021-206823.
YouTube, "[Eastward] Otaku love beautiful pixel art and post-apocalypse!#1[Natori Sana]" <https://www.youtube.com/watch?v=xu2F20kQILc>> (Sep. 17, 2021).
Twitch, "How to use Multistream! Explains how to watch multiple broadcasts at the same time! [MULTISTRE.AM]" <https://pontako.com/twitch-multistream/> (Mar. 22, 2020).
Note, "Introduction to VRM" <https://note.com/npaka/n/n59d777a49c99> (Nov. 6, 2019).
Oct. 21, 2025 Notice of Reasons for Refusal issued in Japanese Patent Application No. 2021-206823.

* cited by examiner

INFORMATION PROCESSING SYSTEM, INFORMATION PROCESSING METHOD, AND COMPUTER PROGRAM

This application is a continuation of application Ser. No. 17/893,779 filed Aug. 23, 2022, which claims the benefit of priority from Japanese Patent Application Nos. 2021-177158 filed Oct. 29, 2021 and 2021-177159 filed Oct. 29, 2021, 2021-177160 filed Oct. 29, 2021 and 2021-206823 filed Dec. 21, 2021, the entire contents of the prior applications being incorporated herein by reference.

TECHNICAL FIELD

This disclosure relates to an information processing system, an information processing method, and a computer program.

BACKGROUND TECHNOLOGY

An information processing system is known that generates an animation of a character object based on the movement of an actor and distributes a video including the animation of the character object.

SUMMARY

Problem to be Resolved

In this technical field, how to improve distributing users' distribution motivation, viewing users' viewing motivation, and/or users' motivation to interact with each other are important problems.

Therefore, an object of this disclosure is to provide technical improvements that solve or alleviate at least some of the problems of the prior art. One of the more specific objectives of this disclosure is to provide an information processing system, an information processing method, and a computer program that can improve the distributing users' distribution motivation, the viewing users' viewing motivation and/or the users' motivation to interact with each other.

Means of Solving Problem

An information processing system comprises one or more computer processors, the one or more computer processors comprising: a transmitter that transmits, to a second user terminal of a second user, information about a video including a character object of a first user; a movement operation receiver that accepts a movement operation of the character object of the first user in a virtual space; a virtual camera controller that accepts a camera operation of a virtual camera that captures in the virtual space; and a video generator that generates information for making the character object of the first user movable in the virtual space based on the movement operation and the camera operation, wherein: a first movement operation is applied to the character object of the first user in response to a predetermined operation with respect to a first operation UI displayed at a first user terminal of the first user; a second movement operation is applied to the character object of the first user in response to a predetermined operation with respect to a second operation UI displayed at the first user terminal; a viewpoint of the virtual camera is switched to a first-person viewpoint or a third-person viewpoint in response to a predetermined operation with respect to a third operation UI displayed at the first user terminal; and movement, rotation and/or scale operations of the virtual camera are applied in response to a predetermined operation with respect to a region where the first operation UI, the second operation UI, and the third operation UI are not displayed, at the first user terminal.

The information processing system as above, wherein the one or more computer processors switch whether or not to display a comment on the video displayed on the first user terminal in response to a predetermined operation with respect to the first user terminal; and/or when the one or more computer processors switch whether or not to display a comment on the video, the one or more computer processors change display positions of the first operation UI and the second operation UI, or place the first operation UI, the second operation UI and the third operation UI in a non-display state.

The information processing system as above, wherein the first movement operation is a horizontal movement, and the second movement operation is a vertical movement; and/or the one or more computer processors apply a rotation operation to the virtual camera in response to a one-finger swipe operation with respect to the region; apply a movement operation to the virtual camera in response to a two-finger swipe operation with respect to the region; and apply a scale operation to the virtual camera in response to a two-finger pinch-in/pinch-out operation with respect to the region.

The information processing system as above, wherein the virtual camera controller accepts a camera operation from the first user or a user authorized by the first user.

The information processing system as above, wherein a movement of a face of the character object of the first user is generated based on a movement of a face of the first user captured by a front camera of the first user terminal; and the video generator generates the movement of the face of the character object of the first user in an inverted state or a non-inverted state according to a positional relationship between the character object of the first user and the virtual camera.

The information processing system as above, wherein when the character object of the first user moves beyond a movable region, the video generator causes the character object to reappear from another position in the virtual space.

An information processing method that causes one or more computer processors to execute: a transmission step that transmits, to a second user terminal of a second user, information about a video including a character object of a first user; a movement operation reception step that accepts a movement operation of the character object of the first user in a virtual space; a virtual camera control step that accepts a camera operation of a virtual camera that captures in the virtual space; and a video generation step that generates information for making the character object of the first user movable in the virtual space based on the movement operation and the camera operation, wherein the video generation step applies a first movement operation to the character object of the first user in response to a predetermined operation with respect to a first operation UI displayed at a first user terminal of the first user; applies a second movement operation to the character object of the first user in response to a predetermined operation with respect to a second operation UI displayed at the first user terminal; switches a viewpoint of the virtual camera to a first-person viewpoint or a third-person viewpoint in response to a predetermined operation for a third operation UI displayed at the first user terminal; and applies movement, rotation and/or scale operations of the virtual camera in response to a predetermined operation with respect to a region where the first operation UI, the second operation UI, and the third operation UI are not displayed, at the first user terminal.

An information processing method that causes one or more computer processors to execute: a transmission step that transmits, to a server device, information about a video including a character object of a first user; a movement operation reception step that accepts a movement operation of the character object of the first user in a virtual space; a virtual camera control step that accepts a camera operation of a virtual camera that captures in the virtual space; and a video generation step that generates information for making the character object of the first user movable in the virtual space based on the movement operation and the camera operation, wherein the video generation step applies a first movement operation to the character object of the first user in response to a predetermined operation with respect to a first operation UI displayed at a first user terminal of the first user; applies a second movement operation to the character object of the first user in response to a predetermined operation with respect to a second operation UI displayed at the first user terminal; switches a viewpoint of the virtual camera to a first-person viewpoint or a third-person viewpoint in response to a predetermined operation for a third operation UI displayed at the first user terminal; and applies movement, rotation and/or scale operations of the virtual camera in response to a predetermined operation with respect to a region where the first operation UI, the second operation UI, and the third operation UI are not displayed, at the first user terminal.

A computer program that causes one or more computer processors to execute: a transmission function that transmits, to a server device, information about a video including a character object of a first user; a movement operation reception function that accepts a movement operation of the character object of the first user in a virtual space; a virtual camera control function that accepts a camera operation of a virtual camera that captures in the virtual space; and a video generation function that generates information for making the character object of the first user movable in the virtual space based on the movement operation and the camera operation, wherein the video generation function applies a first movement operation to the character object of the first user in response to a predetermined operation with respect to a first operation UI displayed at a first user terminal of the first user; applies a second movement operation to the character object of the first user in response to a predetermined operation with respect to a second operation UI displayed at the first user terminal; switches a viewpoint of the virtual camera to a first-person viewpoint or a third-person viewpoint in response to a predetermined operation for a third operation UI displayed at the first user terminal; and applies movement, rotation and/or scale operations of the virtual camera in response to a predetermined operation with respect to a region where the first operation UI, the second operation UI, and the third operation UI are not displayed, at the first user terminal.

An information processing method that causes one or more computer processors to execute: a reception step that receives, from a server device, information about a video including a character object of a first user and a character object of a second user; a movement operation reception step that accepts a movement operation of the character object of the first user in a virtual space; a virtual camera control step that accepts a camera operation of a virtual camera that captures in the virtual space; a transmission step that transmits, to the server device, information about the movement operation and the camera operation; and a display step that displays the character object of the first user and the character object of the second user so as to be movable in the virtual space, wherein a first movement operation is applied to the character object of the second user in response to a predetermined operation with respect to a first operation UI displayed at a second user terminal of the second user; a second movement operation is applied to the character object of the first user in response to a predetermined operation with respect to a second operation UI displayed at the second user terminal; a viewpoint of the virtual camera is switched to a first-person viewpoint or a third-person viewpoint in response to a predetermined operation with respect to a third operation UI displayed at the second user terminal; and movement, rotation and/or scale operations of the virtual camera are applied in response to a predetermined operation with respect to a region where the first operation UI, the second operation UI, and the third operation UI are not displayed, at the second user terminal.

A computer program that causes one or more computer processors to realize: a reception function that receives, from a server device, information about a video including a character object of a first user and a character object of a second user; a movement operation reception function that accepts a movement operation of the character object of the second user in a virtual space; a virtual camera control function that accepts a camera operation of a virtual camera that captures in the virtual space; a transmission function that transmits, to the server device, information about the movement operation and the camera operation; and a display function that displays the character object of the first user and the character object of the second user so as to be movable in the virtual space, wherein a first movement operation is applied to the character object of the second user in response to a predetermined operation with respect to a first operation UI displayed at a second user terminal of the second user; a second movement operation is applied to the character object of the first user in response to a predetermined operation with respect to a second operation UI displayed at the second user terminal; a viewpoint of the virtual camera is switched to a first-person viewpoint or a third-person viewpoint in response to a predetermined operation with respect to a third operation UI displayed at the second user terminal; and movement, rotation and/or scale operations of the virtual camera are applied in response to a predetermined operation with respect to a region where the first operation UI, the second operation UI, and the third operation UI are not displayed, at the second user terminal.

An information processing system comprises one or more computer processors, the one or more computer processors comprising: a transmitter that transmits, to a second user terminal of a second user, information about a video including a character object of a first user; a movement operation receiver that accepts a movement operation of the character object of the first user in a virtual space; a virtual camera controller that accepts a camera operation of a virtual camera that captures in the virtual space; and a video generator that generates information for making the character object of the first user movable in the virtual space based on the movement operation and the camera operation, wherein the video generator can further generate information for displaying, in the video, a character object of one or more other users; and the transmitter transmits, to the second user terminal, information about a video of a first-person viewpoint or a third-person viewpoint of the character object of the first user; a video of a first-person viewpoint or a third-person viewpoint of a character object of one other user from among the one or more other users; or a plurality of videos of (i) the first-person viewpoint or the third-person viewpoint of the character object of the first user, and (ii) the first-person viewpoint or the third-person viewpoint of the character object of the other users.

The information processing system as above, wherein the one or more computer processors are provided with a selection receiver that accepts selection of one user from among the first user and the one or more other users, by the first user or the second user; and/or the transmitter transmits information about the video according to the selection accepted by the selection receiver.

The information processing system as above, wherein when the selection receiver accepts the selection of one other user from among the one or more other users by the first user, the transmitter transmits information about the first-person video of the other user; and/or the one or more computer processors further comprise: a production receiver that accepts a request from another user to display a production effect in the video; and an effect generator that generates a production effect in the video in response to the display request accepted by the production receiver, wherein when the selection receiver accepts the selection of one other user from among the one or more other users by the first user, the transmitter transmits information about the video in which the production effect has been generated.

The information processing system as above, wherein the one or more computer processors further comprise: a switching receiver that accepts a request for switching an object to the video from the other user, wherein when the selection receiver accepts the selection of one other user from among the one or more other users by the first user, the video generator changes an object other than the character object of the first user and the character object of the second user displayed in the virtual space to another object in response to the switching request received by the switching receiver; and/or movement of a face of the character object of the first user is generated based on movement of a face of the first user captured by a front camera of a first user terminal of the first user; and the video generator generates the movement of the face of the character object of the first user in an inverted state or a non-inverted state according to a positional relationship between the character object of the first user and the virtual camera; and/or when the character object of the first user moves beyond a movable region, the video generator causes the character object to reappear from another position in the virtual space.

An information processing method that causes one or more computer processors to execute: a transmission step that transmits, to a second user terminal of a second user, information about a video including a character object of a first user; a movement operation reception step that accepts a movement operation of the character object of the first user in a virtual space; a virtual camera control step that accepts a camera operation of a virtual camera that captures in the virtual space; and a video generation step that generates information for making the character object of the first user movable in the virtual space based on the movement operation and the camera operation, wherein: the video generation step can further generate information for displaying, in the video, a character object of one or more other users; and the transmission step transmits, to the second user terminal, information about a video of a first-person viewpoint or a third-person viewpoint of the character object of the first user; a video of a first-person viewpoint or a third-person viewpoint of a character object of one other user from among the one or more other users; or a plurality of videos of (i) the first-person viewpoint or the third-person viewpoint of the character object of the first user, and (ii) the first-person viewpoint or the third-person viewpoint of the character object of the other users.

An information processing method that causes one or more computer processors to execute: a transmission step that transmits, to a server device, information about a video including a character object of a first user; a movement operation reception step that accepts a movement operation of the character object of the first user in a virtual space; a virtual camera control step that accepts a camera operation of a virtual camera that captures in the virtual space; a video generation step that generates information for making the character object of the first user movable in the virtual space based on the movement operation and the camera operation; a reception step that receives, from the server device, information for displaying the character object of one or more other users in the video; and a display step that displays (i) a video of a first-person viewpoint or a third-person viewpoint of the character object of the first user, (ii) a video of the first-person viewpoint or the third-person viewpoint of the character object of one other user from among one or more of the other users, or (iii) a plurality of videos of (a) the first-person viewpoint or the third-person viewpoint of the character object of the first user, and (b) the first-person viewpoint or the third-person viewpoint of the character object of the other users.

A computer program that causes one or more computer processors to realize: a transmission function that transmits, to a server device, information about a video including a character object of a first user; a movement operation reception function that accepts a movement operation of the character object of the first user in a virtual space; a virtual camera control function that accepts a camera operation of a virtual camera that captures in the virtual space; a video generation function that generates information for making the character object of the first user movable in the virtual space based on the movement operation and the camera operation; a reception function that receives, from the server device, information for displaying the character object of one or more other users in the video; and a display function that displays (i) a video of a first-person viewpoint or a third-person viewpoint of the character object of the first user, (ii) a video of the first-person viewpoint or the third-person viewpoint of the character object of one other user from among one or more of the other users, or (iii) a plurality of videos of (a) the first-person viewpoint or the third-person viewpoint of the character object of the first user, and (b) the first-person viewpoint or the third-person viewpoint of the character object of the other users.

An information processing method that causes one or more computer processors to execute: a reception step that receives, from a server device, information about a video including a character object of a first user and a character object of a second user; a movement operation reception step that accepts a movement operation of the character object of the first user in a virtual space; a virtual camera control step that accepts a camera operation of a virtual camera that captures in the virtual space; a transmission step that transmits, to the server device, information about the movement operation and the camera operation; and a display step that displays the character object of the first user and the character object of the second user so as to be movable in the virtual space, wherein: the display step displays (i) a video of a first-person viewpoint or a third-person viewpoint of the character object of the first user, (ii) a video of the first-person viewpoint or the third-person viewpoint of the character object of the second user, or (iii) a plurality of videos of (a) the first-person viewpoint or the third-person viewpoint of the character object of the first user, and (b) the first-person viewpoint or the third-person viewpoint of the character object of the second user.

A computer program that causes one or more computer processors to realize: a reception function that receives, from a server device, information about a video including a character object of a first user and a character object of a second user; a movement operation reception function that accepts a movement operation of the character object of the second user in a virtual space; a virtual camera control function that accepts a camera operation of a virtual camera that captures in the virtual space; a transmission function that transmits, to the server device, information about the movement operation and the camera operation; and a display function that displays the character object of the first user and the character object of the second user so as to be movable in the virtual space, wherein the display function displays (i) a video of a first-person viewpoint or a third-person viewpoint of the character object of the first user, (ii) a video of the first-person viewpoint or the third-person viewpoint of the character object of the second user, or (iii) a plurality of videos of (a) the first-person viewpoint or the third-person viewpoint of the character object of the first user, and (b) the first-person viewpoint or the third-person viewpoint of the character object of the second user.

Effects

According to this disclosure, technical improvements that solve or alleviate at least some of the problems of the prior art described above can be provided. Specifically, according to this disclosure, the distributing users' distribution motivation, the viewing users' viewing motivation and/or the users' motivation to interact with each other can be improved.

MODE TO IMPLEMENT EMBODIMENTS

First, an overview of an information processing system according to an embodiment of this disclosure will be described with reference to the drawings.

The information processing system in this disclosure is an information processing system including one or more information processing devices and a server device, and includes one or more computer processors.

A video displayed on each device is described as including, but is not limited to, an animation of a character object generated based on the movement of the distributing user. The video may include an animation of a character object generated in response to an operation of the distributing user, or may include an image of the distributing user himself/herself. The video may also include only the voice of the distributing user, without displaying a character object or the distributing user.

The space displayed in the video may be a virtual space, a reality space, or an augmented reality space that is a combination thereof. The video may be something like a karaoke video or a live game video that plays at least a predetermined image and the voice of the distributing user, or it may be a superimposed display of a character object, or a real image of the distributing user, on these images.

Further, when the distributing user is included in the reality space, the character object generated based on the movement of the distributing user may be superimposed and displayed on the actual image of the distributing user. Further, an animation such as a gift object may be superimposed and displayed on the captured image in the reality space.

The information processing system in an embodiment of this disclosure can be used to provide the next Internet space (metaverse), which is a digital world in which many people can participate simultaneously and freely engage in activities such as interaction, work, and play via character objects (avatars) at a level close to that of the real world. Social activities can be carried out transcending the gap between reality and virtuality.

In this embodiment, as one element of the above metaverse, the information processing system can be used to realize a "world function" in which people's avatars (character objects) can freely walk around in a virtual space and communicate with each other.

<System Configuration>

Figure 1:
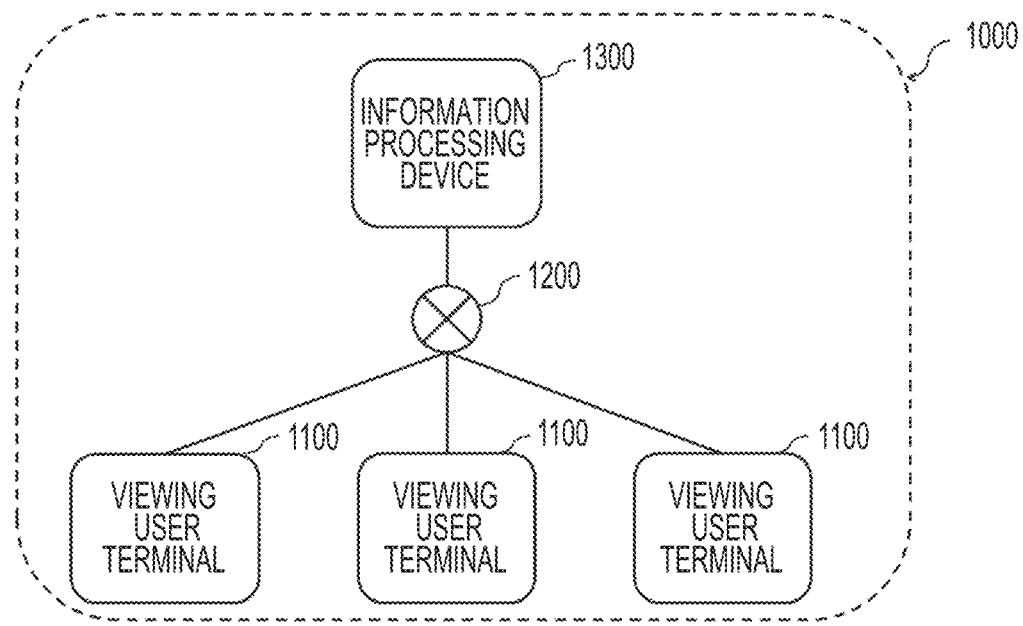
FIG. 1 is a system configuration diagram showing an example of an information processing system in this disclosure.

As shown as an example in FIG. 1, an information processing system 1000 according to this disclosure includes (i) one or more viewing user terminals 1100, and (ii) an information processing device (support computer) 1300 arranged in a video distribution studio or the like, which is connected to these viewing user terminals 1100 via a network 1200.

Further, the information processing device 1300 may be connected to a server device via the Internet, and part or all of the processing to be performed by the information processing device 1300 may be performed by the server device. The server device may be an information processing device 2400 shown in FIG. 2.

In this specification, the distribution by the information processing system 1000 is referred to as studio distribution.

In studio distribution, movement of an entire body of a distributing user (actor) will be reflected in a character in real time by capturing markers attached to the distributing user with a camera(s) installed in the studio and using known motion capture technology.

Figure 2:
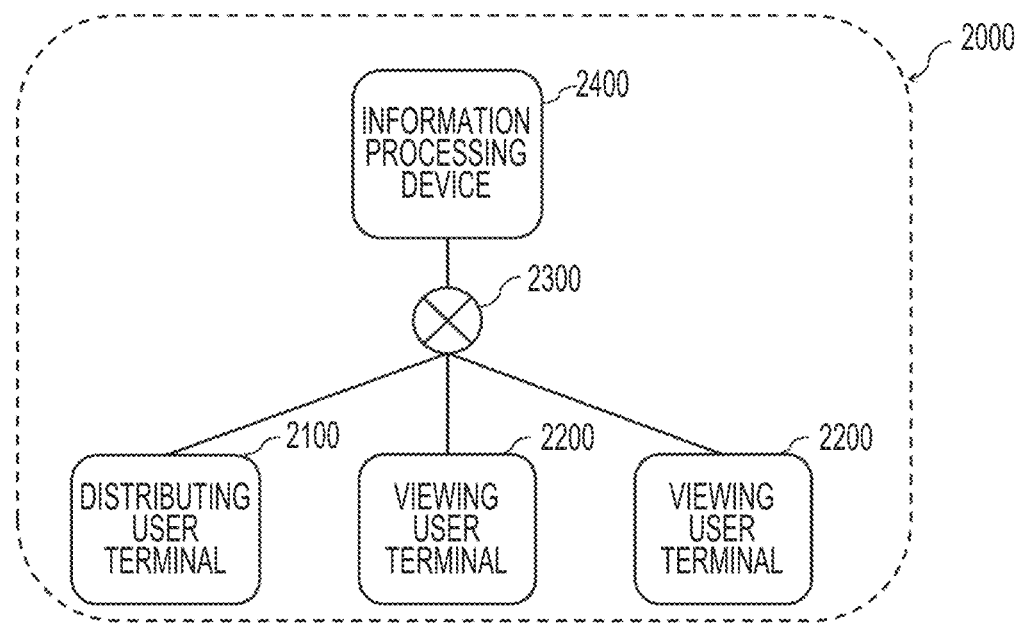
FIG. 2 is a system configuration diagram showing an example of an information processing system in this disclosure.

Additionally, the information processing system 1000 can also work with another information processing system 2000, shown in FIG. 2 as an example. The information processing system 2000 shown in FIG. 2 can include (i) a distributing user terminal 2100, (ii) one or more viewing user terminals 2200, and (iii) and the information processing device (server device) 2400 that is connected to the distributing user terminal 2100 and the viewing user terminals 2200 via a network 2300.

In the above example, the distributing user terminal 2100 can be an information processing terminal such as a smartphone. In this specification, distribution by such information processing system 2000 is referred to as mobile distribution.

In mobile distribution, the movement of the distributing user's face is captured by a camera provided in the distributing user terminal 2100 and reflected on the character's face in real time using known face tracking technology.

There is no particular distinction between a distributing user and a viewing user in mobile distribution. A viewing user can perform mobile distribution at any time, and the distributing user can be a viewing user when viewing a video of another distributing user.

The video generated by the information processing system 1000 and the information processing system 2000 can be distributed to a viewing user from one video distribution platform as an example.

Furthermore, in any distribution, the process of generating animation by reflecting motion to the character, the process of displaying a gift described below, and the like may be shared by a distributing user terminal, a viewing user terminal, an information processing device and other devices.

That is, "distribution" here refers to transmitting information to make the video available for viewing at the viewing user terminal. Video rendering is performed at the information processing devices 1300, 2400 side or at the distributing user terminal 2100 and viewing user terminal 1100 and 2200 side.

Specifically, face motion data and voice data of the distributing user is transmitted from the distributing user terminal or information processing device to the terminal or device that generates (renders) the animation of the character object. Further, a body motion may be transmitted in addition to the face motion.

In this disclosure, the process of generating an animation will be described as being performed by each of the distributing user terminal and the viewing user terminal, but this disclosure is not limited to this.

Figure 3:
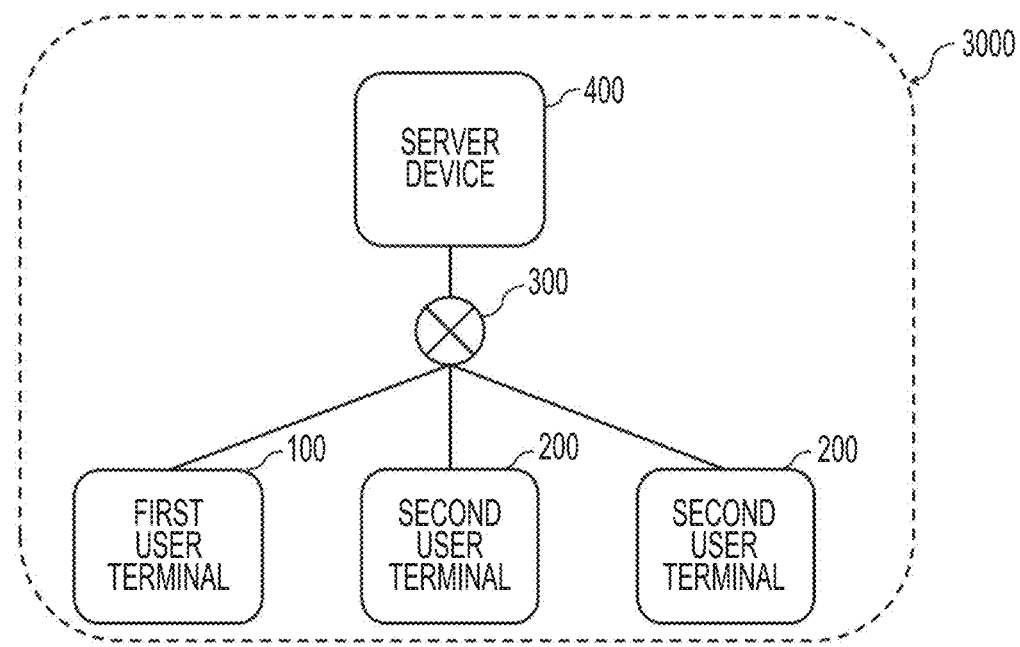
FIG. 3 is a system configuration diagram showing an example of an information processing system in this disclosure.

The information processing system in this disclosure can be applied to any of the examples shown in FIGS. 1 and 2. Further, since it is not always necessary to distinguish between the "distributing user" and the "viewing user", an information processing system 3000 in the embodiment of this disclosure is described as shown in FIG. 3, with a first user terminal 100, second user terminals 200, and a server device 400 that can be connected to these first user terminal 100 and second user terminals 200 via a network 300.

The first user terminal 100 functions as at least the information processing device 1300 or distributed user terminal 2100 described above. The second user terminals 200 function as at least one or more viewing user terminals 1100, 2200 described above. The server device 400 functions as at least the server device or information processing device 2400 described above.

In this disclosure, the first user terminal 100 and the second user terminals 200 may each be a smartphone (multi-functional phone terminal), a tablet terminal, a personal computer, a console game machine, a head-mounted display (HMD), a wearable computer such as a spectacle-type wearable terminal (AR glasses or the like), and an information processing device other than these devices that can reproduce a video. Further, these terminals may be stand-alone devices that operate independently, or may be constituted by a plurality of devices that are connected to each other so as to be able to send and receive various data.

<Hardware Configuration>

Here, a hardware configuration of the first user terminal 100 will be described with reference to FIG. 4. The first user terminal 100 includes a processor 101, a memory 102, a storage 103, an input/output interface (I/O I/F) 104, and a communication interface (communication I/F) 105. Each component is connected to each other via a bus B.

The first user terminal 100 can realize the functions and methods described in this embodiment by the processor 101, the memory 102, the storage 103, the I/O I/F 104, and the communication I/F 105 working together.

The processor 101 executes a function and/or a method realized by a code or a command included in a program stored in the storage 103. The processor 101 may realize each process disclosed in each embodiment by a logic circuit (hardware) chip or a dedicated circuit formed in an integrated circuit (IC (Integrated Circuit) chip, an LSI (Large Scale Integration)) or the like, including, for example, a CPU (Central Processing Unit), a MPU (Micro Processing Unit), a GPU (Graphics Processing Unit), a microprocessor, a processor core, a multiprocessor, an ASIC (Application-Specific Integrated Circuit), an FPGA (Field Programmable Gate Array), and the like. These circuits may be realized by one or more integrated circuits. A plurality of processes shown in each embodiment may be realized by a single integrated circuit. Furthermore, LSI may also be referred to as a VLSI, a Super LSI, a Ultra LSI, and the like, depending on the degree of integration.

The memory 102 temporarily stores a program loaded from the storage 103 and provides a work region to the processor 101. Various data generated while the processor 101 is executing the program are also temporarily stored in the memory 102. The memory 102 includes, for example, a RAM (Random Access Memory), a ROM (Read Only Memory), and the like.

The storage 103 stores the program. The storage 103 includes, for example, an HDD (Hard Disk Drive), an SSD (Solid State Drive), a flash memory, and the like.

The communication I/F 105 is implemented as hardware such as a network adapter, software for communication, and a combination thereof, and is used to send and receive various types of data via the network 300. This communication may be executed by either by wire or wirelessly, and any communication protocol may be used as long as mutual communication can be executed. The communication I/F 105 executes communication with another information processing device via the network 300. The communication I/F 105 transmits various data to other information processing devices according to instructions from the processor 101. The communication I/F 105 also receives various data transmitted from other information processing devices and transmits them to the processor 101.

The input/output I/F 104 includes an input device for inputting various operations to the first user terminal 100 and an output device for outputting processing results processed by the first user terminal 100. The input/output I/F 104 may such that the input device and the output device are integrated, or may be separated into the input device and the output device.

The input device is realized by any one of all types of devices that can receive an input from a user and transmit information related to the input to the processor 101, or a combination thereof. The input device includes, for example, (i) a hardware key, such as a touch panel, a touch display, and a keyboard, (ii) a pointing device, such as a mouse, (iii) a camera (operation input via an image), and (iv) a microphone (operation input by voice).

The input device may include a sensor portion. The sensor portion is one or more sensors that detect (i) face motion, which indicates changes in the user's facial expression, and (ii) body motion, which indicates changes in the relative position of the user's body with respect to the sensor portion. Face motion includes movements such as blinking of the eyes, opening and closing of the mouth, or the like. The sensor portion may use any known object. An example of a sensor portion includes (i) a ToF sensor that measures and detects the time of flight (Time of Flight) until light irradiated toward the user is reflected by the user's face and returns, and the like, (ii) a camera that captures the user's face, and (iii) an image processor that image-processes the data captured by the camera. The sensor portion may also include an RGB camera for capturing visible light and a near-infrared camera for capturing near-infrared light. The RGB camera and near-infrared camera may use, for example, "True Depth" of the "iphone X (registered trademark)," "LIDER" of the "iPad Pro (registered trademark)," or other ToF sensors in smartphones. This camera specifically projects tens of thousands of invisible dots of the user's face and the like. Then, accurate face data is captured by detecting and analyzing the reflected light of the dot pattern to form a depth map of the face and capturing infrared images of the face and the like. An arithmetic processor of the sensor portion generates various types of information based on the depth map and infrared image, and compares this information with registered reference data to calculate the depth (distance between each point and the near-infrared camera) and non-depth positional deviations for each point on the face.

Further, the sensor portion may have a function of tracking not only the user's face, but also the hand (hand tracking). The sensor portion may further include a sensor other than the above-mentioned sensors such as an acceleration sensor and a gyro sensor. The sensor portion may have a spatial mapping function of (i) recognizing an object in the real space in which the user exists based on the detection results of the above ToF sensor and other known sensors, and (ii) mapping the recognized object to the spatial map. Hereinafter, when the face motion detection data and the body motion detection data are described with no particular distinction, they are simply referred to as "tracking data." The image processor of the sensor portion may be provided with a controller that can be provided in the information processing system of this disclosure.

As an operation portion as an input device, a device corresponding to the type of the user terminal can be used. An example of the operation portion is provided on a touch panel integrated with a display, an operation button provided on a housing of a user terminal, a keyboard, a mouse, a controller operated by a user, and the like. The controller may incorporate various known sensors such as an acceleration sensor and an inertial measurement sensor (IMU: Inertial Measurement Unit) such as a gyro. Furthermore, another example of the operation portion may be a tracking device that identifies the movement of the user's hand, the movement of the eyes, the movement of the head, the direction of the line of sight, and the like. In this embodiment, for example, based on the user's hand movements, the user's instructions are determined and various operations are performed such as, starting or ending the video distribution, evaluating messages and videos, and requesting the display of predetermined objects (for example, the gift described below), and the like. If the sensor portion also has an input interface function such as a hand tracking function, the operation portion can be omitted.

The output device outputs the processing result processed by the processor 101. The output device includes, for example, a touch panel, a speaker, and the like.

Figure 4:
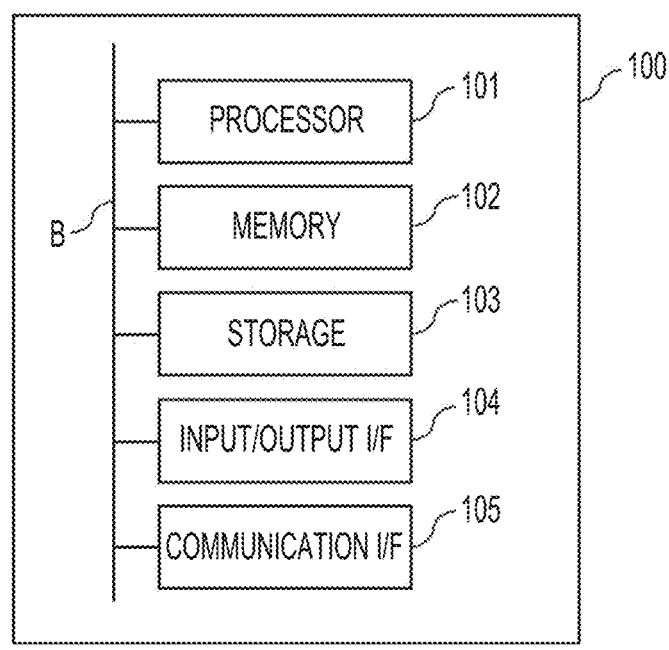
FIG. 4 is a configuration diagram showing an example of a hardware configuration of a server device, a first user terminal and a second user terminal in this disclosure.

Further, the second user terminals 200 and the server device 400 in this disclosure may also be configured with the same hardware configuration as in FIG. 4, unless otherwise noted.

Next, various functions that can be executed on a user terminal that has started the application realized by the information processing system according to the embodiment of this disclosure, and the transition of the displayed screen, will be explained with reference to the drawings.

Figure 5:
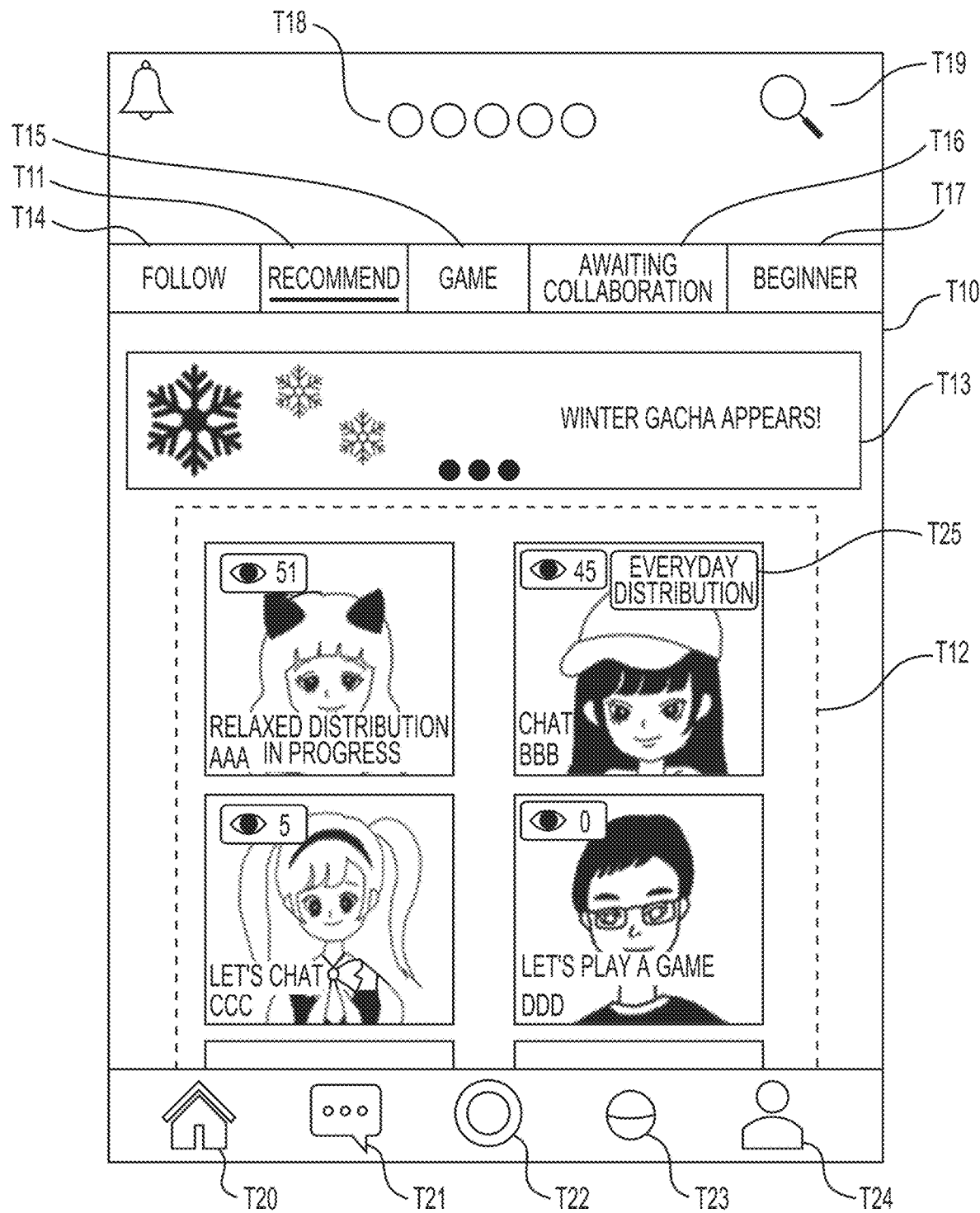
FIG. 5 is a conceptual diagram showing an image of a screen displayed on a user terminal.

FIG. 5 shows a top screen T10 displayed on a user terminal when a video distribution/viewing application is started.

As shown in FIG. 5, by selecting one distribution channel (a distribution slot, a distribution program, a distribution video, or the like) from the thumbnail images of one or more recommended distribution channels T12 listed in a recommendation tab T11 on the top screen T10, the user can view a video played on the one distribution channel.

Alternatively, the user can view the video played on the specific distribution channel by accessing a fixed link of the specific distribution channel. Such a fixed link can be obtained by a notification from a distributing user who is being followed, a notification of a share sent from another user, or the like.

In this way, the user who views the video is the viewing user, and the terminal for viewing the video is the second user terminal 200.

Further, as shown in FIG. 5, a display field T13 for notification of a campaign, an event, or the like may be displayed on the top screen T10. The display field T13 of this notification can be switched to another notification by a slide operation.

Then, from the top screen T10, a follow tab T14, a game tab T15 for displaying a game category, an awaiting collaboration tab T16 for displaying an awaiting collaborative distribution channel, and a beginner tab T17 for displaying a beginner's distribution channel are displayed. By selecting these (by switching the tabs), the top screen T10 transitions to respective different screens.

A service name display T18 and a search button T19 in the upper frame of the top screen T10 may be fixedly displayed on the transition destination screen.

Similarly, a home button T20, a message button T21, a distribution preparation button T22, a gacha button T23, and a profile button T24 in the lower frame of the top screen T10 may be fixedly displayed on the transition destination screen.

A user who selects the displayed thumbnail images T12 on the top screen T10 or the like shown in FIG. 5 becomes a viewing user (second user) who views the video as described above, and a user who selects the distribution preparation button T22 can become a distributing user (first user) who distributes a video.

Figure 6:
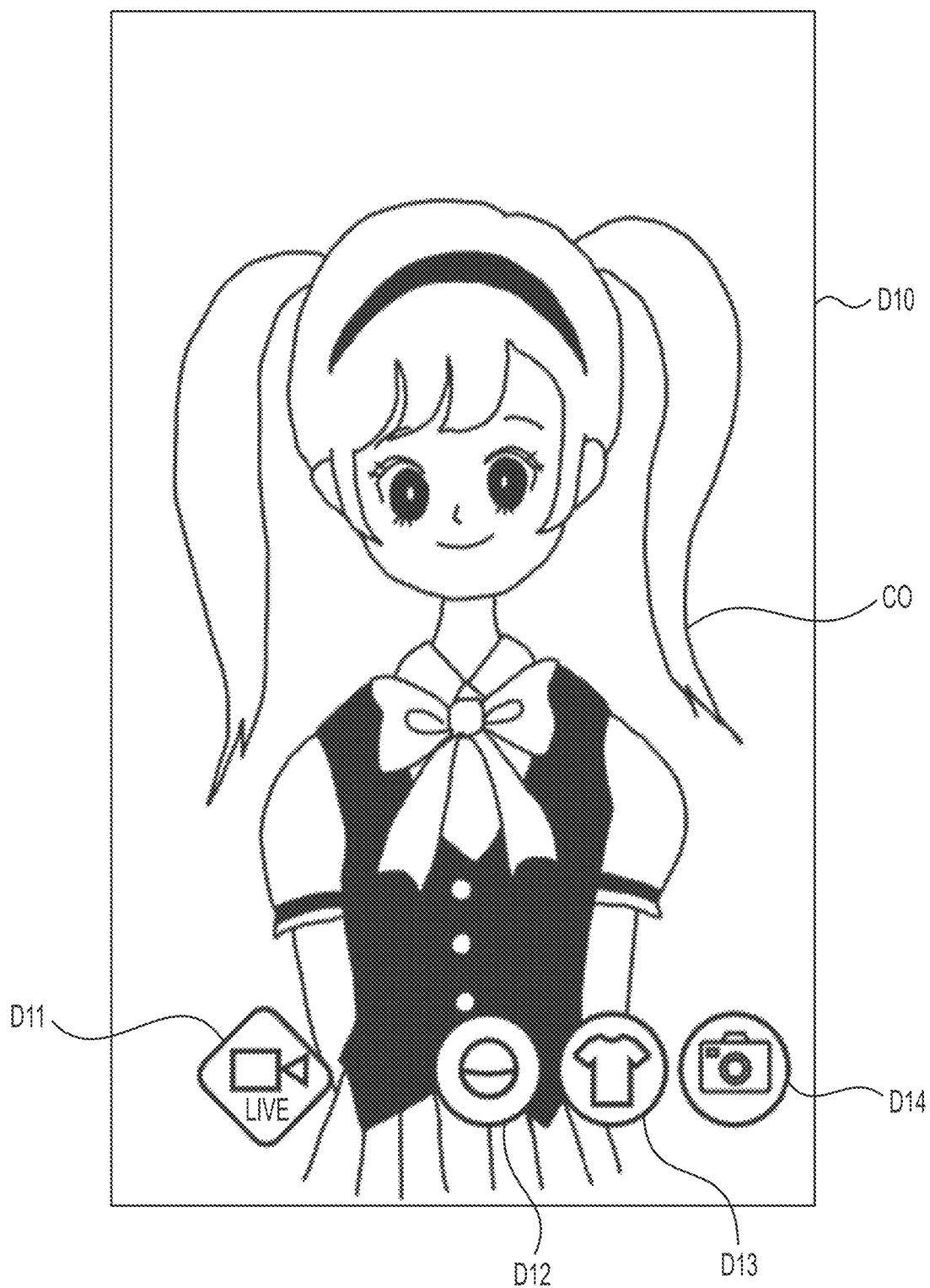
FIG. 6 is a conceptual diagram showing an image of a screen displayed on a user terminal.

As an example, when the distribution preparation button T22 is selected on the top screen T10 shown in FIG. 5, the screen transitions to an avatar setting screen D10 shown in FIG. 6. Then, when a distribution button D11 is selected on the avatar setting screen D10, the screen transitions to a distribution setting screen D20 shown in FIG. 7. Then, when a distribution start button D25 is selected on the distribution setting screen D20, the screen transitions to an avatar distribution screen D30 shown in FIG. 8.

Next, details of the flow up to the start of video distribution will be described.

The one or more computer processors in this disclosure may include a distribution start request receiving portion, a distribution setting portion, and a distribution start portion.

The distribution start request receiving portion receives a distribution start request for a first video including an animation of a character object from the distributing user terminal of the distributing user.

Here, the first video refers to a video including an animation of a character object. In this specification, the character object may be referred to as an "avatar."

Then, the above distribution start request can be transmitted from the user terminal to the information processing device 2400 by selecting the distribution button D11 located on the avatar setting screen or the like that has transitioned from the top screen displayed on the user terminal (later to become the distributing user terminal 2100) that started the dedicated application (video distribution/viewing application) for accessing the above-described video distribution platform.

FIG. 6 shows an example of the avatar setting screen D10. A character object CO, the distribution button D11, a gacha button D12, a change of clothes button D13, a photo button D14, and the like can be displayed on the avatar setting screen D10.

When the change-of-clothes button D13 is selected by the user, a closet screen for selecting various avatar parts such as eyes, nose, mouth, hair, accessories, clothes, and background of the character object CO appears.

When the gacha button D12 is selected by the user, a lottery screen for obtaining the above avatar parts appears.

When the photo button D14 is selected by the user, a capturing screen for capturing a still image of the character object appears.

Then, when the distribution button D11 is selected by the user, a distribution start request is transmitted to the information processing device 2400 (server device 400).

The distribution setting portion sets the distribution setting of the first video based on the designation from the distributing user terminal 2100 in response to the distribution start request of the first video received by the distribution start request receiving portion.

Figure 7:
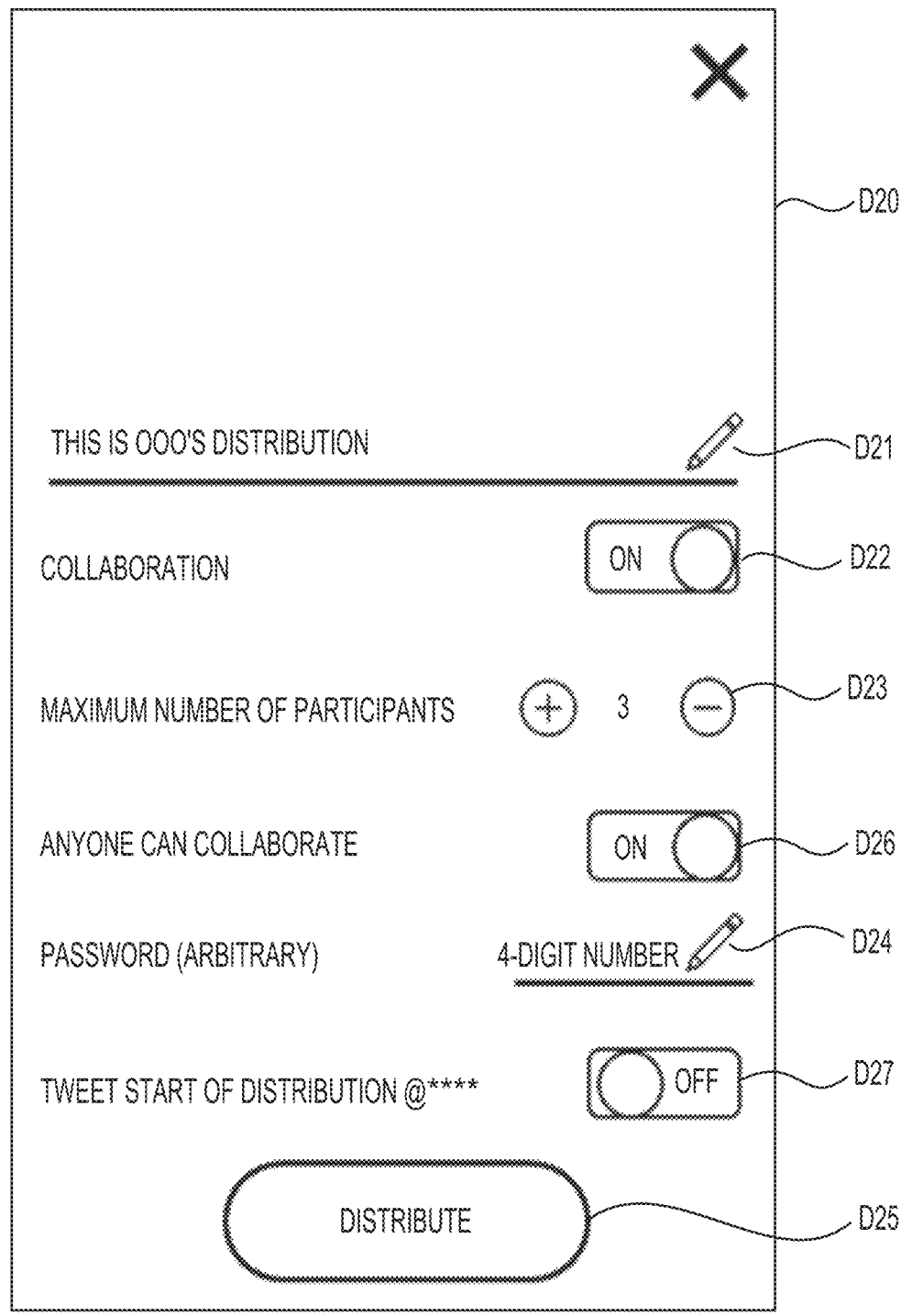
FIG. 7 is a conceptual diagram showing an image of a screen displayed on a user terminal.

As an example, when the distribution button D11 is selected, the screen displayed on the distributing user terminal 2100 transitions from the avatar setting screen D10 shown in FIG. 6 to the distribution setting screen D20 shown in FIG. 7.

The distribution setting can include at least one of a setting related to the title of the first video, a setting regarding whether other users can appear in the first video, a setting related to the number of people who can appear in the first video, a the setting related to a password.

These distribution settings can be set in a title setting field D21, a collaboration possibility setting field D22, a number-of-people setting field D23, and a password setting field D24 in FIG. 7, respectively. Additionally, in FIG. 7, a collaboration possibility setting field D26 and an SNS posting possibility field D27 are further displayed.

The title of the first video can be freely determined by the distributing user within a range of the number of characters up to an allowable upper limit. If there is no input by the distributing user, a preset title, including the name of the distributing user or character object such as "This is so and so's distribution♪," may be determined automatically.

Whether other users can make a request for appearance in the first video can be freely determined by the distributing user. If yes, other users can make a request for appearance to the distributing user. If no, other users cannot make a request for appearance to the distributing user. A state in which another user appears in the video of the distributing user may be referred to as "collaboration" in this specification. Details of the collaboration will be described later.

The number of people who can appear in the first video can be set only when other users can appear in the first video mentioned above, and the distributing user can freely determine this number within a range of the number of people up to an allowable upper limit.

A password can be arbitrarily set only when other users can appear in the first video mentioned above, and the distributing user can freely determine the designated number of digits. When another user makes a request for appearance in the first video, entering of such a password is required. A configuration is acceptable in which the password setting field D24 may become active only when the collaboration possibility setting field D26 is OFF.

The distribution start portion distributes information about the first video to the viewing user terminal(s) 2200 of the viewing user(s) based on the conditions set by the distribution setting portion.

The instruction to start such distribution is transmitted by selecting the distribution start button D25 shown in FIG. 7.

As an example, the distribution start portion distributes information about the video (first video) including the animation of the character object of the distributing user to the viewing user terminal 2200 of the viewing user (avatar distribution).

Information about the first video includes, for example, motion information indicating movement of the character object, voice information of the distributing user, and gift object information indicating a gift sent from another viewing user. The gift object information includes at least gift object identification information that identifies the type of the gift object and position information that indicates the position where the gift object is displayed.

Then, the distribution start portion can live-distribute the video via the video distribution platform described above.

Figure 8:
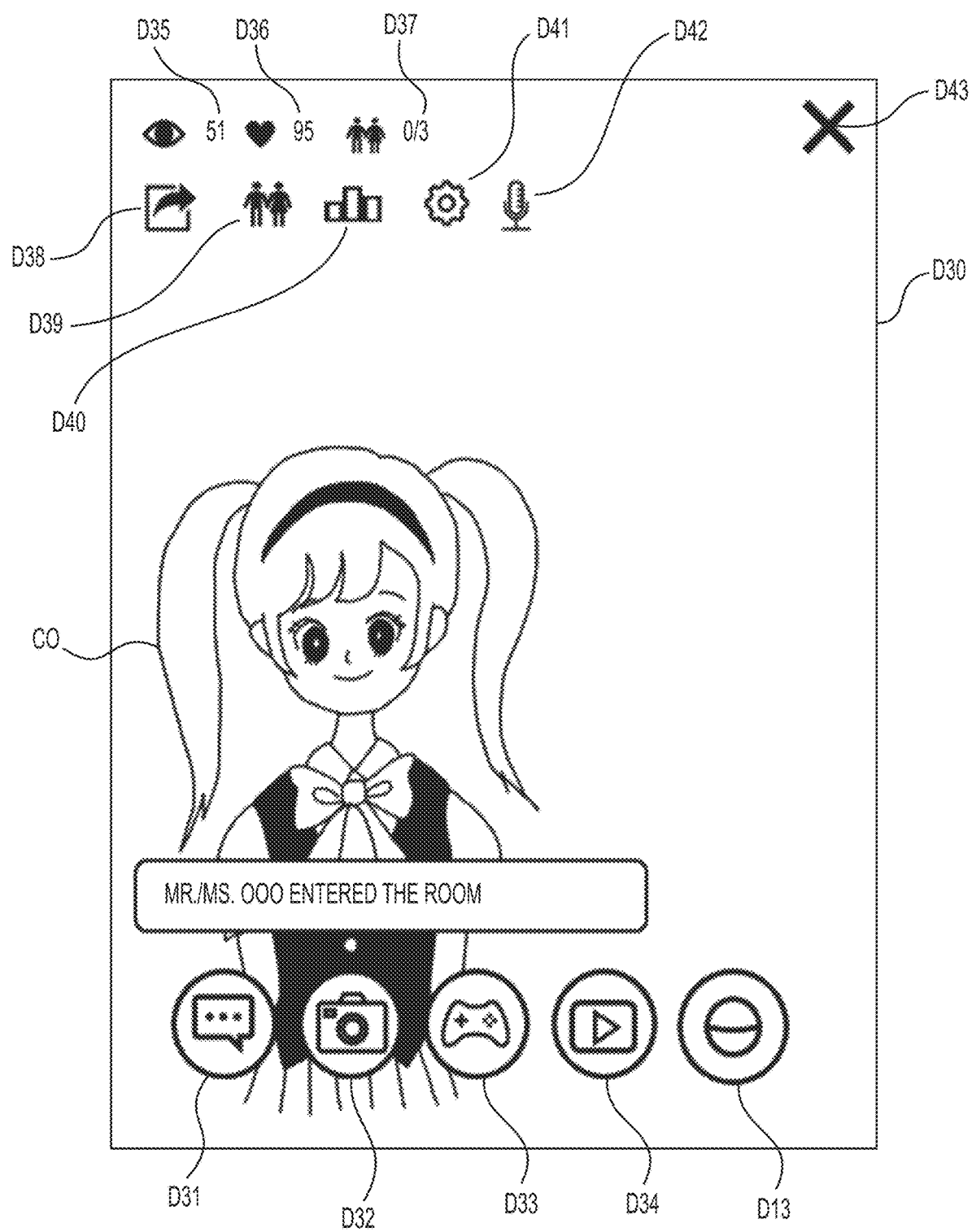
FIG. 8 is a conceptual diagram showing an image of a screen displayed on a user terminal.

FIG. 8 shows the avatar distribution screen D30 displayed on the distributing user terminal 2100.

In addition to displaying the character object CO on the avatar distribution screen D30, a comment input button D31 for the distributing user to input a comment, a photo button D32 for saving a still image of the screen, a play start button D33 for playing a game described later, an external service liaison button D34 for viewing a video provided by an external service, and the gacha button D12 for obtaining an avatar part can be displayed.

Additionally, a cumulative number-of-viewers display D35, a cumulative number-of-likes display D36, a number-of-collaborators display D37, a share button D38 for an external SNS, a guest details button D39, a ranking display button D40, a setting button D41, and a voice switching button D42 for switching voice ON/OF can be displayed. Further, an end button D43 for ending the distribution is also displayed.

Although detailed description of these displays and buttons is omitted, it is possible to change the distribution settings set on the distribution setting screen D20 by selecting the setting button D41.

FIG. 8 shows an example of starting distribution in which the distribution setting screen D20 allows other users to appear in the first video, and the number of people who can appear in the first video is three. Therefore, the character object CO is displayed in a state of being closer to the lower left. Up to three character objects of other users are in a state of being able to appear in a vacant space.

The above is a description of the screen transition when the avatar distribution of this disclosure is performed.

Subsequently, the screen transition when the distributing user plays a game during distribution will be described.

The one or more computer processors in this disclosure may include a game request receiving portion, a game video distributor, and a game display processor.

The distributing user can request to start playing the game by selecting the play start button D33 during the avatar distribution as shown in FIG. 8.

The game displayed by selecting the play start button D33 is a dedicated game implemented in the application realized by the information processing system in this disclosure, and is different from a general-purpose game provided by an external service. Therefore, the game distribution in this disclosure may be distinguished from the distribution of a general-purpose game play video provided by an external service together with a live broadcast of the distributing user.

Alternatively, the play start request may be transmitted from the distributing user terminal 2100 to the information processing device 2400 by selecting the play start button arranged on a predetermined screen displayed on the distributing user terminal 2100 of the distributing user.

Figure 9:
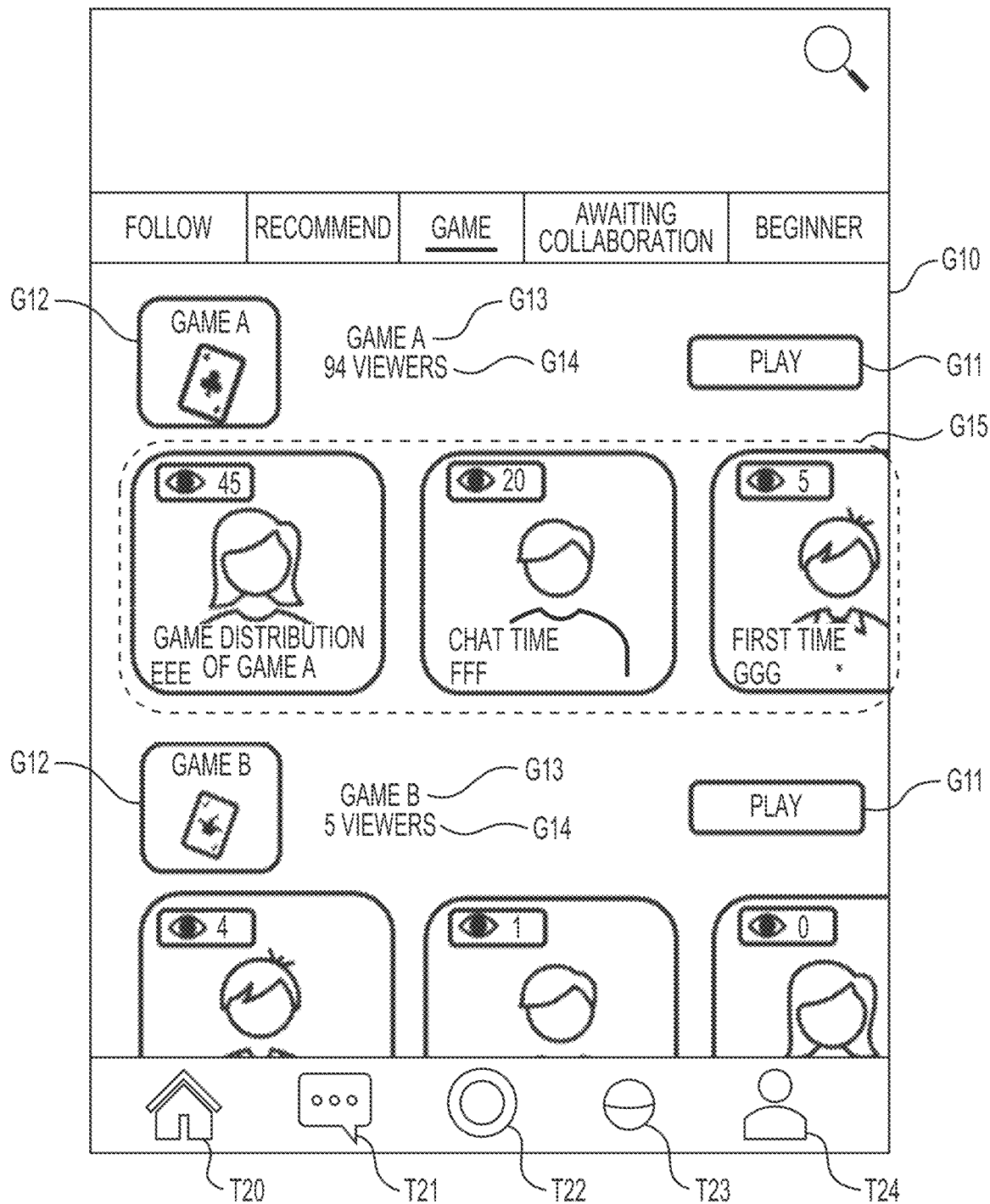
FIG. 9 is a conceptual diagram showing an image of a screen displayed on a user terminal.

FIG. 9 shows an example of a screen G10, in which a play start button G11 is arranged, as the predetermined screen. The screen G10 shown in FIG. 9 is a screen that has transitioned from the top screen T10 (FIG. 5) displayed on the user terminal that has started the application realized by the information processing system in this disclosure by selecting the game tab T15.

At least the play start button G11 that can transmit a request to start play of a predetermined game is displayed on the screen G10.

Then, when the game request receiving portion receives the request to start play of the predetermined game, the game video distribution portion distributes the information about a second video to the viewing user terminal.

Here, the second video is a play video of a predetermined game. In this specification, distributing such a video so that it is displayed on the screen of the viewing user terminal 2200 is called "game distribution."

Further, as a distributing user, after starting the application realized by this disclosure, the user can transmit the request for the start of distribution of the second video to the information processing device 2400 by selecting a play start object arranged on the game list screen and the game detail screen.

The game list screen or the game details screen is a first screen to be described in detail below.

That is, the game display processor performs display processing of the first screen including (i) a distribution start object that can transmit a distribution start request, (ii) a play start object that can transmit a play start request for a predetermined game, and (iii) a thumbnail image of a video that is distributing a play video for a predetermined game.

The screen G10 shown in FIG. 9 corresponds to the game list screen of the first screen. The first screen, which is the game list screen, is a screen that has transitioned from the top screen T10 by selecting the game tab T15.

The first screen includes (i) the distribution preparation button T22 as a distribution start object, (ii) the play start button G11 as a play start object, and (iii) a thumbnail image showing a distribution channel of a video.

On the first screen, for each of a plurality of playable games, the play start button G11, a game icon G12, game name G13, a total number-of-viewers G14 of the distribution channel of the game, and a distribution list G15 including thumbnail images of the distribution channels during the game distribution are displayed.

The order of the thumbnail images displayed in the distribution list G15 displayed here may be different depending on the viewing user. As an example, the order is arranged in the order of (i) the order in which the number of viewing users following and the number of views by the viewing users are highest, (ii) the order in which the cumulative number of viewers is highest, and (iii) the order in which the distribution start is oldest. Additionally, the display range of the thumbnail images of the distribution list G15 can be changed by horizontal scrolling.

Additionally, the games displayed on this game list screen will read the top 10 titles with the following priorities. As an example, the priority is determined by (i) the order of newest date of the last play by the viewing user within 30 days within 48 hours from the game distribution start date and time, (ii) the order of priority of a period ID, and (iii) the descending order of the period ID.

This distribution list G15 will be updated (i) when returning from the screen of another tab and (ii) when performing a refresh operation (Pull-to-Refresh).

Figure 10:
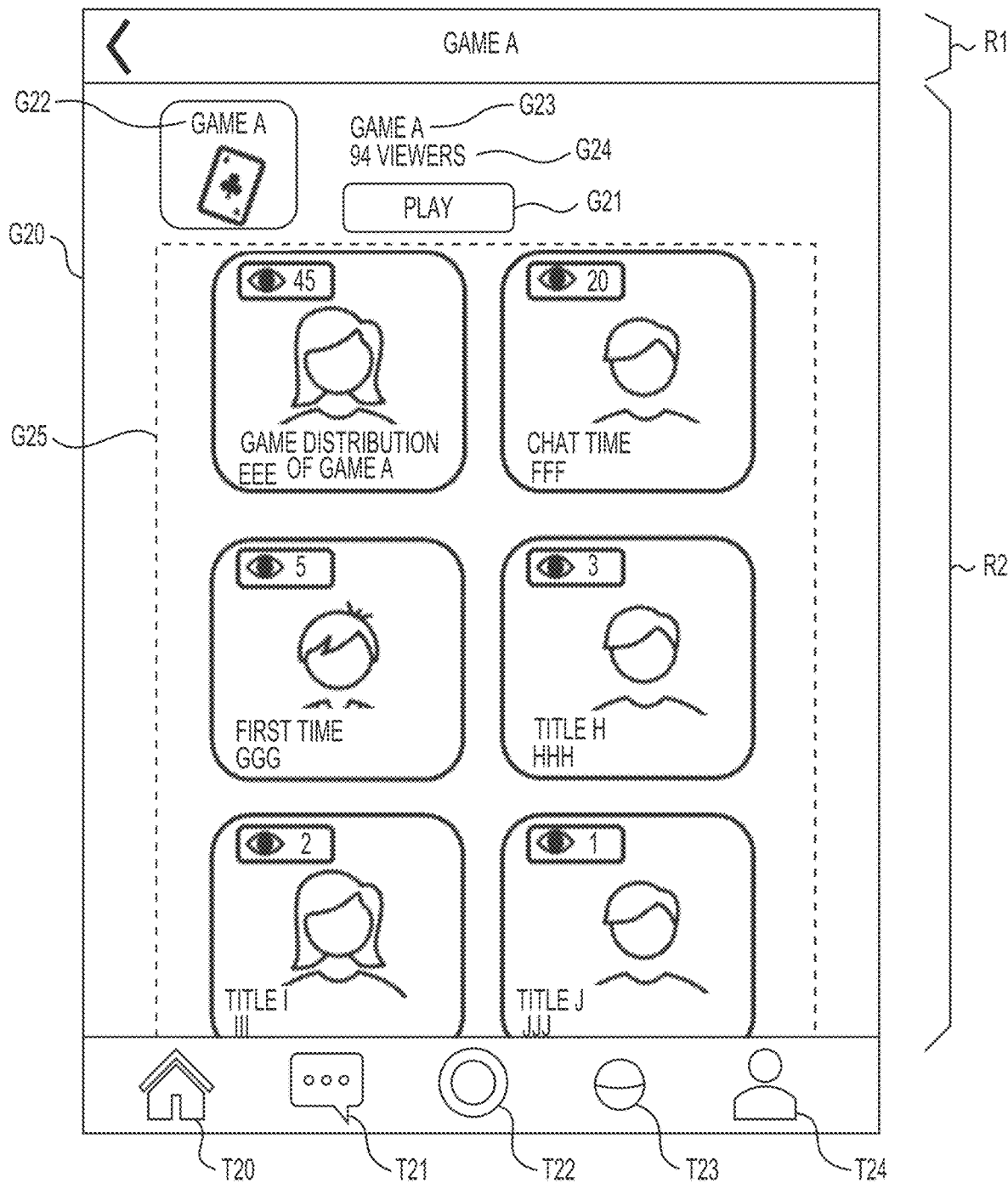
FIG. 10 is a conceptual diagram showing an image of a screen displayed on a user terminal.

FIG. 10 corresponds to the game detail screen of the first screen. The first screen, which is the game detail screen, is a screen that has been transitioned by selecting the game icons G12 or the game name G13 displayed on the game list screen shown in FIG. 9, and is G20.

The first screen includes the distribution preparation button T22 which is a distribution start object, a play start button G21 which is a play start object, and thumbnail images showing a video distribution channels.

Further, on the first screen, a game icon G22, a game name G23, a total number-of-viewers G24 of the distribution channel of the game, and a distribution list G25 including thumbnail images of the distribution channel being distributed in the game are displayed.

The order of the thumbnail images displayed in the distribution list G25 displayed here may be different depending on the viewing user. As an example, the order is arranged in the order of (i) the order in which the number of viewing users following and the number of views by the viewing users is highest, (ii) the order in which the cumulative number of viewers is highest, and (iii) the order in which the distribution start is oldest. Additionally, the display range of the thumbnail images of the distribution list G25 can be changed by vertical scrolling.

This distribution list G25 will be updated (i) when returning from the screen of another tab and (ii) when performing a refresh operation (Pull-to-Refresh).

As described above, the user who selects the distribution start object or the play start object becomes a distributing user who makes the distribution start request or the play start request.

Further, the user who selects a thumbnail image becomes a viewing user who views the second image.

Further, the first screen includes a first region where scrolling operation is not possible and a second region where scrolling operation is possible.

The first screen referred to here is the first screen shown in FIG. 10. The first screen includes a first region R1 and a second region R2. Specifically, the game title is displayed in the first region R1, and the play start button G21, the game icon G22, the game name G23, the number of viewers G24, and the distribution list G25 described above are displayed in the second region R2.

The first region R1 is a portion that cannot be scrolled and is fixedly displayed on the display screen, and the second region R2 is a portion that can be scrolled by the user. By scrolling the second region R2, the user can check the thumbnail images hidden outside the screen.

However, since the play start button G21 may be hidden outside the screen by scrolling in the second region, the display processor in this disclosure can display a play start object (play start button G21) in the first region R1 according to a display state of a play start object (play start button G21) displayed in the second region R2.

Figure 11:
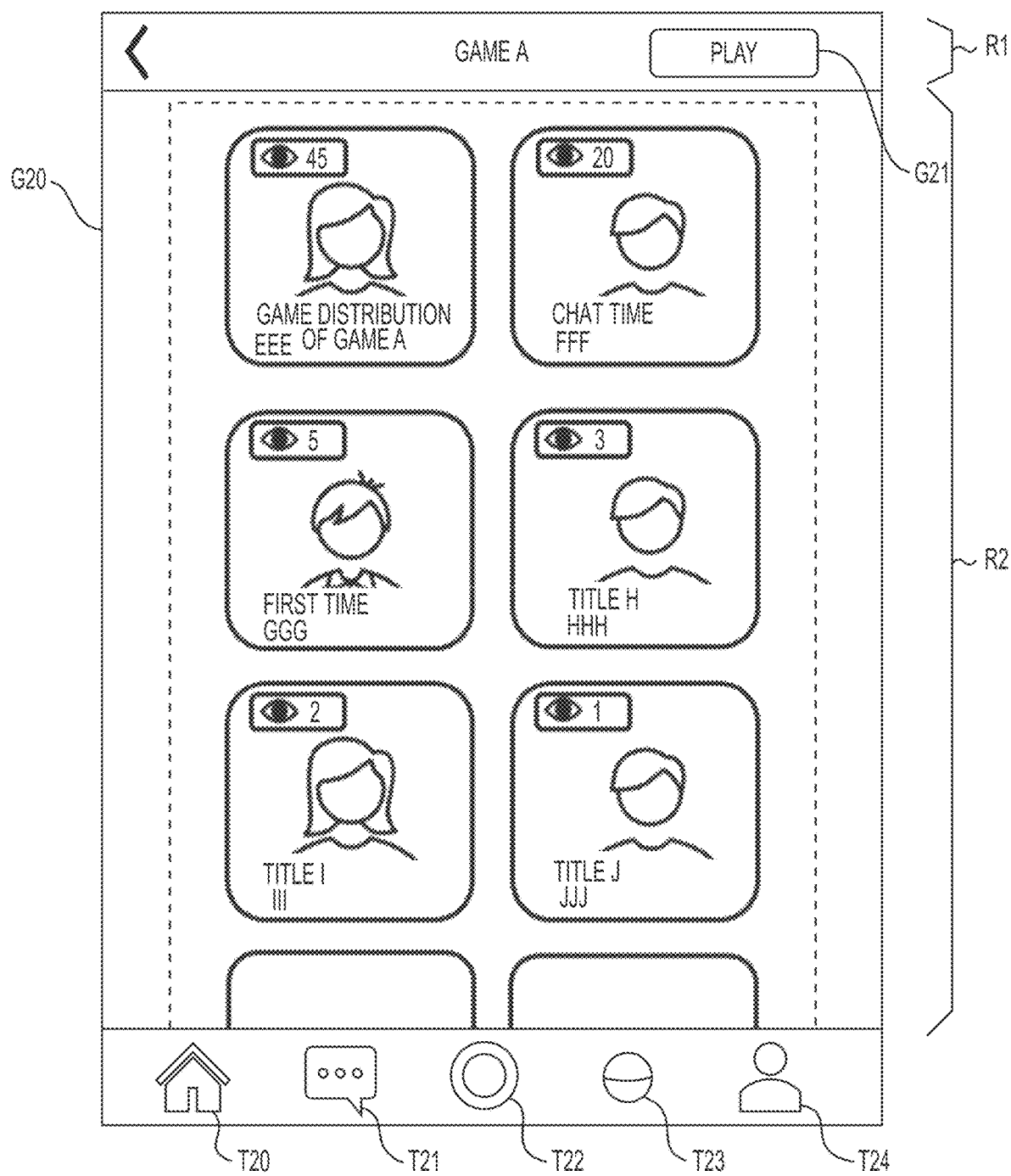
FIG. 11 is a conceptual diagram showing an image of a screen displayed on a user terminal.

As an example, in FIG. 10, the play start button G21 is displayed in the second region R2, but in FIG. 11, it is displayed in the first region R1. That is, when part or all of the play start button G21 is not displayed in the second region R2, the play start button G21 appears in the first region.

Further, the game display processor may display the play start object in the first region R1 in stages according to the display state of the play start object displayed in the second region R2.

Such an expression can be realized by changing the transparency of the play start object according to the scroll amount of the second region R2.

As an example, a scroll amount (unit is pixels) of 0 to 50 is caused to correspond to a button transparency of 0.0 (completely transparent) to 1.0 (completely opaque). Then, in the initial display state, the object is completely transparent and cannot be seen, and when scrolling by 50 pixels or more, the object is completely displayed. During that time (0 to 50), it is preferable to change the transparency of the object linearly. The unit of the scroll amount is a logical pixel, which may be different from an actual pixel of the display.

Further, the game request receiving portion can accept a play end request for a predetermined game from the distributing user terminal 100 after the game video distribution portion distributes information about the second video.

The play end request can be transmitted by selecting the end button arranged on the game screen.

Then, when the game request receiving portion receives the play end request of the predetermined game, the video distribution portion can end the distribution of the information about the second video and distribute the information about the first video.

That is, what is distributed here is not part of the information of the first video, but all the information of the first video.

Then, when the video distribution portion ends the distribution of the information about the second video and distributes the information about the first video, what is displayed on the viewing user terminal 2200 is the first video.

The following is an explanation of the flow to start viewing the video.

The one or more processors in this disclosure may further include a viewing receiver.

The viewing receiver receives a video viewing request from the user.

The video distribution portion distributes video and voice information as video information to the user's information processing terminal in response to the viewing request.

Figure 12:
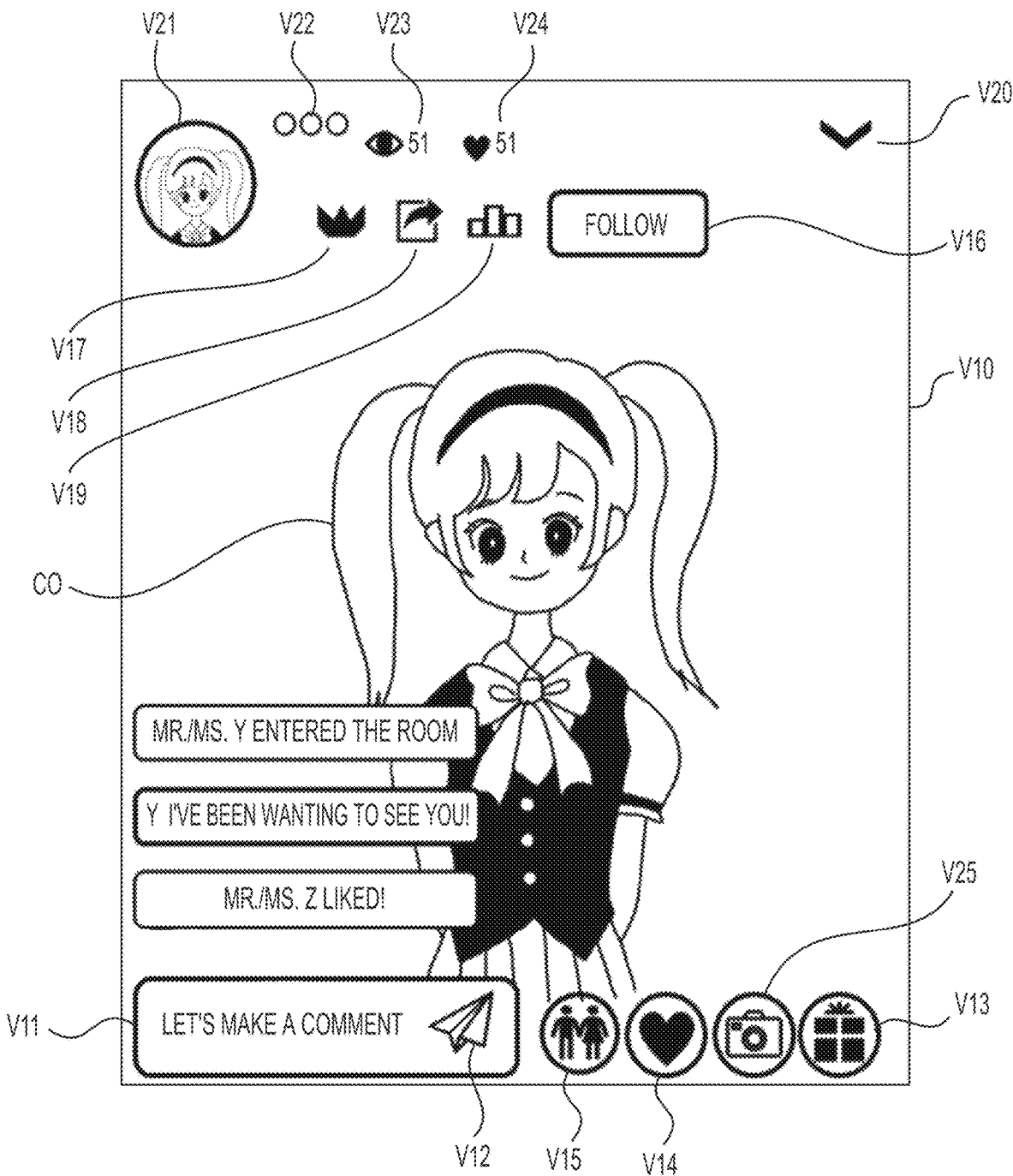
FIG. 12 is a conceptual diagram showing an image of a screen displayed on a user terminal.

FIG. 12 is an example showing a viewing screen V10 of an avatar video displayed on the viewing user terminal 2200.

The viewing user can post a comment by inputting text in a comment posting field V11 and pressing a send button V12.

Further, by pressing a gift button V13, a gift list (screen V30 in FIG. 13) is displayed to the viewing user, and a display request for the gift designated by selection can be transmitted.

At this time, the one or more processors in this disclosure may include a determination portion. The determination portion determines whether there is a gift display request from the viewing user terminal 2200.

The display request can include gift object information. The gift object information includes at least (i) gift object identification information that identifies the type of the gift object and (ii) position information that indicates the position where the gift object is displayed.

Figure 13:
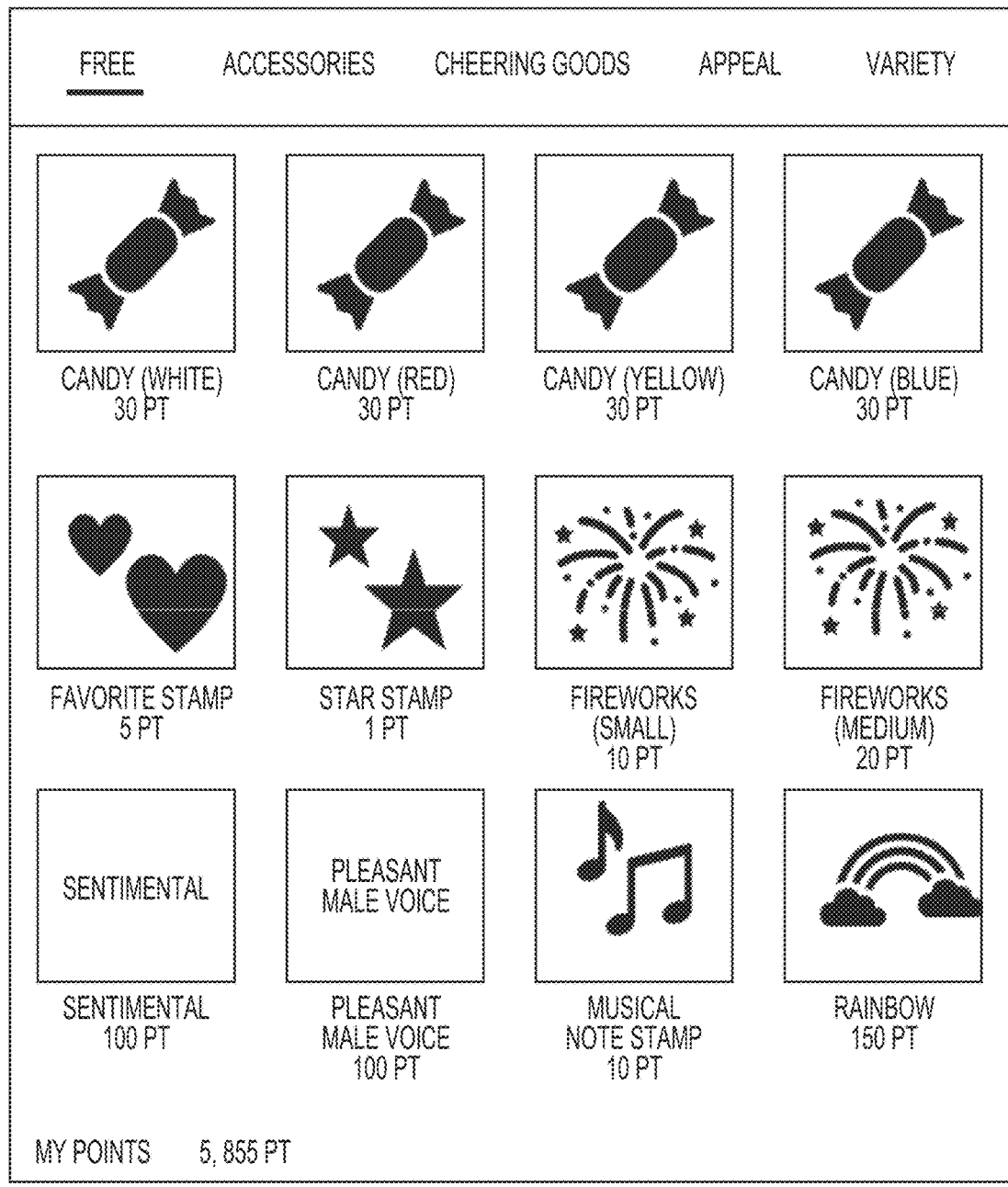
FIG. 13 is a conceptual diagram showing an image of a screen displayed on a user terminal.

Further, as shown in FIG. 13, gifts can be displayed separately for each category (free (paid) gifts, accessories, cheering goods, appeal, variety, or the like).

Here, a paid gift is a gift that can be purchased by the consumption of "My Coin" purchased by the viewing user. A free gift is a gift that viewers can obtain for free with or without consumption of "My Points."

The term "gift" used in this application means the same concept as the term "token." Therefore, it is also possible to replace the term "gift" with the term "token" to understand the technology described in this application.

Furthermore, the viewing user can post a rating showing favor by pressing a like button V14. In addition to/in place of the like button V14, it is also possible to display a button for posting a negative evaluation or other emotions.

Additionally, if the distributing user has set whether to allow other users to appear in the distribution setting, a request for appearance in the video can be sent by selecting a collaboration request button V15.

Additionally, a follow button V16 for the viewing user to follow the distributing user is displayed on the screen of a video distributed by a distributing user that the viewing user has not yet followed. This follow button functions as a follow release button on the screen of a video distributed by a distributing user that the viewing user is already following.

This "follow" may be performed from a viewing user to a viewing user, from a distributing user to a viewing user, and from a distributing user to a distributing user. However, this "follow" is managed as a one-way association, and a reverse association is managed separately as a follower.

Additionally, a photo button V25 for saving a still image on the screen can also be displayed.

Further, a cheering ranking display button V17, a share button V18, and a ranking display button V19 are also displayed on the viewing screen V10.

The cheering ranking displays the ranking of the viewing user who cheers the distributing user, and the ranking can be calculated according to the amount of gifts (points/coins) or the like.

Additionally, regarding the sharing of videos, the viewing user can check a list of SNS (Social Networking Services) that can be shared by pressing the share button V18, and can send a fixed link to a designated location of the SNS designated by selection.

Furthermore, by pressing the collaboration application button V15, it is possible to request collaborative distribution from the distributing user. Collaborative distribution means that the character object of the viewing user is caused to appear in the distribution video of the distributing user.

At the top of the viewing screen V10, a distributing user icon V21, a distributing user name (character object name) V22, a cumulative number-of-viewers display V23, and a cumulative number-of-likes display V24 can be displayed.

Further, when the viewing end button V20 is selected, a screen for ending viewing appears, and a viewing end request can be transmitted.

The screen for ending such viewing will be described in detail. Such a screen is called "small window voice distribution," and is for viewing a video in a manner of playing only the voice while displaying the video.

The selection of the viewing end button V20 is accepted by the viewing receiver as a video viewing end request.

At this time, the video distribution portion ends the distribution of the video-related information in response to the viewing end request, but does not end the distribution of the voice-related information.

Then, when the video/voice-related information is distributed at the user terminal, the video is displayed on the main screen at the user terminal, and when only the voice information is distributed, the video is not displayed at the user terminal and a sub screen indicating that the video is being viewed is displayed.

Figure 14:
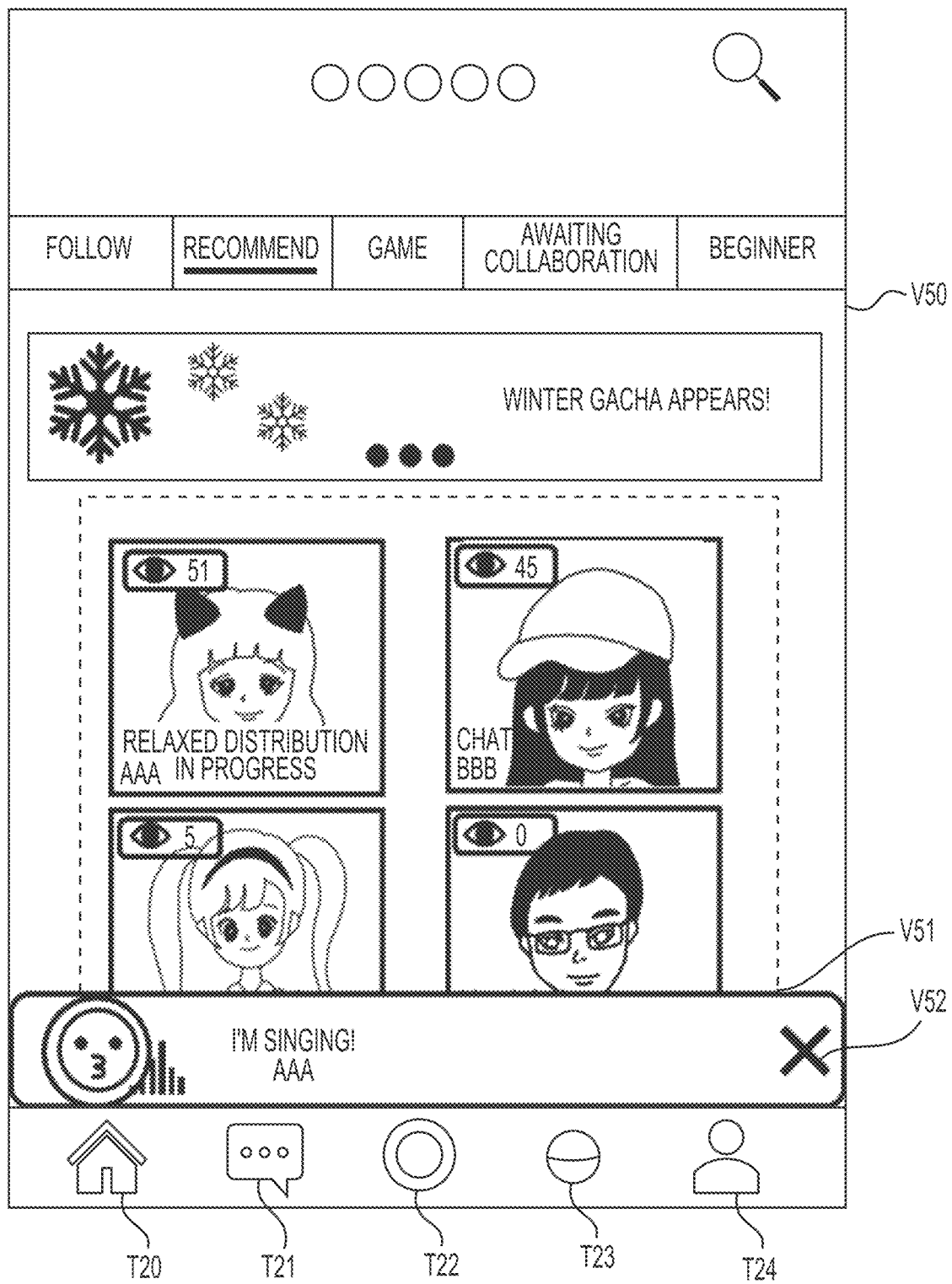
FIG. 14 is a conceptual diagram showing an image of a screen displayed on a user terminal.

FIG. 14 shows an image of a screen V50 on which a sub screen V51 is displayed.

When this sub screen V51 is displayed, the main screen displayed on the back transitions to the screen before viewing the video. For example, when moving from a recommendation tab to the viewing frame, the display returns to the recommendation tab, and when moving from the follow tab to the viewing frame, the display transitions to the follow tab.

When this sub screen V51 is being displayed, operation on the main screen becomes possible, and transition to another screen becomes possible.

On the sub screen V51, a profile image, a name, a title, and a voice icon that can visually identify that voice is playing are displayed.

Then, by selecting an end icon V52 displayed on the sub screen V51, the viewing can be completely ended.

Regarding the end of the display of the video, the information may be transmitted from the server device, but not displayed at the terminal side, or the transmission of the information itself from the server device may be stopped.

With such a configuration, it becomes possible to search for other distributions and enjoy chatting with other users while listening only to sound.

Next, a "collaboration" in which another user appears in the video of the distributing user will be described.

As described above, the viewing user can send a request to participate in the video via the confirmation screen of the collaborative distribution participation request displayed by pressing the collaboration request button V15 shown in FIG. 12.

A collaboration avatar display portion included in one or more computer processors in this disclosure causes the video to display a character object generated based on the movement of the viewing user who made the participation request in response to the participation request received by the receiver.

Figure 15:
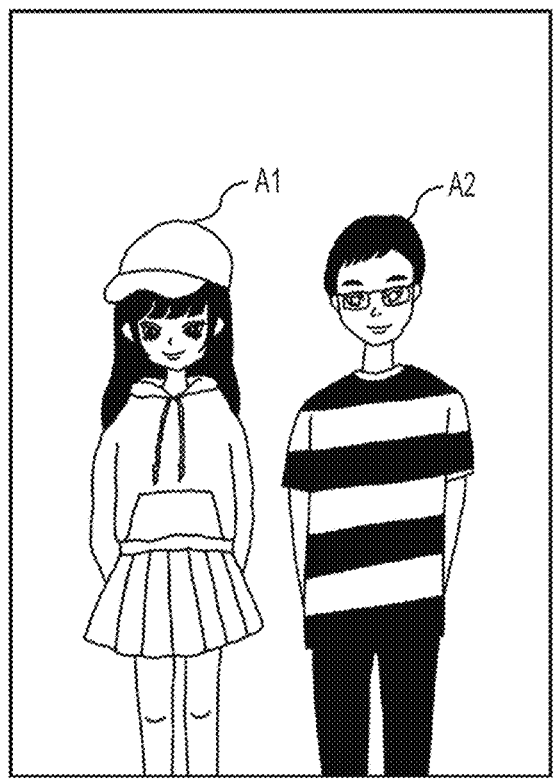
FIG. 15 is a conceptual diagram showing an image of a screen displayed on a user terminal.

FIG. 15 shows, as an example, a viewing or distribution screen when a second avatar A2, which is a character object of a guest user, participates in a video in which the first avatar A1, which is the character object of the host user, is displayed. In FIG. 15, the display of objects other than the avatars is omitted.

Figure 16:
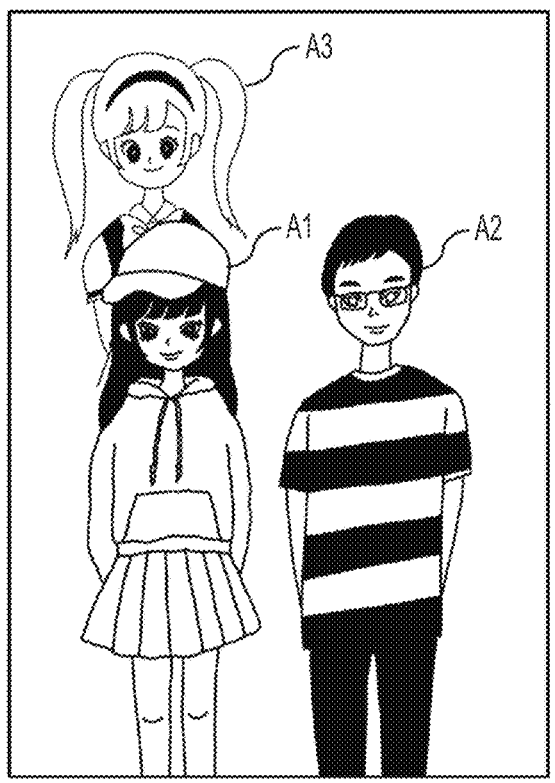
FIG. 16 is a conceptual diagram showing an image of a screen displayed on a user terminal.

Further, as shown in FIG. 16, a third avatar A3, which is a character object generated based on the movement of another viewing user, may participate in the video. Additionally, although the third avatar A3 is arranged behind the first avatar A1 and the second avatar A2 in FIG. 16, the three people may be arranged so as to line up in a horizontal row. Further, the arrangement position of the avatars may be designated by the distributing user.

Figure 17:
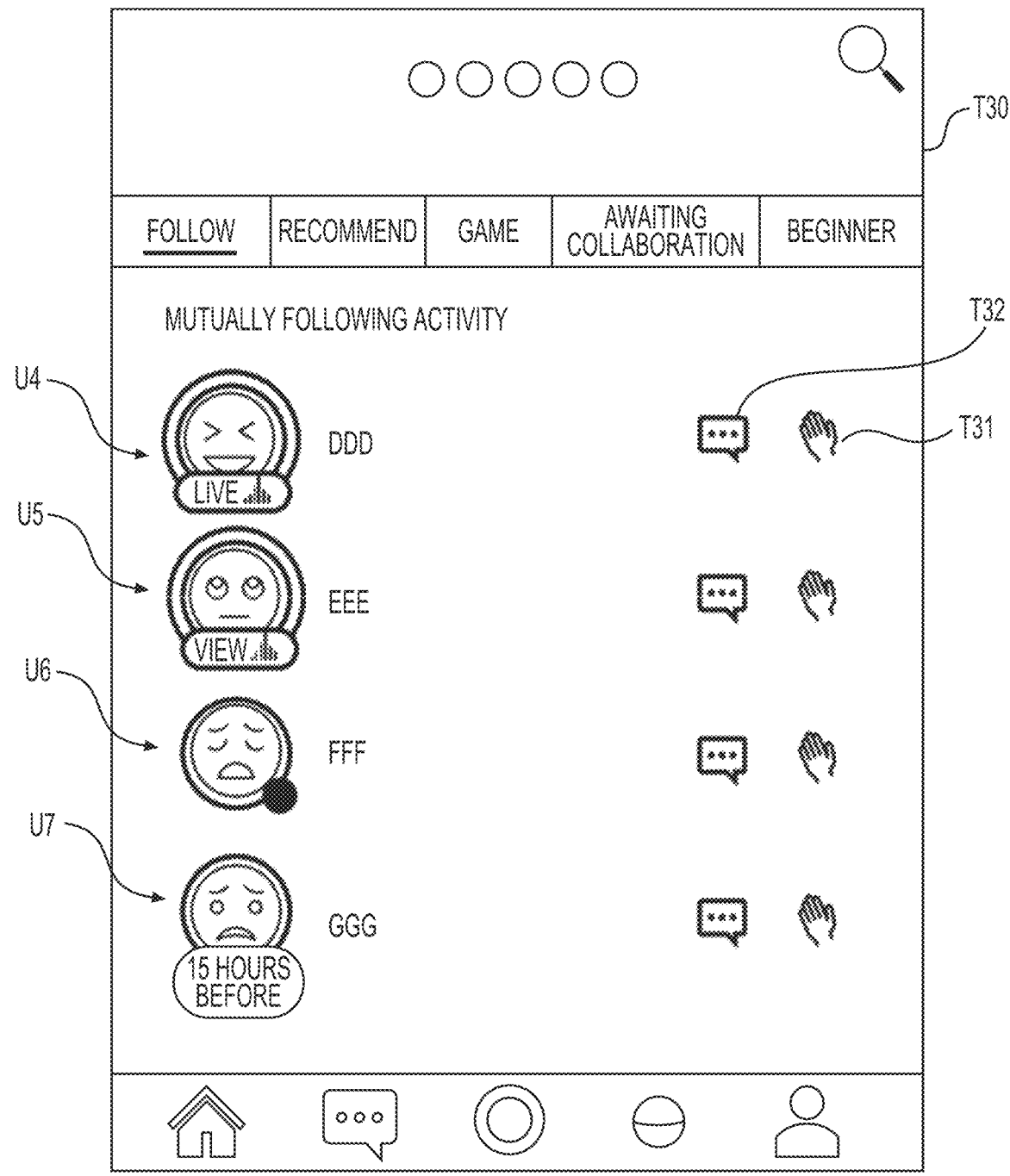
FIG. 17 is a conceptual diagram showing an image of a screen displayed on a user terminal.

FIG. 17 shows a list screen T30 of users having a mutual follow relationship, which is displayed by selecting the follow tab on the top screen shown in FIG. 5. Mutual follow is a relationship in which each is a follower of the other.

On the list screen T30, profile images and names of users who have a mutual follow relationship are displayed.

As shown in FIG. 17, it is assumed that a first object T31 is displayed on the list screen T30 for each of the users having a mutual follow relationship. Further, a chat object T32 may be displayed together with the first object T31. By selecting this chat object, it is possible to transition to an individual chat screen with the second user.

The first object T31 transmits a predetermined notification to the terminal of the user associated with the first object T31.

The predetermined notification may be, for example, a call notification.

First Embodiment

Subsequently, various functions that can be executed in the first user terminal 100, the second user terminal 200, and/or the server device 400 included in the information processing system 3000 according to a first embodiment of this disclosure will be described with reference to the drawings.

Figure 18:
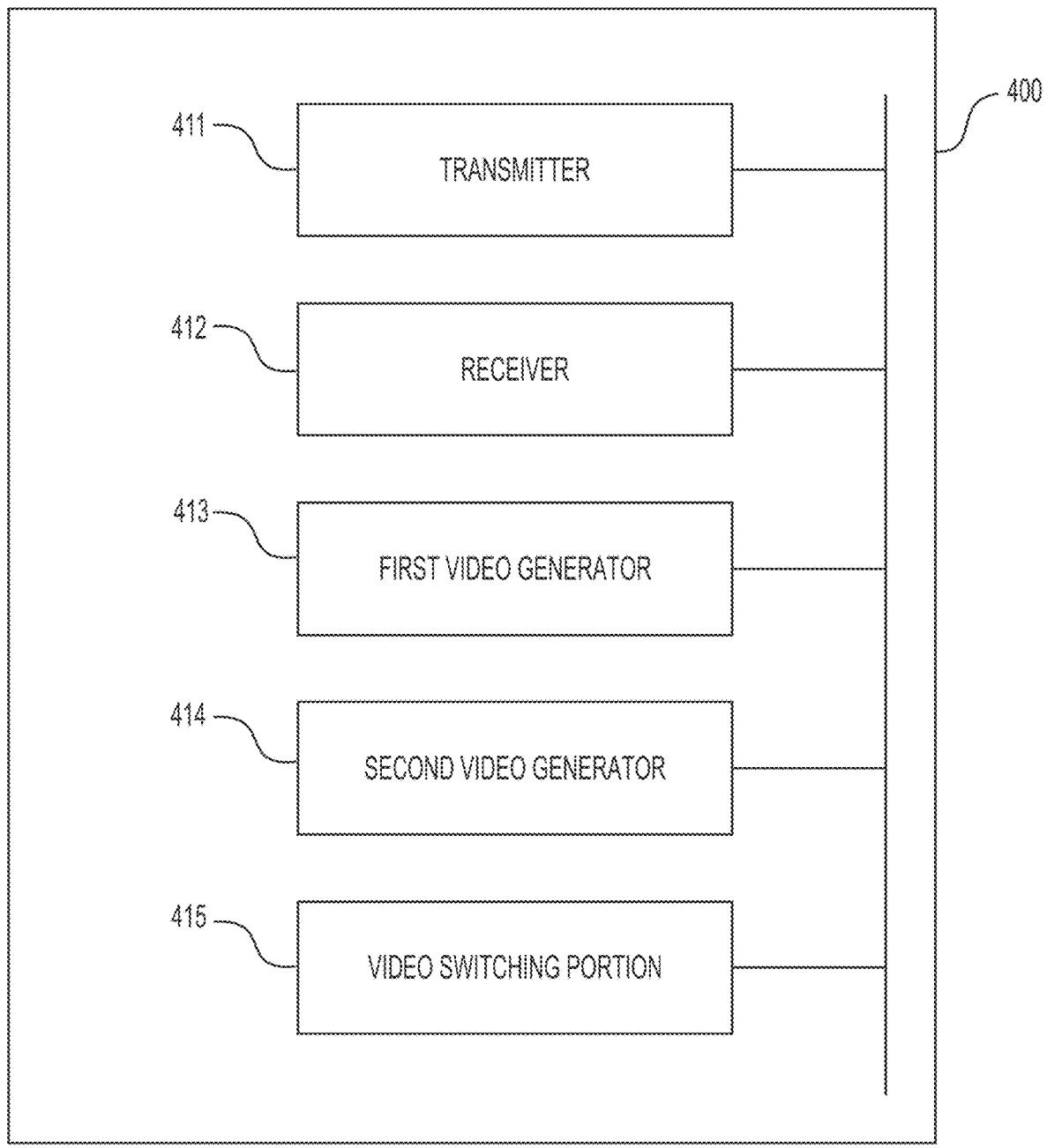
FIG. 18 is a configuration diagram showing an example of a functional configuration of a server device according to a first embodiment of this disclosure.

As shown in FIG. 18, the one or more computer processors included in the information processing system 3000 according to the first embodiment of this disclosure include a transmitter 411, a receiver 412, a first video generator 413, and a second video generator 414, and a video switching portion 415.

Here, the transmitter 411, the receiver 412, the first video generator 413, the second video generator 414, and the video switching portion 415 are all described as being provided in the server device 400, but the description is not limited to this.

The transmitter 411 transmits, to the second user terminal 200 of a second user, information about a video including the character object of a first user.

Figure 19:
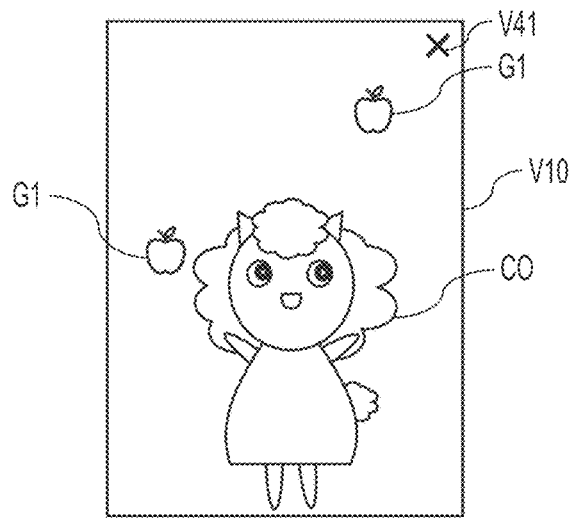
FIG. 19 is a conceptual diagram showing an image of a screen displayed on a user terminal.

The video can be a video including a character object CO of the first user, as shown as an example in FIG. 19.

The information about the video may be any information that enables the video to be viewed on the second user terminal 200, and the rendering of the video may be performed at the server device 400 or the first user terminal 100, or may be performed at the second user terminal 200.

The movement of the face of the first user taken by a camera (here, a front camera as an example) included in the first user terminal 100 may be reflected in at least the face of the character object CO included in the video.

The receiver 412 receives a display request for the first object from the second user terminal 200.

Figure 20:
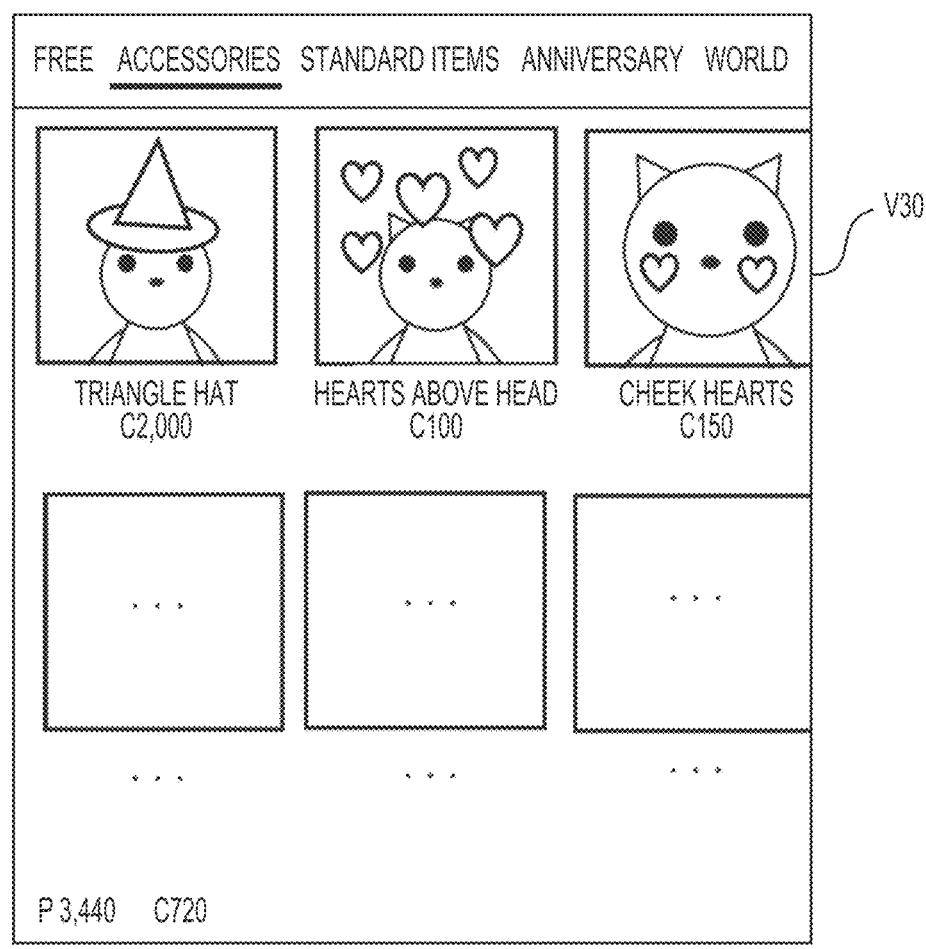
FIG. 20 is a conceptual diagram showing an image of a screen displayed on a user terminal.

The first object can be, for example, the gift object described above. As shown in FIGS. 13 and 20, the second user can send a display request for a desired gift object(s) from the gift list screen V30 displayed on the second user terminal 200. Points (P, pt) shown in the figures are available to the user free of charge for rewards and events in this system. Coins (C) shown in the figures can be obtained for a fee by being purchased by the user.

The first video generator 413 generates first information for displaying in a first region in the virtual space, as a first video, (i) a character object of the first user and (ii) a first object.

The above first information differs depending on the content of the video, but as an example, in the case of a video in which the character object of the distributing user appears as described above, motion information indicating the movement of the character object, voice information of the distributing user, gift object information that indicates a gift sent by the viewing user, and the like are included. Additionally, the gift object information includes, at least, (i) gift object identification information that identifies the type of gift object and (ii) location information that indicates a position at which the gift object is displayed.

FIG. 19 shows an image of the screen V10 displaying the first video displayed on the display portion of the first user terminal 100 and/or the second user terminal 200. The screen V10 shown in FIG. 19 includes at least the character object CO and the first object G1. Although omitted in FIG. 19, various display and operation UIs may be superimposed and displayed as shown in FIGS. 8 and 12.

The second video generator 414 generates second information for causing a second object S1 different from the first object G1 to be displayed in a second region in the virtual space, as the second video, and for displaying the character object CO of the first user so as to be movable in the first region and the second region.

Unlike the first object G1, the second object S1 is not displayed in response to a display request from the second user terminal 200, but the server device 400 (system side) controls its display position and timing.

Figure 21:
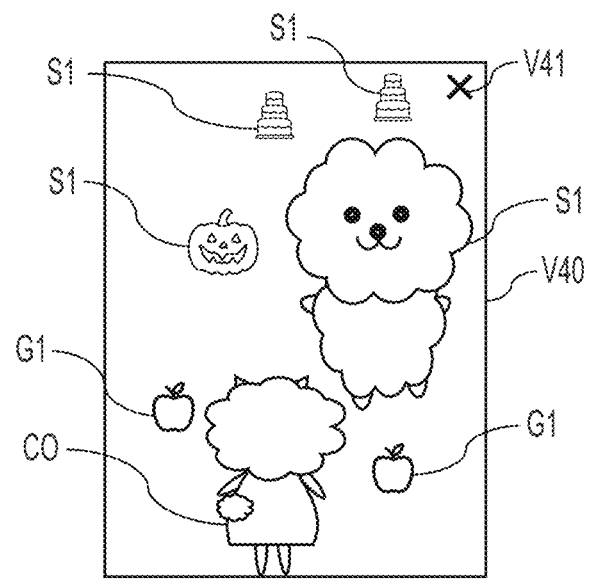
FIG. 21 is a conceptual diagram showing an image of a screen displayed on a user terminal.

FIG. 21 shows an image of a screen V40 displaying the second video displayed on the display portion of the first user terminal 100 and/or the second user terminal 200. The screen V40 shown in FIG. 21 includes at least a character object CO and second objects S1. Although omitted in FIG. 21, various display and operation UIs may be superimposed and displayed as shown in FIGS. 8 and 12.

Here, the image of an expansion of the virtual space in this disclosure will be described in detail with reference to FIG. 22.

Figure 22:
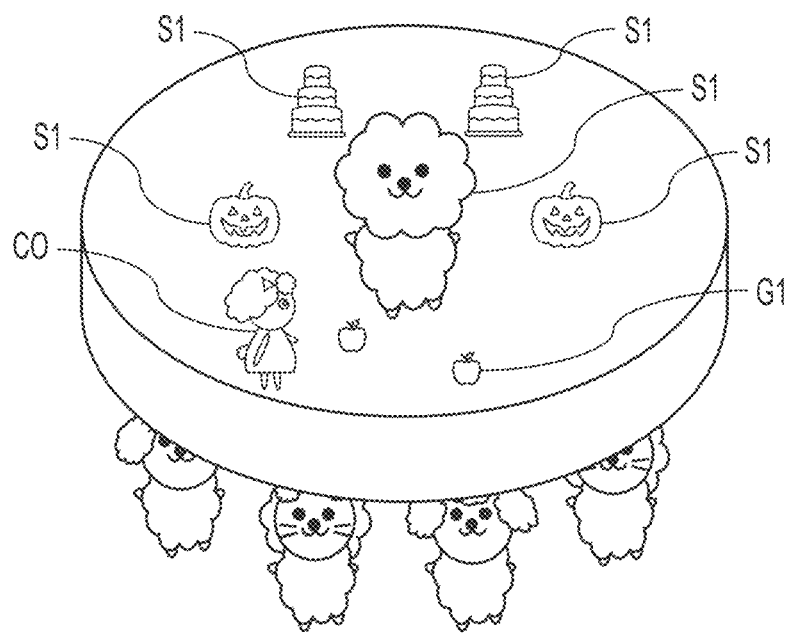
FIG. 22 is a conceptual diagram showing an image of a virtual space in this disclosure.

As shown as an example in FIG. 22, the virtual space in this embodiment is arranged so that a disk-shaped island (world) is floating in the air. This island is an object in the form of a tower-shaped cake with its top and bottom reversed, and various objects can be arranged on the disk-shaped ground. Additionally, this island and the ground are shown as an example, and their display modes are not particularly limited.

As the objects, at least the above-mentioned character object CO, first object G1, and second objects S1 can be displayed.

In this way, it is the "world" that is provided as the content of the second video, and the "world" proceeds by executing the above-mentioned "world function."

Figure 23:
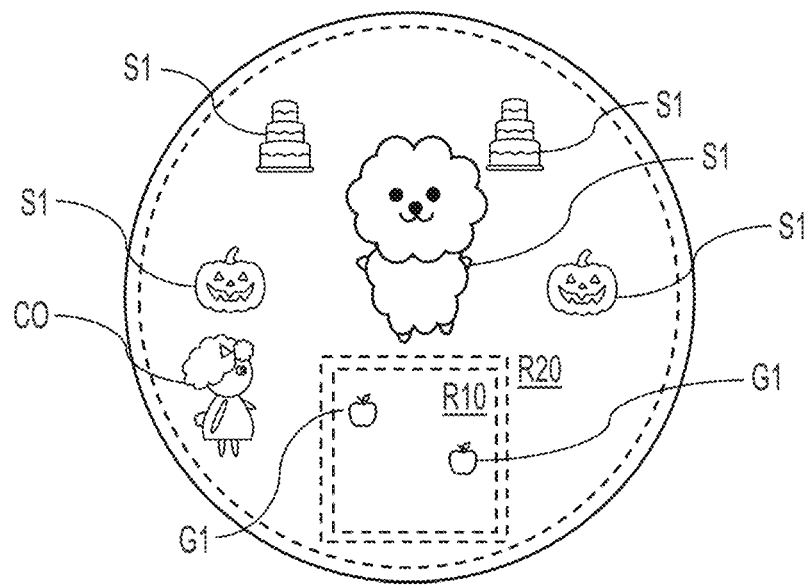
FIG. 23 is a conceptual diagram showing an image of a virtual space in this disclosure.

FIG. 23 is a top view of the ground shown in FIG. 22, and is an image diagram for explaining the first region and the second region in the above configuration. Each object is drawn in a front view for ease of viewing.

As shown in FIG. 23, the regions in which the character object CO can move can be a first region R10 and a second region R20 in the virtual space.

The first region R10 and the second region R20 may be continuous regions, and their positional relationship and shape are not particularly limited.

Figure 24:
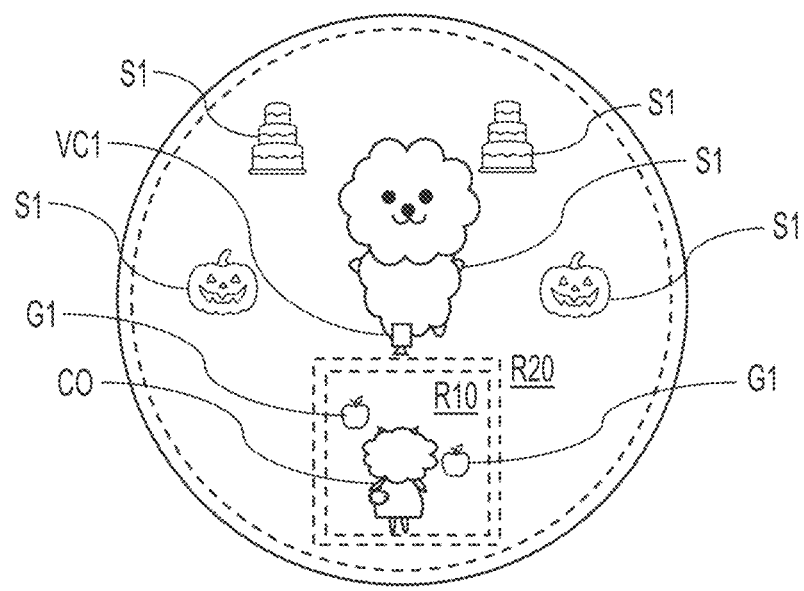
FIG. 24 is a conceptual diagram showing an image of a virtual space in this disclosure.

As an example, the first video is generated as an image obtained by capturing the first region R10 from a position of a virtual camera VC1 shown in FIG. 24 (FIG. 19). The position, orientation, and the like of the virtual camera VC1 can be changed within a predetermined range by the operation of the first user.

Figure 25:
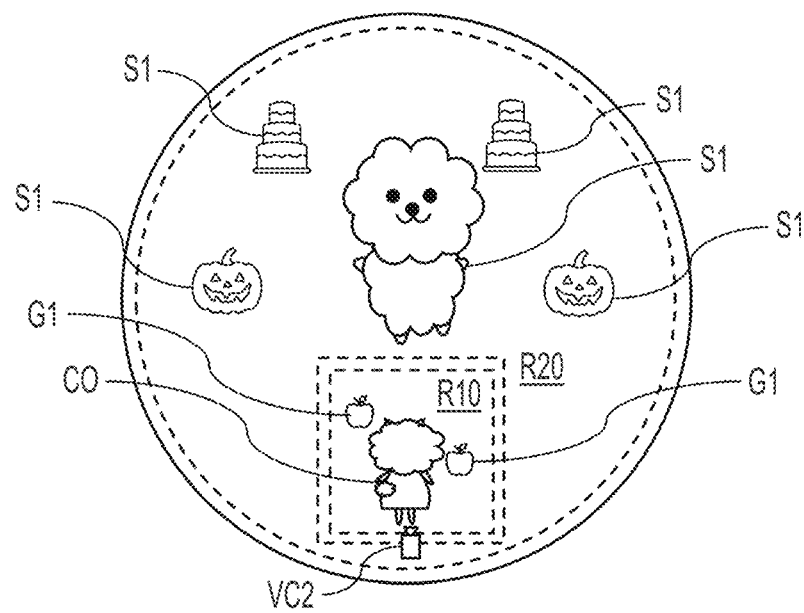
FIG. 25 is a conceptual diagram showing an image of a virtual space in this disclosure.

Further, as an example, the second video is generated as an image obtained by capturing the first region R10 and/or the second region R20 from a position of a virtual camera VC2 shown in FIG. 25 (FIG. 21). The position, orientation, and the like of the virtual camera VC2 can be changed by the operation of the first user, but basically, the virtual camera moves following the movement of the character object CO. The details of a method of operating the virtual camera VC2 will be described later.

Thus, the first video and the second video can be videos taken in the same virtual space (world). Alternatively, the first video and the second video may be videos captured in separate virtual spaces. In this case, the second video is the video taken in the above world.

Furthermore, the configuration may be such that so that a room, which is a private space of the first user provided in the virtual space, may be set as the first region, and the outside of the room, which is a public space, may be set as the second region, and the first user may move back and forth between these regions.

In response to an instruction from the first user terminal 100 of the first user, the video switching portion 415 switches, between the first video and the second video, the video to be displayed on the second user terminal 200.

The above instruction may be transmitted to the server device 400 by an operation on a predetermined operation UI displayed in the first video and the second video displayed on the first user terminal 100.

As an example, switching from the first video to the second video or from the second video to the first video can be performed by selecting the switching button displayed in the first video and the second video.

When the world function as a second video is provided as one of the above-mentioned games, the above-mentioned game distribution start and end procedures can be applied.

Specifically, the switching from the first video to the second video can be performed by selecting the play start button D33 (FIG. 8) of the game displayed in the first video or the play button G11, G21 (FIGS. 9 and 10) of one game selected from among the game list displayed on the previous screen transitioned by selecting the play start button D33.

Further, the switching from the second video to the first video can be performed by selecting the play end button V41 (FIG. 21 or the like) displayed on the second video.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Specifically, first, the presence of two types of videos, the first video and the second video, improves the entertainment value of the videos.

In particular, in the virtual space "world", which is the stage of the second video, an attractive second object is arranged according to a theme, and the character object can move freely and videos can be generated from any viewpoint and any place, thereby making it possible to generate videos that are more personalized than the first video.

Additionally, by generating a video of the above world being explored, it is easy to create topics of discussion in talks and comments.

Also, by making it possible to switch between these two types of videos, the distribution time will inevitably be longer.

Thus, the presence and switching of the two types of videos, the first video and the second video, improve the quality of the video content.

Additionally, by improving the quality of the video content, the viewing motivation of the user who views the video is also improved, and the distribution motivation of the user who distributes the video is also improved as the number of viewing users increases.

Additionally, this increase in motivation to distribute and view will lead to more active interaction between distributing users and viewing users, and further, more active interaction among distributing users and among viewing users.

The virtual space displayed by executing the above-mentioned world function has been described as a space for distributing the second video. However, it can be used not only as a space for distributing the second video, but also as a virtual space for a plurality of avatars corresponding to a plurality of users to freely walk around and communicate with each other.

Additionally, one avatar (first user) among the plurality of avatars in the virtual space may be configured to be able to distribute the first video as a distributing user. That is, according to the information processing system of this disclosure, one-to-many video distribution can be performed in a many-to-many metaverse virtual space.

Subsequently, another application example in the first embodiment will be described.

When the video is switched from the first video to the second video by the video switching portion 415, the second video generator 414 can generate second information while maintaining the display of a first object G1 that has already been displayed in the first region.

Specifically, the first objects G1 (apple objects) displayed on the screen V10 of the first video shown in FIG. 19 are continuously displayed even if it is changed to the screen V40 of the second video shown in FIG. 21.

When the video is switched from the second video to the first video by the video switching portion 415, the first video generator 413 can generate the first information while maintaining the display of the first object G1 already displayed in the first region.

Specifically, the first objects G1 (apple objects) displayed on the screen V40 of the second video shown in FIG. 21 are continuously displayed even if it is changed to the screen V10 of the first video shown in FIG. 19. At this time, not only a first object G1 displayed in the first region, but also a first object G1 displayed in the second region may be configured to be continuously displayed by changing the display position.

Additionally, since the display of the first objects G1 is controlled based on the display time set for each first object G1, the display of the first objects G1 ends with the lapse of the display period from the start of the display. The display request of the first object G1 can be made during both the display of the first video and the display of the second video, and in either case, regardless of whether the video is switched in progress, the display of the first object G1 continues until the display period elapses. In other words, since the display time of the gift given by the viewing user is not changed by the operation (action) of the distributing user, the viewing user who gave the gift by consuming coins or the like is not dissatisfied.

The second video generator 414 can change at least a second object S1 to another second object S1 based on a predetermined condition.

Figure 26:
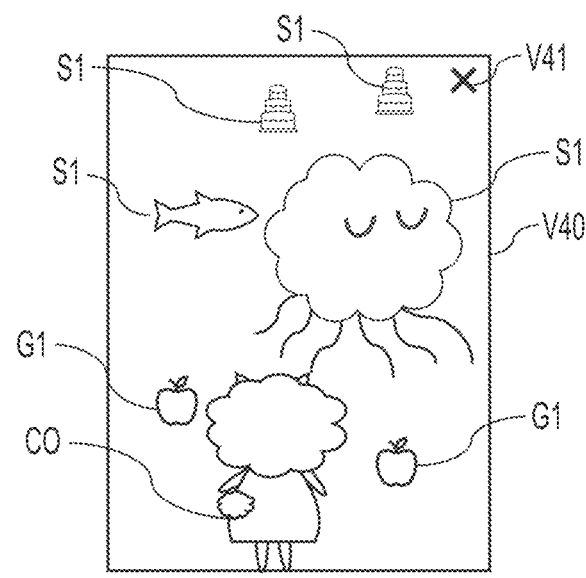
FIG. 26 is a conceptual diagram showing an image of a screen displayed on a user terminal.
Figure 27:
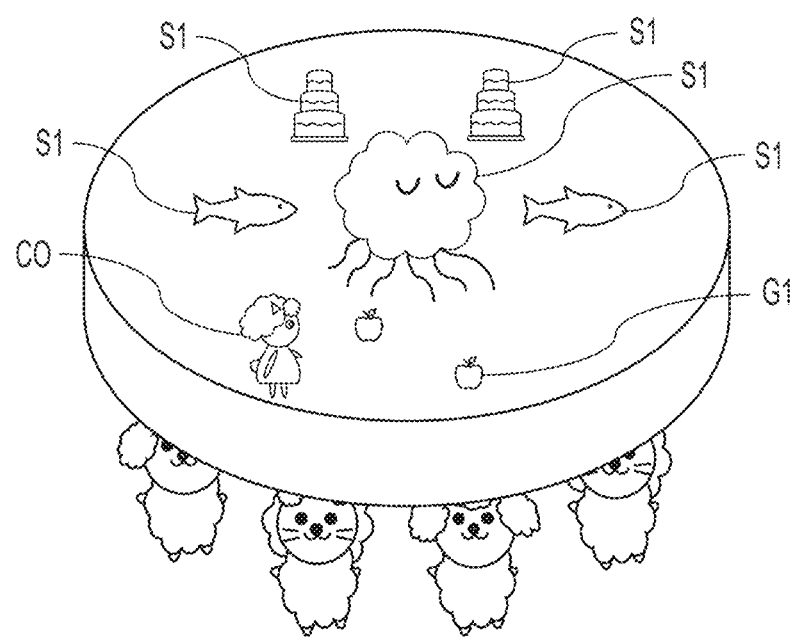
FIG. 27 is a conceptual diagram showing an image of a virtual space in this disclosure.

In the example shown in FIGS. 21 and 22, the second objects S1 are, for example, a dog object, a pumpkin object, a tower cake object, and the like, but among these second objects S1, at least the dog object and the pumpkin objects can be changed to a jellyfish object and fish objects as shown in FIGS. 26 and 27, as an example. Also, there may be a second object(s) S1 that does not change, such as the tower cake object. The change of a second object S1 in this disclosure is referred to as a theme change.

The predetermined condition may be that a scheduled time has arrived, a scheduled period has elapsed, or a change instruction has been received from the first user or another user.

When the predetermined condition is the arrival of a scheduled time, the second video generator 414 changes the second object to another second object when the scheduled time arrives, regardless of the video distribution start time. As an example, the scheduled time can be times at regular intervals such as 10:20, 10:40, and 11:00. Scheduled times can be morning (6:00), noon (12:00), and night (18:00). These times may be changed according to the actual sunrise and sunset times.

Additionally, the arrival of the scheduled time also includes the arrival of a scheduled date and time. In this case, the second video generator 414 changes the second object to another second object when the scheduled date and time arrives, regardless of the distribution start time of the video. As an example, the scheduled date and time can be the start date and time of an event such as October 31st 0:00 (Halloween), December 25th 0:00 (Christmas), and January 1st 0:00 (New Year's Day).

When the predetermined condition is the lapse of a scheduled period, the second video generator 414 changes the second object to another second object when the scheduled period has elapsed from the video distribution start time. As an example, the scheduled period can be 20 minutes, 40 minutes, 60 minutes, or the like at regular intervals from the start of distribution.

When the predetermined condition is that a change instruction from the first user or another user is received, the second video generator 414 changes the second object to another second object upon receiving a change instruction from the first user or another user during the distribution of the video. As an example, the change instruction can be given by selecting the change instruction object displayed on the screen. The other user referred to here includes not only a viewing user, but also a guest user described later.

If the predetermined condition is the arrival of a scheduled time or the lapse of a scheduled period, the scheduled time or the time until the second object will be changed may be displayed in the video.

Furthermore, the second video generator 414 may generate the second information while maintaining the display of a first object G1 already displayed in the first region or the second region even if a second object S2 is changed to another second object S2.

Specifically, the first objects G1 (apple objects) displayed on the screen V40 of the second video shown in FIG. 21 continue to be displayed even if the screen changes to the screen V40 of the second video shown in FIG. 26.

Furthermore, the display of the first objects G1 is controlled based on the display period set for each first object G1. Therefore, the display of the first objects G1 ends when the display period elapses from the start of the display. The display of the first objects G1 continues until the lapse of the display period regardless of whether the second objects S1 is changed.

Figure 28:
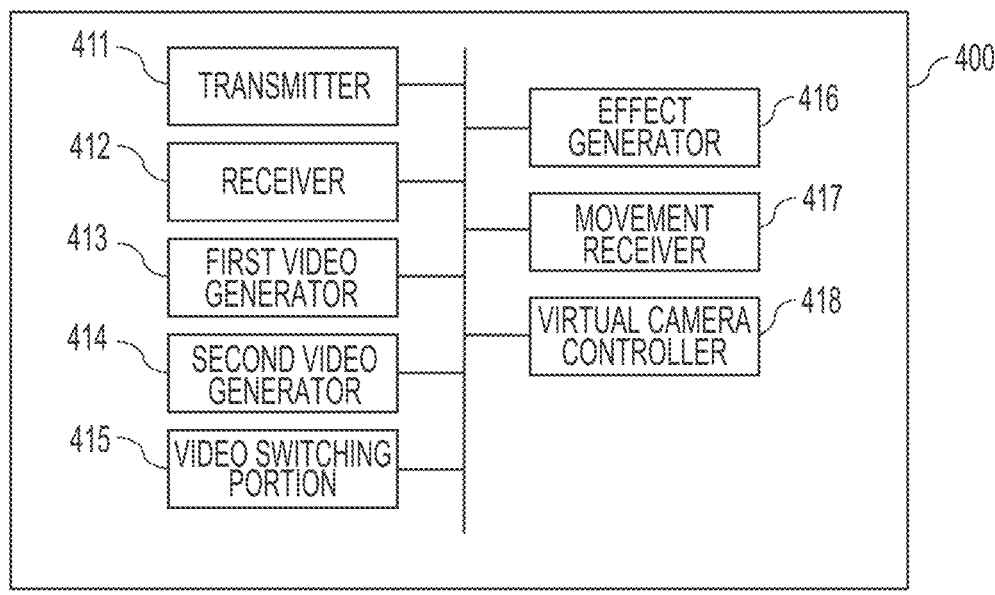
FIG. 28 is a configuration diagram showing another example of the functional configuration of the server device according to the first embodiment of this disclosure.

Further, as shown in FIG. 28, one or more computer processors in this disclosure may further include an effect generator 416.

When an already displayed first object G1 or a newly displayed first object G1 has a specific relationship with a second object S1, the effect generator 416 generates a predetermined effect.

Specifically, the presence or absence of the specific relationship is determined based on combined data stored in advance in a predetermined storage portion. As an example, identification numbers and/or attribute information are associated with each of the first object and the second object, and when they match or are associated, it is determined that they have a specific relationship.

Attribute information includes, for example, attributes related to seasons (summer, winter, and the like), attributes related to events (Halloween, Christmas, year-end and New Year, and the like), attributes related to location (sea, space, sky, or the like), or the like.

The timing of the above determination is the timing when the display request of a first object is received, the timing when a first object is displayed, or the timing when a second object is changed to another second object.

Predetermined effects include, but are not limited to, displaying another object, generating a sound effect, and the like. Another object can be, for example, an effect object such as a confetti object, a cracker object, or a decorated vessel object.

Further, as shown in FIG. 28, one or more computer processors in this disclosure may further include a movement operation receiver 417 and a virtual camera controller 418.

The movement operation receiver 417 accepts a movement operation of the character object of the first user in the virtual space. The details of the movement operation will be described later.

The virtual camera controller 418 controls the operation of the virtual camera that shoots in the virtual space. The details of the operation control will be described later.

Furthermore, in the embodiment of this disclosure, movement of the face of the character object of the first user can be generated based on the movement of the face of the first user captured by a front camera of the first user terminal 100.

Then, the first video generator 413 can generate movement of the face of the character object of the first user in an inverted state inverted with respect to the movement of the face of the first user.

Specifically, when the first user winks with the right eye, the character object of the first user winks with the left eye. The first user performs distribution while looking at the face of the character object displayed on the first user terminal 100. Therefore, by setting the inverted state (mirror display), the first user can perform distribution with an intuitive feeling (operation) as if looking at a mirror. In a non-inverted state in which the right/left are not inverted (that is, a state in which the character object winks with the right eye when the first user winks with the right eye), a sense of incongruity occurs, and it is difficult to operate with an intuitive feeling.

The second video generator 414 can generate the movement of the face of the first user's character object in an inverted state or a non-inverted state according to the positional relationship between the first user's character object and the virtual camera.

As an example, when the virtual camera is located in a front range of the character object of the first user (as an example, a range of 90 degrees to the right/left from the front of the character object), the movement of the face of the character object is generated in an inverted state. When the virtual camera is located outside the front range of the character of the first user (as an example, a range exceeding 90 degrees to the right/left from the front of the character object), the movement of the face of the character object is generated in a non-inverted state.

Specifically, when the virtual camera is determined to be a position in the front range of the character object of the first user, once the first user winks with the right eye, the character object of the first user winks with the left eye. Conversely, when the virtual camera is determined to be in a position exceeding the front range of the character object of the first user, once the first user winks with the right eye, the character object of the first user winks with the right eye.

In the above example, the movement of the face has been described, but the movement of the head and arms can be controlled in the same manner.

According to this, it is possible to eliminate a sense of incongruity on the display caused by the positional relationship between the virtual camera and the character object.

The inverted state and the non-inverted state may be switched according to the instruction of the first user.

Further, when the character object of the first user moves beyond a movable region, the second video generator 414 can cause the character object of the first user to reappear from another position in the virtual space.

When the virtual space is a space as shown in FIGS. 22 and 27, when the character object moves beyond the edge of the disk-shaped ground, the character object can be caused to fall below the tower and caused to reappear as if falling from the upper center of the disk-shaped ground.

By centering on the reappearance position, it is convenient for the character object to go in any direction in the world. Also, if it gets lost in the world, it can return to the reference center position.

As described above, according to the configuration of the first embodiment, it is possible to provide technical improvements that solve or alleviate at least part of the above-mentioned problems of the conventional technology. Specifically, according to the above configuration, it is possible to improve distributing users' distribution motivation, viewing users' viewing motivation, and/or users' motivation to interact with each other.

Second Embodiment

Subsequently, various functions that can be executed in the first user terminal 100, the second user terminals 200, and/or the server device 400 included in the information processing system 3000 according to a second embodiment of this disclosure will be described with reference to the drawings.

Figure 29:
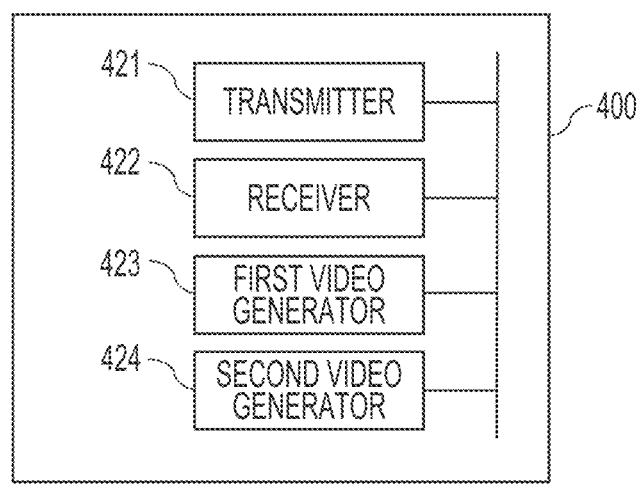
FIG. 29 is a configuration diagram showing an example of a functional configuration of a server device according to a second embodiment of this disclosure.

As shown in FIG. 29, one or more computer processors included in the information processing system 3000 according to the second embodiment of this disclosure include a transmitter 421, a receiver 422, a first video generator 423, and a second video generator 424.

Here, the transmitter 421, the receiver 422, the first video generator 423, and the second video generator 424 are all described as being included in the server device 400, but this disclosure is not limited thereto.

The transmitter 421 transmits information about the video including the character object of the first user to the second user terminal 200 of the second user. The transmitter 421 can have the same configuration as the transmitter 411 described above.

The receiver 422 receives a display request for the first object from the second user terminal 200. The receiver 422 can have the same configuration as the receiver 412 described above.

The first video generator 423 generates, as a first video, first information for displaying, in a first region in the virtual space, (i) character object of the first user and (ii) a first object. The first video generator 423 can have the same configuration as the first video generator 413 described above.

The second video generator 414 generates second information for causing a second object S1 different from the first object G1 to be displayed in a second region in the virtual space, as a second video, and for displaying the character object CO of the first user so as to be movable in the first region and the second region. The second video generator 424 can have the same configuration as the second video generator 414 described above.

Based on the arrangement position information associated with the first object G1, the second video generator 440 displays the first object G1 at a predetermined position in the first region R10 (FIG. 23, and the like) or at a position associated with the character object CO of the first user.

As mentioned in the description of the gift object, the first object information of the first object G1 includes position information (arrangement position information) indicating the position where the first object G1 is displayed.

As an example, the arrangement position information of the first object G1 defines the coordinates of a predetermined position (predetermined region) in the first region R10 or a part of the character object CO of the first user.

In this disclosure, a first object G1 having the former arrangement position information is called a non-wearing object, and a first object G1 having the latter arrangement position information is called a wearing object.

The appearance position (display start position) of the first object G1 may be different from the above-described arrangement position.

According to the above configuration, it is possible to provide a technical improvement that solves or alleviates at least part of the above-mentioned problems of the conventional technology. Specifically, according to the above configuration, it is possible to improve distributing users' distribution motivation, viewing users 'viewing motivation, and/or users' motivation to interact with each other.

Specifically, first, the presence of two types of videos, the first video and the second video, improves the entertainment value of the videos.

In particular, in the virtual space "world", which is the stage of the second video, an attractive second object is arranged according to a theme, and the character object can move freely and videos can be generated from any viewpoint and any place, thereby making it possible to generate videos that are more personalized than the first video.

Additionally, by generating a video of the above world being explored, it is easy to create topics of discussion in talks and comments.

By making it possible to display the first object not only in the first video but also in the second video, it will be possible to provide the first video and the second video without unnecessarily discouraging a viewing user from providing a gift(s).

Thus, the presence and switching of the two types of videos, the first video and the second video, improve the quality of the video content.

Additionally, by improving the quality of the video content, the viewing motivation of users who view videos is also improved, and the distribution motivation of users who distribute videos is also improved as the number of viewing users increases.

Additionally, this increase in motivation to distribute and view will lead to more active interaction between distributing users and viewing users, and further, to more active interaction among distributing users and among viewing users.

The virtual space displayed by executing the above-mentioned world function has been described as a space for distributing the second video. However, it can be used not only as a space for distributing the second video, but also as a virtual space for a plurality of avatars corresponding to a plurality of users to freely walk around and communicate with each other.

Additionally, one avatar (one user) among the plurality of avatars in the virtual space may be configured to be able to distribute the first video as a distributing user. That is, according to the information processing system of this disclosure, one-to-many video distribution can be performed in a many-to-many metaverse virtual space.

When displaying a first object G1, the second video generator 424 can display a system comment indicating that the first object G1 is being displayed in the second video.

Alternatively, when the second video generator 424 receives a display request of the first object G1, it is possible to display a system comment to the effect that the display request for the first object G1 has been made (to the effect that gifting has been received) in the second video.

Figure 30:
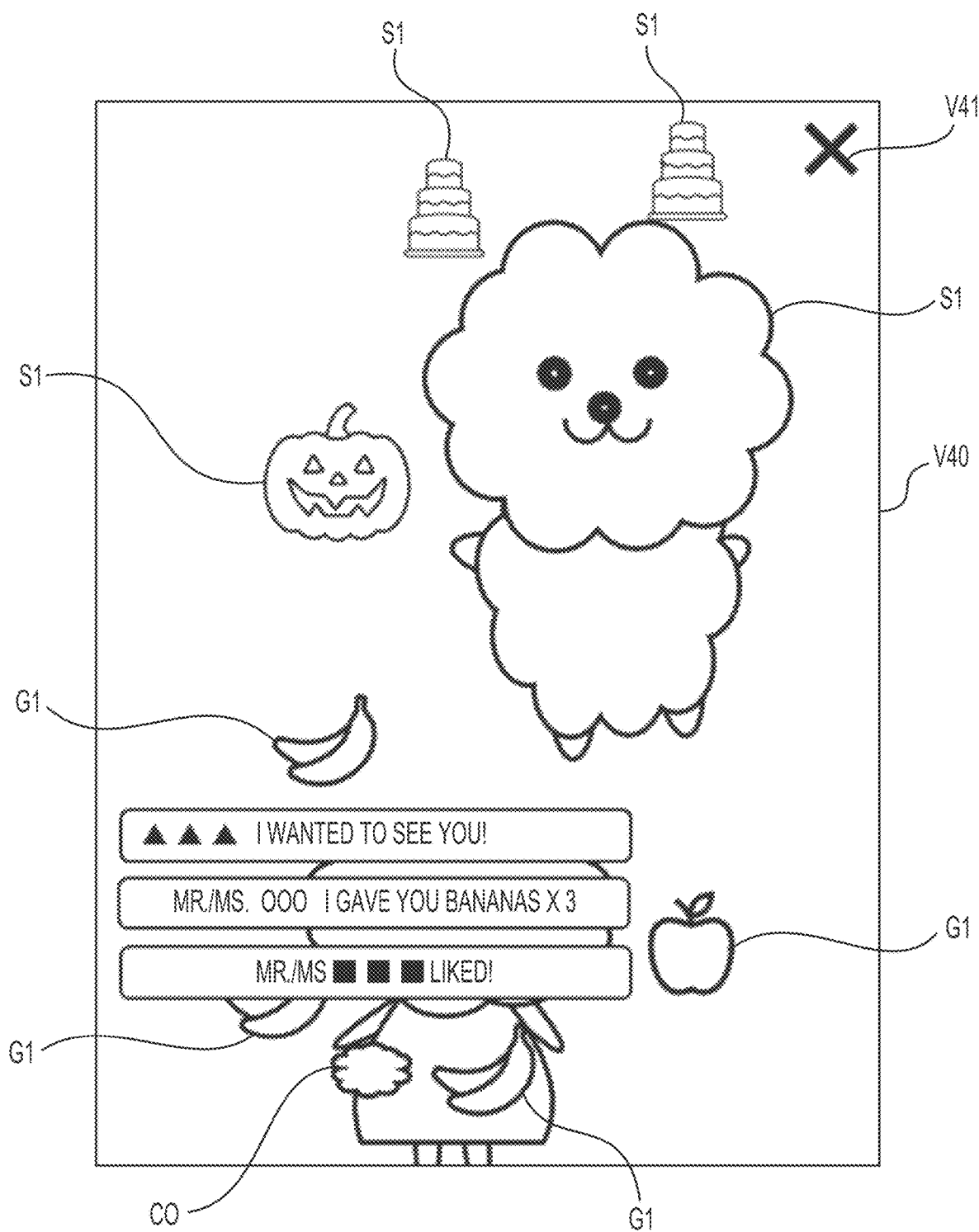
FIG. 30 is a conceptual diagram showing an image of a screen displayed on a user terminal.
Figure 31:
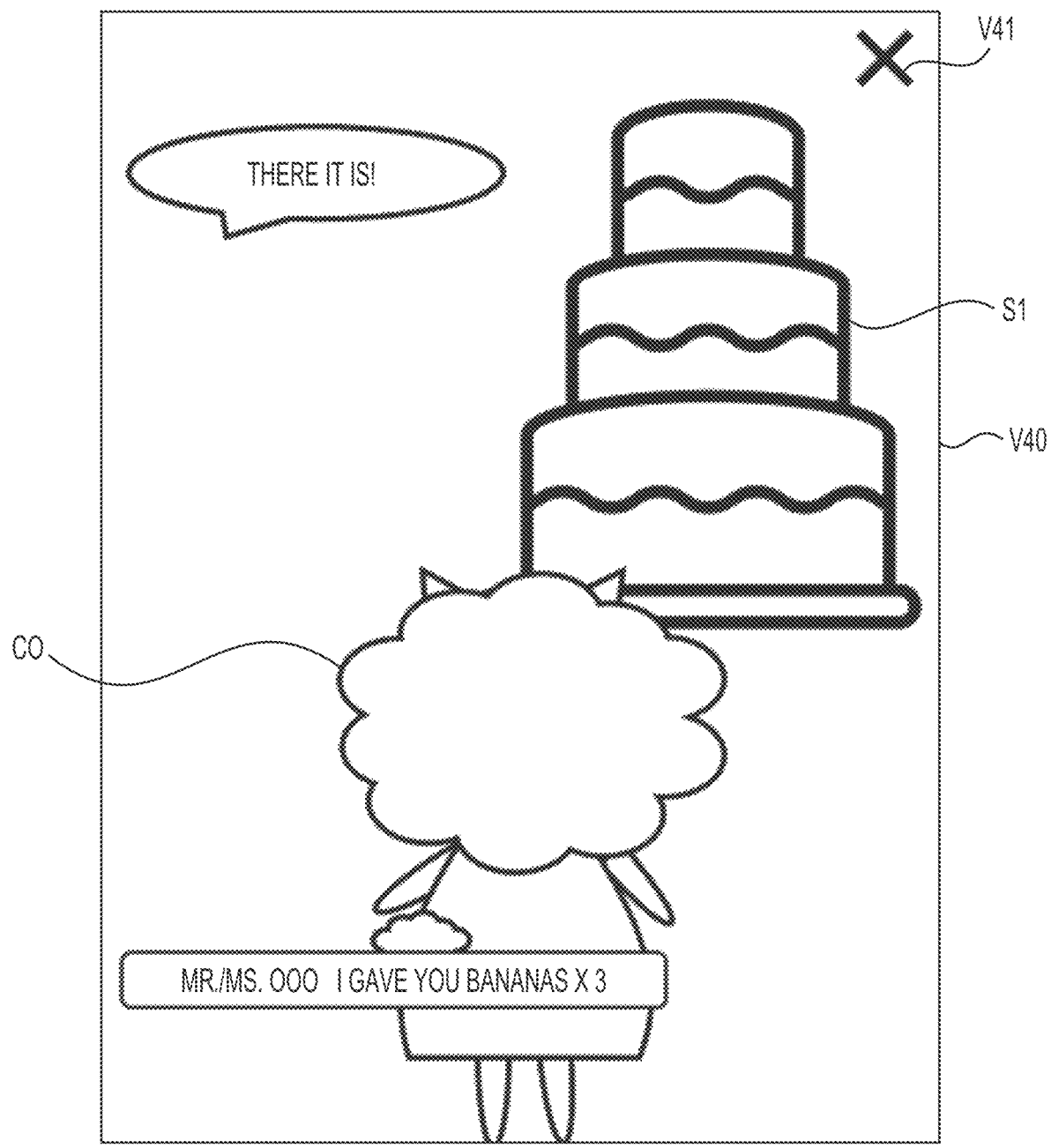
FIG. 31 is a conceptual diagram showing an image of a screen displayed on a user terminal.

FIGS. 30 and 31 show, on the screen V40 displaying the second video displayed on the first user terminal 100 and/or the second user terminal 200, how comments from the first user, second user and/or the system side are displayed. Although omitted in FIGS. 30 and 31, various display and operation UIs may be superimposed and displayed as shown in FIGS. 8 and 12.

In the examples shown in FIGS. 30 and 31, the comment "Mr./Ms. OOO gave bananas×3" is displayed as a system comment to the effect that the first object G1 (banana object) is displayed.

The system comment may be displayed in a manner different from the comments from the first user and the second user. For example, a predetermined mark (a balloon mark "There it is!" in FIG. 31) may be displayed as a system comment indicating that the first object G1 is displayed.

In the embodiment of this disclosure, the character object CO of the first user can move between the first region R10 and the second region R20. For example, as shown in FIG. 31, while the character object CO of the first user is moving in the second region R20 far away from the first region R10, when the first object G1 is arranged in the first region R10, the display of such a system comment is useful because the first object G1 may not be displayed on the screen.

Figure 32:
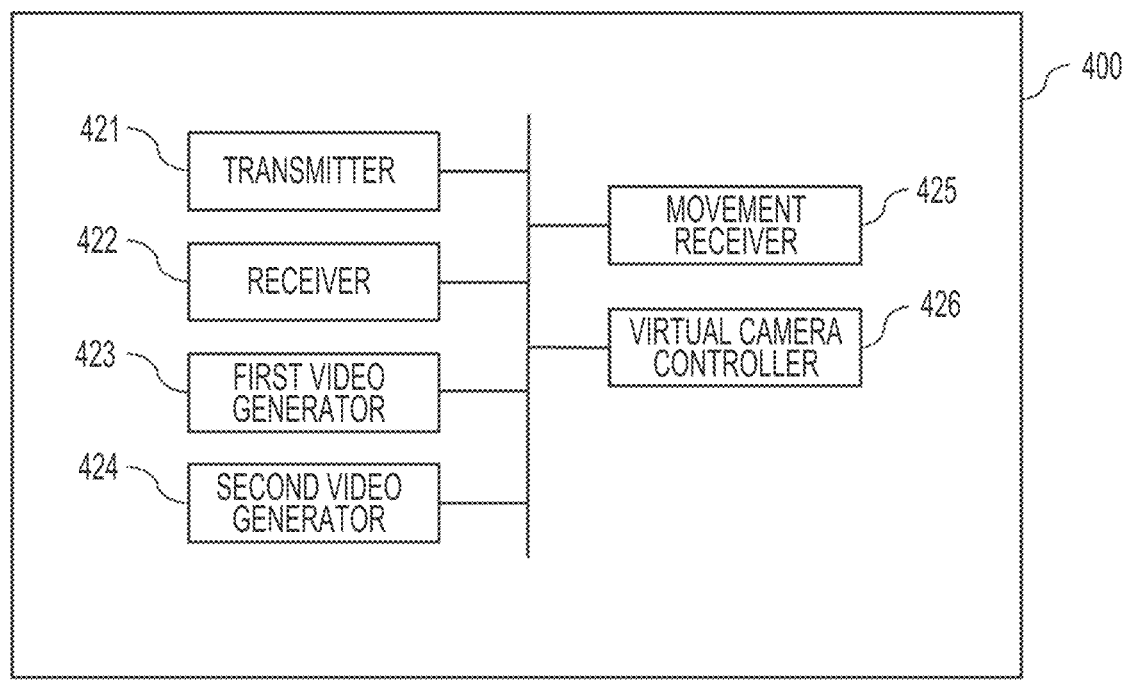
FIG. 32 is a configuration diagram showing another example of the functional configuration of the server device according to the second embodiment of this disclosure.

As shown in FIG. 32, the one or more computer processors in this disclosure may further include a movement operation receiver 425 and a virtual camera controller 426.

The movement operation receiver 425 accepts the movement operation of the character object of the first user in the virtual space. The details of the movement operation will be described later.

The virtual camera controller 426 controls the operation of the virtual camera that shoots in the virtual space. The details of the operation control will be described later.

When the first object G1 is displayed at a predetermined position in the first region R10, the virtual camera controller 426 can control the operation of the virtual camera according to the positional relationship between the predetermined position and the virtual camera.

Figure 33:
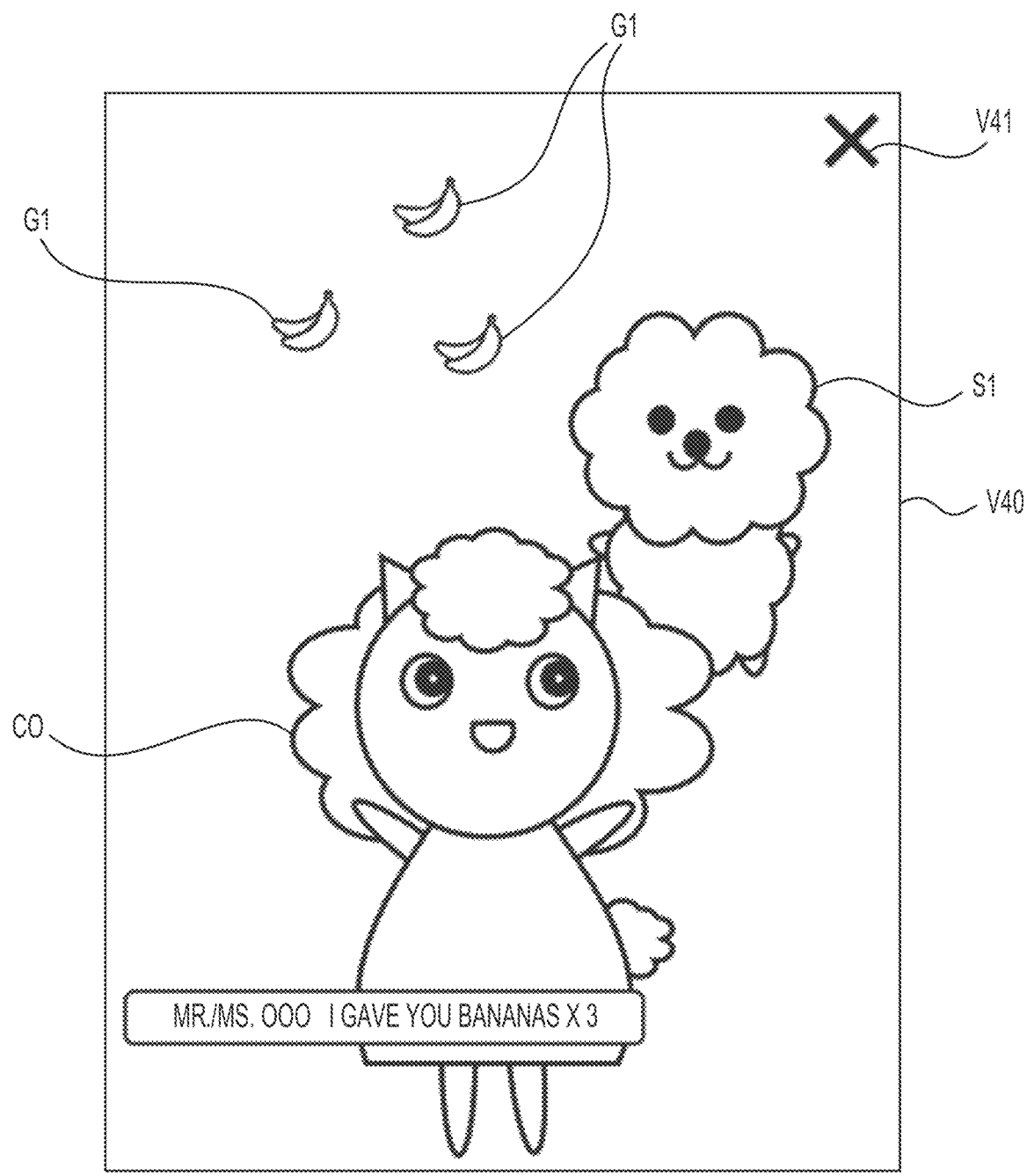
FIG. 33 is a conceptual diagram showing an image of a screen displayed on a user terminal.

As an example, as shown in FIG. 33, the virtual camera controller 426 adjusts the orientation and position of the virtual camera so that the first object G1 displayed at a predetermined position in the first region R10 is within a capturing range. This is automatically applied even if the virtual camera is being operated by the user as described later.

At this time, the virtual camera is controlled so that both the first object G1 and the character object CO fit within the capturing range.

Meanwhile, when the virtual camera controller 426 cannot include the first object and the character object in the same screen due to the positional relationship between the predetermined position and the virtual camera, the virtual camera controller 426 can control the operation of the virtual camera so that the first object is included in the screen.

Figure 34:
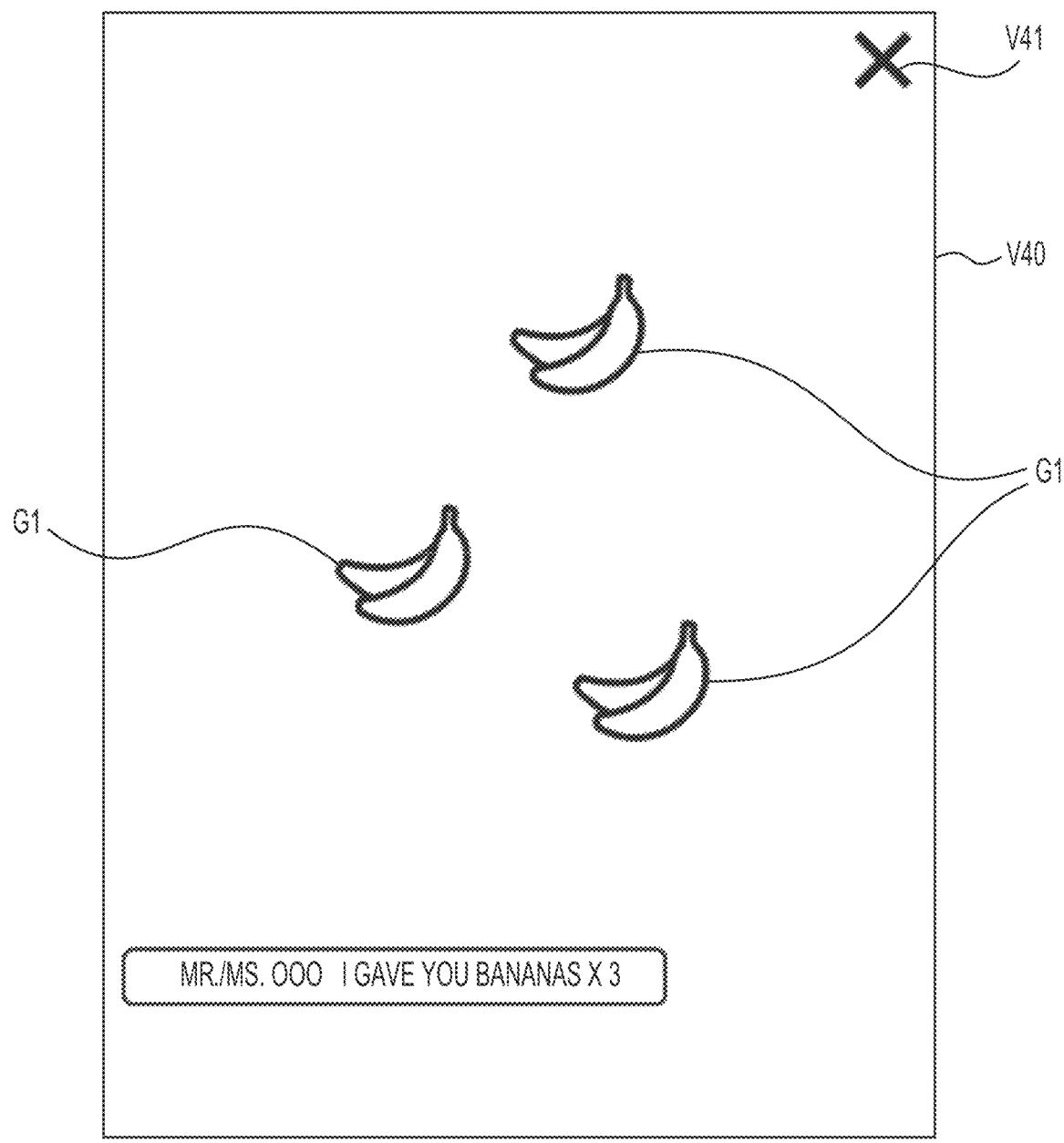
FIG. 34 is a conceptual diagram showing an image of a screen displayed on a user terminal.

As an example, as shown in FIG. 34, the virtual camera controller 426 adjusts the orientation and position of the virtual camera so that only the first object(s) G1 displayed at a predetermined position in the first region R10 falls within the capturing range. This is automatically applied even if the virtual camera is being operated by the user as described later.

When the second video generator 224 displays the first object G1 at a predetermined position in the first region R10, depending on the position of the character object CO in the virtual space, the second video generator 224 can display a marker object M1 indicating the position of the first object in the virtual space.

Figure 35:
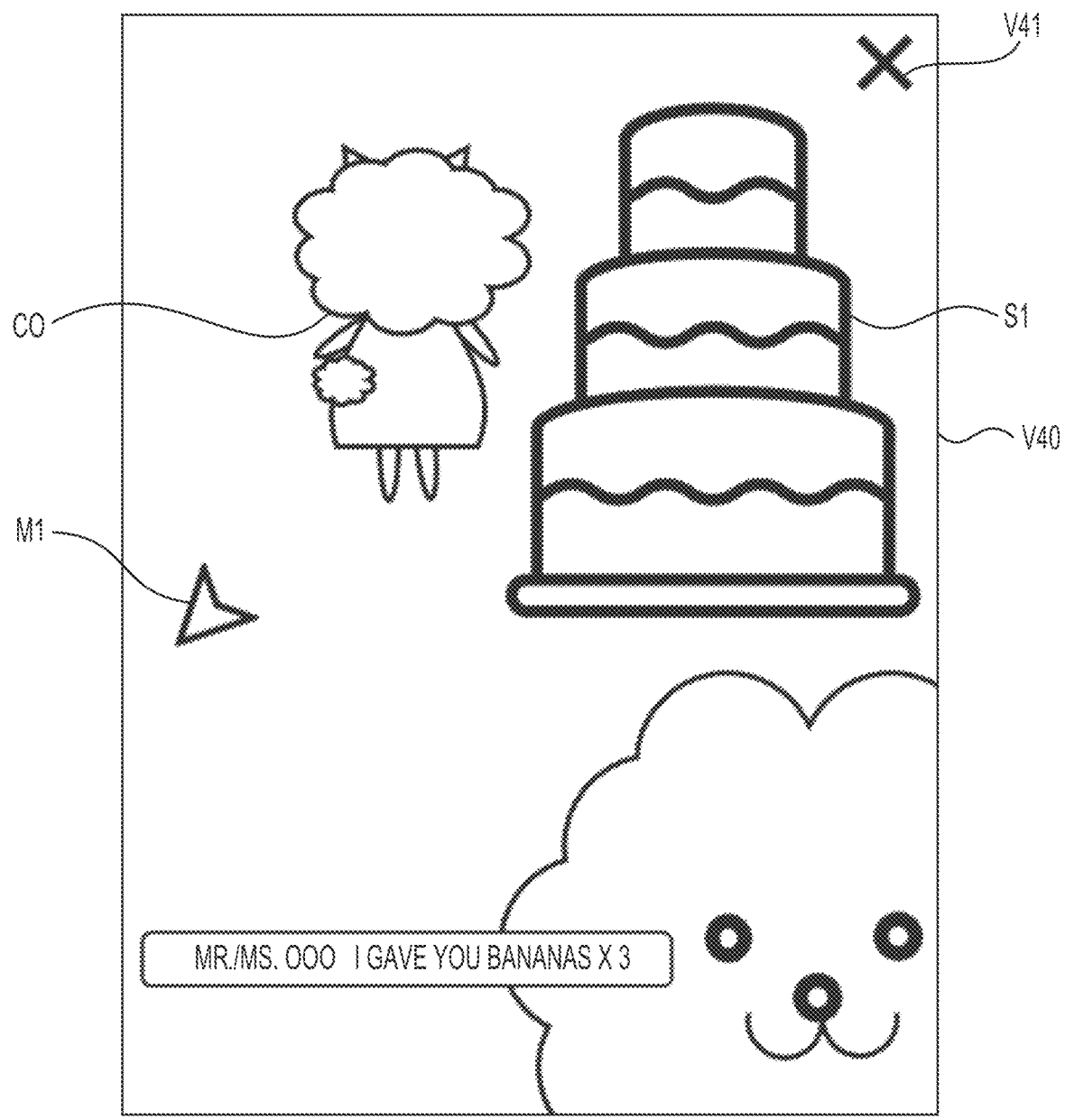
FIG. 35 is a conceptual diagram showing an image of a screen displayed on a user terminal.

As an example, as shown in FIG. 35, the second video generator 424 displays the marker object M1 to point to (in the direction of) the first object displayed at a predetermined position in the first region R10, regardless of the current position and orientation of the virtual camera.

Additionally, the second video generator 424 can display the first object at a position associated with the character object CO of the first user even if the arrangement position information associated with the first object G1 should display the first object at a predetermined position in the first region R10.

Figure 36:
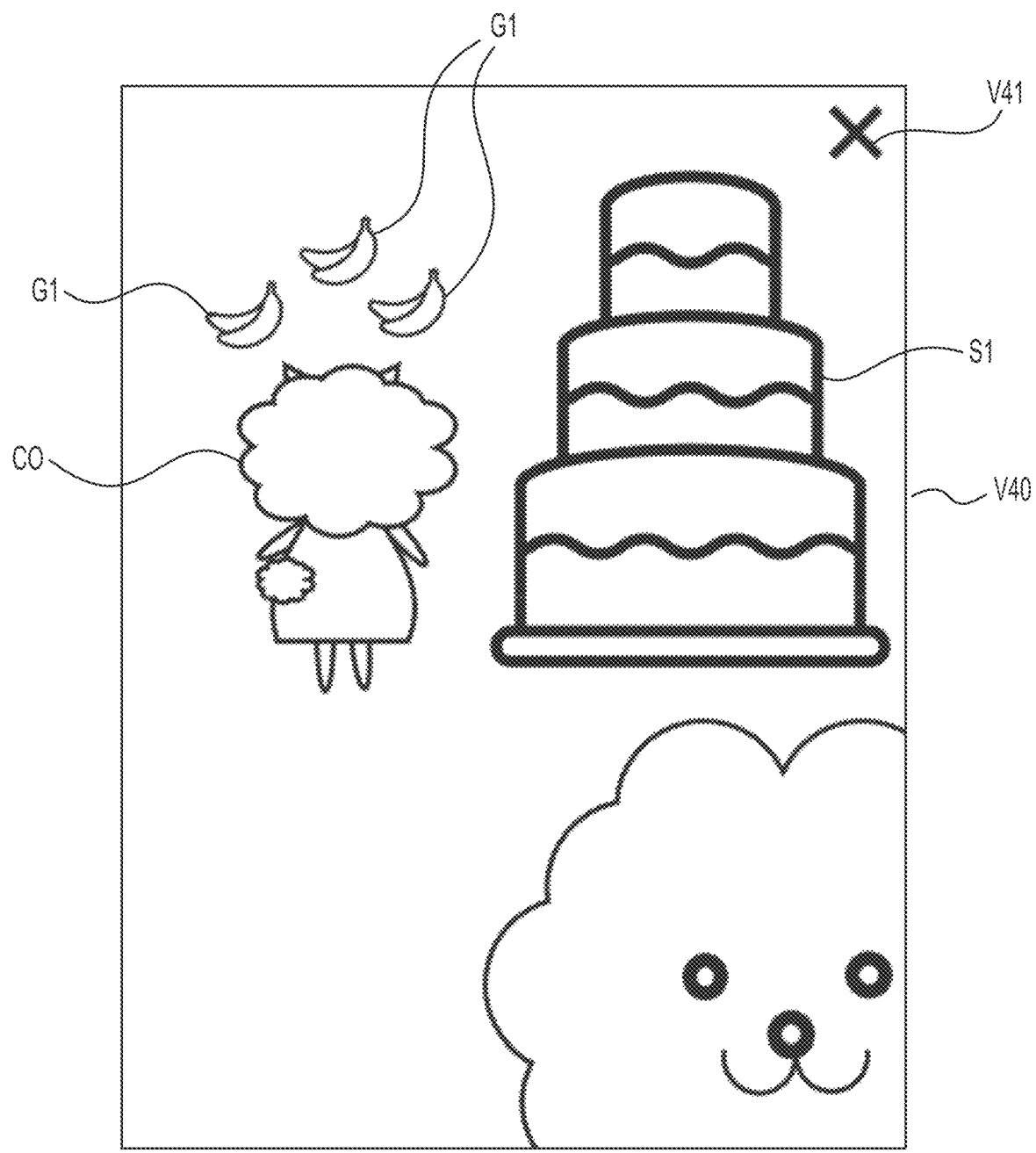
FIG. 36 is a conceptual diagram showing an image of a screen displayed on a user terminal.

As an example, as shown in FIG. 36, the second video generator 424 causes the first objects G1 to be displayed at a position (overhead) associated with the character object CO of the first user. According to this example, regardless of where the character object CO of the first user is in the virtual space, it is possible to increase the possibility that the first objects G1 are included in the capturing range. This allows effective notice of the gifts that are important to the distributing user and the viewing user on the display screen of a limited size that cannot display all of the large virtual space.

According to the above second embodiment, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Third Embodiment

Subsequently, various functions that can be executed in the first user terminal 100, the second user terminal 200, and/or the server device 400 included in the information processing system 3000 according to a third embodiment of this disclosure will be described with reference to the drawings.

Figure 37:
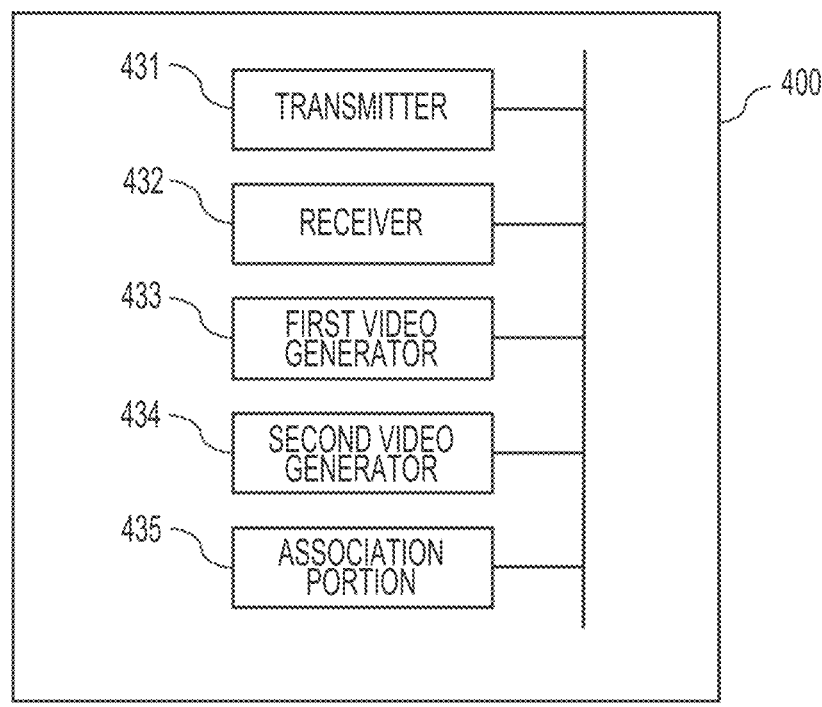
FIG. 37 is a configuration diagram showing an example of a functional configuration of a server device according to a third embodiment of this disclosure.

As shown in FIG. 37, one or more computer processors included in the information processing system 3000 according to the third embodiment of this disclosure include a transmitter 431, a receiver 432, a first video generator 433, a second video generator 434, and an association portion 435.

Here, the transmitter 431, the receiver 432, the first video generator 433, the second video generator 434, and the association portion 435 are all described as being provided by the server device 400, but this disclosure is not limited thereto.

The transmitter 431 transmits, to the second user terminal 200 of a second user, information about a video including the character object CO of the first user. The transmitter 431 can have the same configuration as the transmitter 411 described above.

The receiver 432 receives a display request for the first object from the second user terminal 200. The receiver 432 can have the same configuration as the receiver 412 described above.

The first video generator 433 generates first information for displaying as a first video, in a first region in the virtual space, (i) a character object of the first user and (ii) a first object. The first video generator 433 can have the same configuration as the first video generator 413 described above.

The second video generator 434 generates second information for causing a second object S1 different from the first object G1 to be displayed in a second region in the virtual space, as a second video, and for displaying the character object CO of the first user so as to be movable in the first region and the second region. The second video generator 434 can have the same configuration as the second video generator 414 described above.

Figure 38:
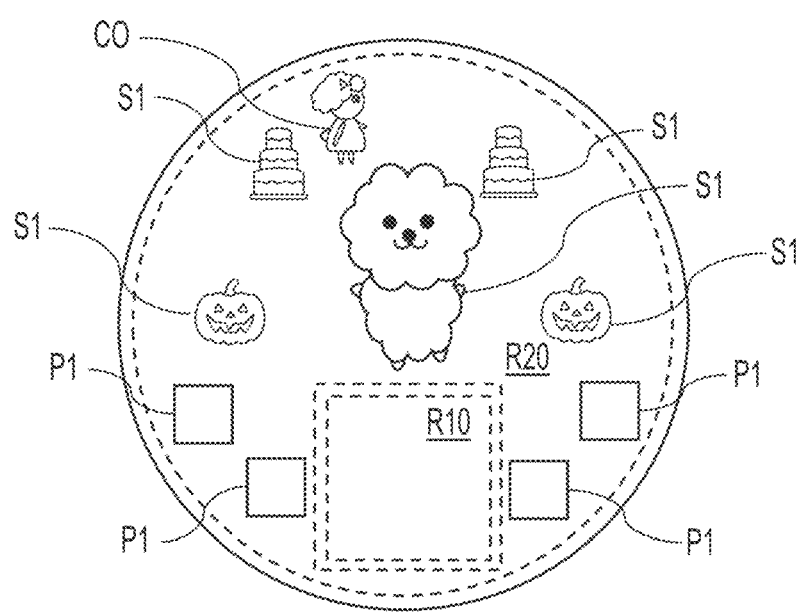
FIG. 38 is a conceptual diagram showing an image of a virtual space in this disclosure.

As shown in FIG. 38, the second video generator 434 causes the second region R20 to display third objects P1 different from the first objects G1 and the second objects S1.

Figure 39:
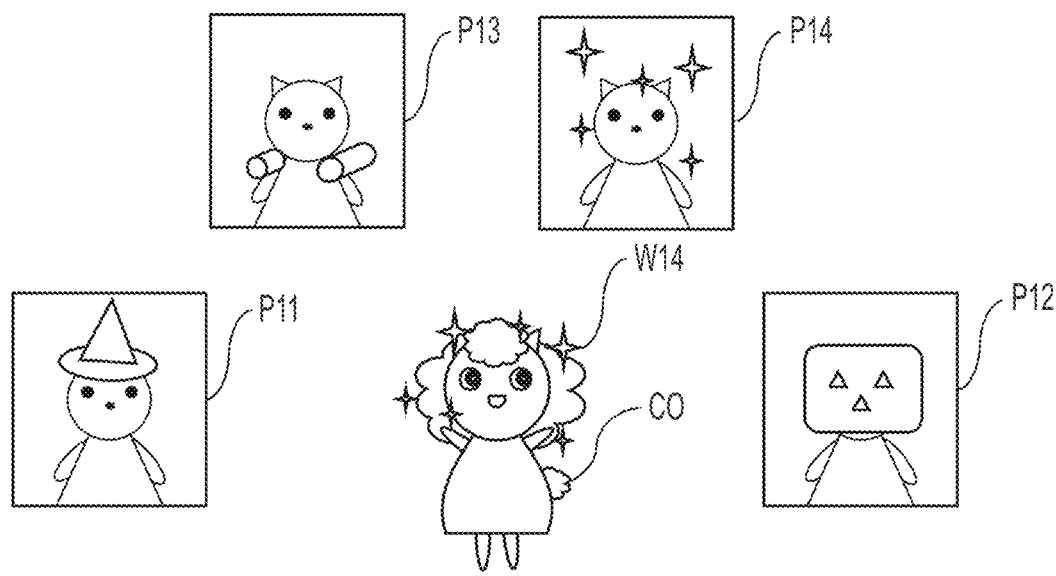
FIG. 39 is a conceptual diagram showing images of a third object and a fourth object in this disclosure.

FIG. 39 shows an image of third objects P1. In FIG. 39, two-dimensional panel-shaped objects P11 to 14 are shown as third objects P1. The third objects are not limited to two-dimensional panel-shaped objects, and may be three-dimensional objects.

Wearing objects are displayed together with character images in the objects P11 to P14, respectively. Each character image displayed on the image object may be an image of the character object of the first user, or another image.

When the character object CO of the first user and the third object P1 have a predetermined relationship, the association portion 435 associates the character object CO of the first user with a fourth object W1 associated with the third object P1.

The predetermined relationship is that (i) at least part of the character object CO (hands, feet, or the like) touches the third object P1, (ii) the distance between the character object CO and the third object P1 has become a predetermined distance, (iii) the character object CO pressed a button object associated with the third object P1, or the like. Touching the third object P1 above includes the character object CO (i) having been in contact with the third object P1 for a predetermined time, (ii) having been within a predetermined distance for a predetermined time, and (iii) having been pressing for a predetermined time.

These predetermined relationships are not particularly limited, but the second user who is watching the video can visually understand that the character object CO of the first user is trying to associate with the fourth object W1.

Furthermore, when the fourth object W1 is associated with the character object CO of the first user by the association portion 435, the second video generator 434 displays the fourth object W1 in association with the character object CO of the first user.

That is, the character object CO is made to wear the wearing object displayed on the third object P1 and displayed as the fourth object W1. In the examples shown in FIG. 39, an example is displayed in which the character object CO of the first user has a predetermined relationship with the third object P14, and a fourth object (glitter object) W14, which is a wearing object displayed on the third object P14, is worn around the head of the character object CO.

The fourth object W1 may be the same object as a gift object that the second user can request to display as a gift, as will be described later, or may be a special object that cannot be given as a gift.

In the former case, the fourth object W1 corresponds to a high-value gift. This is because a high-value gift is rarely given by a second user, making it difficult for the first and second users to see/wear the object. However, by making it possible to wear it for free in this world function, the world function will be revitalized, which will lead to the motivation to try using it in the first video.

Further, the same object P1 may be displayed to all users, or different objects may be displayed depending on the theme of the displayed world. Further, the displayed third object P1 may be determined based on the information of the first user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Specifically, first, the presence of two types of videos, the first video and the second video, improves the entertainment value of the videos.

In particular, in the virtual space "world", which is the stage of the second video, an attractive second object is arranged according to a theme, and the character object can move freely and videos can be generated from any viewpoint and any place, thereby making it possible to generate videos that are more personalized than the first video.

Additionally, by generating a video of the above world being explored, it is easy to create topics of discussion in talks and comments.

Furthermore, by displaying the third object displayed in the second video and allowing the character object to freely wear the corresponding fourth object, it will be easier to create topics in talks and comments, and interaction between users will become more active.

Further, by visually expressing the process up to wearing the fourth object in the video, it is possible to give the feeling of anticipation to the first user and/or the second user.

If the fourth object corresponds to a high-value gift, the high-value gift is rarely given by the second user. Therefore, the first user and the second user cannot easily see/wear the object. However, by making it specially wearable in this world function, the world function will be revitalized, which will lead to the motivation to use it in the first video.

Thus, the presence and switching of the two types of videos, the first video and the second video, and the fourth object improve the quality of the video content.

Additionally, by improving the quality of the video content, the viewing motivation of users who view videos is also improved, and the distribution motivation of users who distribute the videos is also improved as the number of viewing users increases.

Additionally, this increase in motivation to distribute and view will lead to more active interaction between distributing users and viewing users, and further, to more active interaction among distributing users and among viewing users.

The virtual space displayed by executing the above-mentioned world function has been described as a space for distributing the second video. However, it can be used not only as a space for distributing the second video, but also as a virtual space for a plurality of avatars corresponding to a plurality of users to freely walk around and communicate with each other.

Additionally, one avatar (one user) among the plurality of avatars in the virtual space may be configured to be able to distribute the first video as a distributing user. That is, according to the information processing system of this disclosure, one-to-many video distribution can be performed in a many-to-many metaverse virtual space.

The second video generator 434 can display a loading image for a predetermined time when the association portion 435 makes an association.

Figure 40:
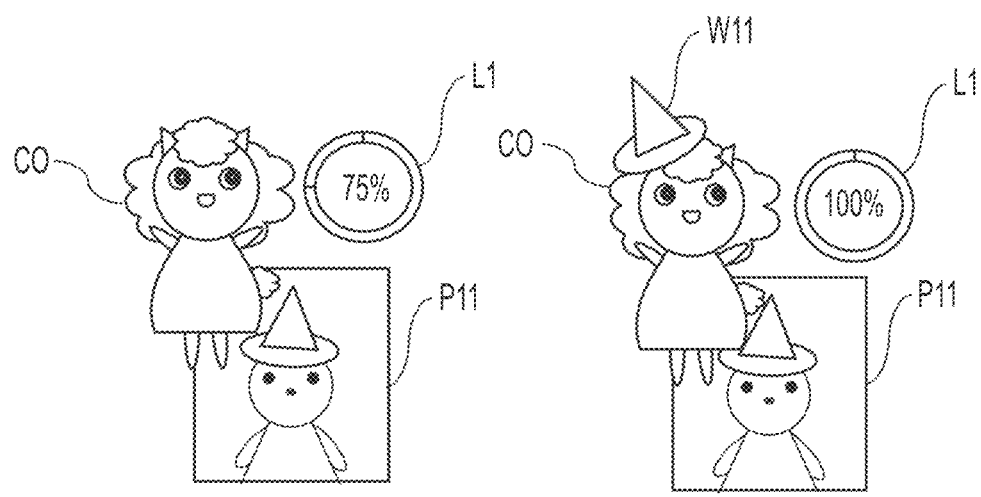
FIG. 40 is a conceptual diagram showing an image of a loading image in this disclosure.

FIG. 40 shows an example of the above-described loading image L1. In FIG. 40, the loading image L1 is displayed at the same time that the character object CO steps on the third object P1 (P11), and when a circular meter increases from 0% to 100%, a fourth object W1 (W11) is attached to the character object CO.

This is a display so that the second user who is viewing can understand that the character object is trying to associate with the fourth object, by intentionally taking the loading time. This can further increase the feeling of anticipation of the first user and/or the second user.

The time until the meter is filled (loading time) is not particularly limited, but the higher the value of the fourth object, the longer the loading time may be.

Figure 41:
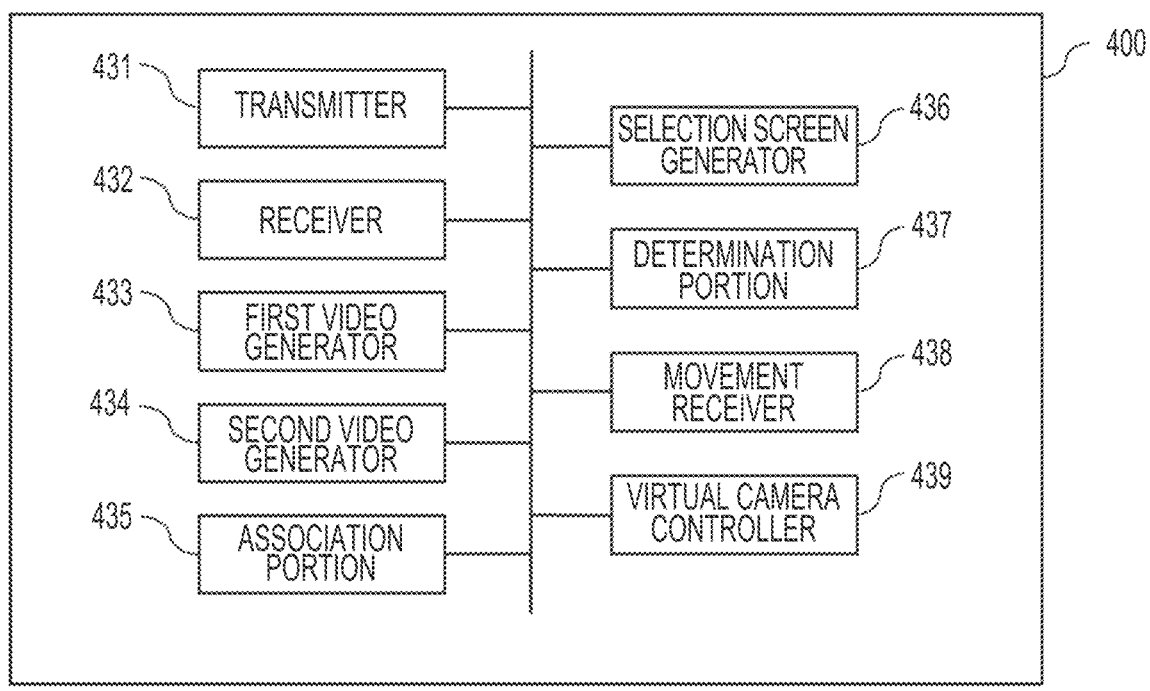
FIG. 41 is a configuration diagram showing another example of the functional configuration of the server device according to the third embodiment of this disclosure.

As shown in FIG. 41, the one or more computer processors in this disclosure may further include a selection screen generator 436.

The selection screen generator 436 generates information for displaying the selection screen V30 for making a display request for a first object G1 on the second user terminal 200.

As shown in FIG. 20, a plurality of images for making a display request for first objects G1 are selectably displayed on the selection screen V30.

Figure 42:
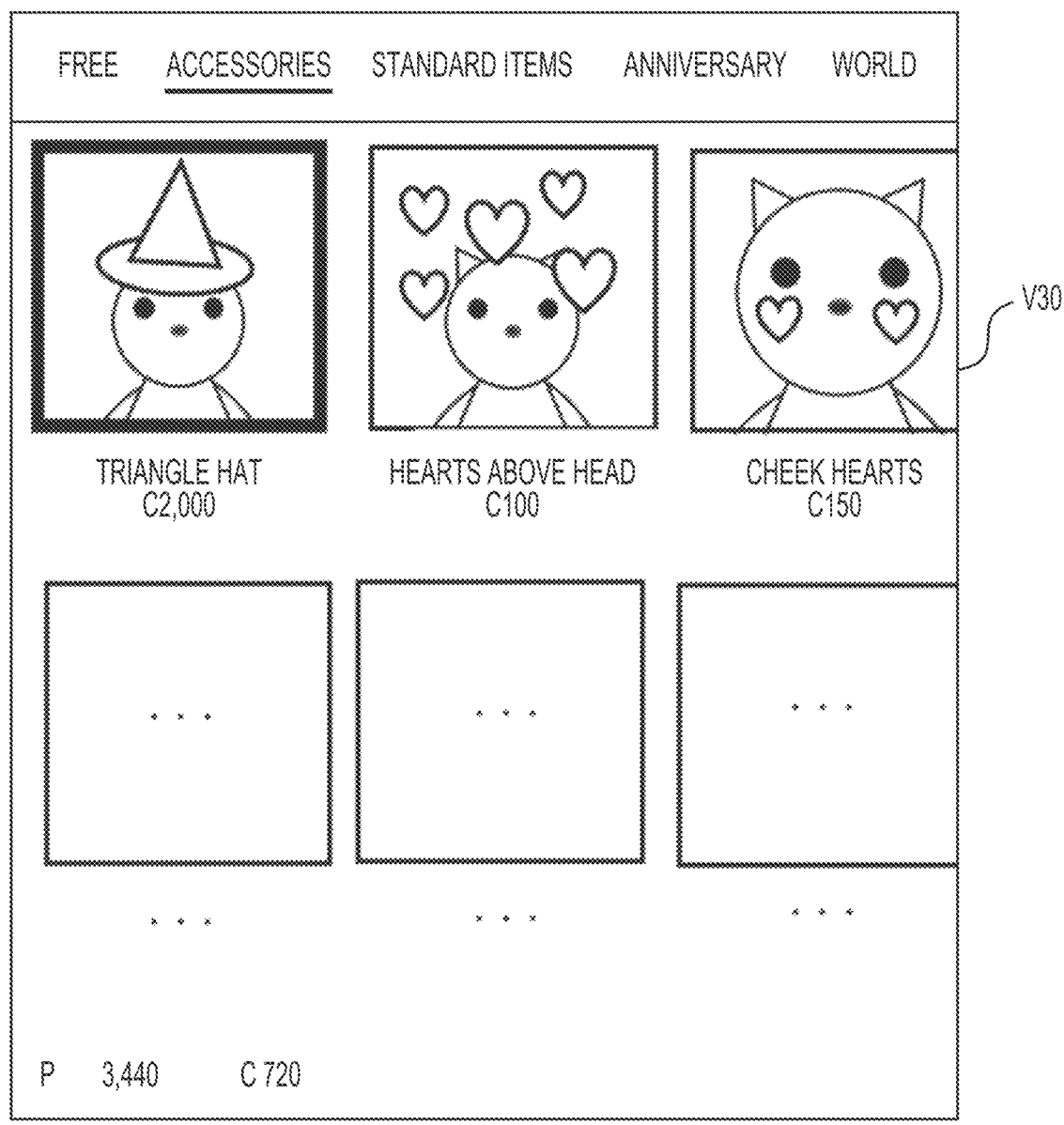
FIG. 42 is a conceptual diagram showing an image of a screen displayed on a user terminal.

Then, of the images, the image for making a display request for a first object G1 related to the fourth object can be displayed in a different manner from the other images, as shown in FIG. 42.

For example, in a state where the first user can freely wear a triangle hat as the fourth object in the second video, there is little advantage in the display if the second user gives the gift of the triangle hat. (However, since it contributes to the amount (points) of the gift obtained by the first user (given by the second user), there is an advantage in that respect.)

Therefore, the second user can display the image of the first object G1 related to the fourth object in a manner different from that of the other images, and can select it after understanding the above circumstances.

The term "related to the fourth object" is not limited to the case where it is the same as the fourth object, but also includes the case where the display position of a different object is substantially the same as that of the fourth object.

As an example of the above different manner, FIG. 42 shows an example in which the frame is emphasized, but tags may be added, colors may be changed, and the like.

Furthermore, when the display request of the first object G1 related to the fourth object is made by the second user, a special effect may occur in the video.

Special effects include, but are not limited to, displaying another object, generating a sound effect, and the like. Another object can be a production object such as a confetti object, a cracker object, or the like.

According to such a configuration, the disadvantage on the display can be compensated.

As shown in FIG. 41, the one or more computer processors of this disclosure may further include a determination portion 437.

When there is a display request for a first object G1 that should be displayed in association with a specified position of the character object CO of the first user, the determination portion 437 determines whether the fourth object W1 is already displayed in association with the specified position of the character object CO of the first user.

Figure 43:
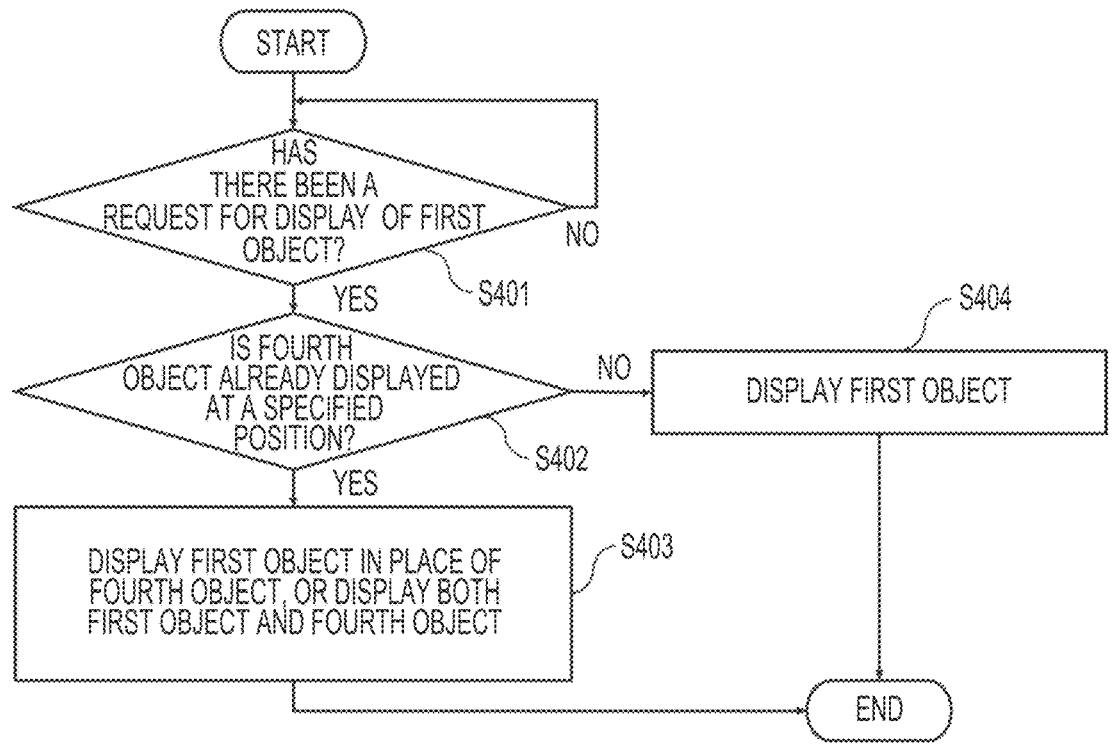
FIG. 43 is a flowchart showing an example of a processing flow in this disclosure.

FIG. 43 shows an example of a processing flow including a determination step by the determination portion 437.

As shown in FIG. 43, one or more computer processors perform a step of determining if there has been a display request for a first object that should be displayed in association with a specified position of the character object of the first user (S401).

If it is determined that there has been a request to display a first object that should be displayed in association with a specified position of the character object of the first user, a step of determining whether a fourth object is displayed in association with a specified position of the character object of the first user is executed (S402). The specified position may be the same position or include substantially the same position.

If it is determined that the fourth object is already displayed in association with a specified position of the character object of the first user, the second video generator 440 can display the first object in place of the fourth object, or can display both the fourth object and the first object in association with a specified position.

That is, if it is determined that the fourth object is displayed in association with a specified position of the character object of the first user, the second video generator 440 displays the first object in place of the fourth object, or displays both the fourth object and the first object in association with a specified position (S403).

Whether to display the first object in place of the fourth object or to display both the fourth object and the first object can be determined by the nature of the first object. For example, if the value of the first object is higher than the reference, the first object is displayed in place of the fourth object, and if the value of the first object is lower than the reference, both are displayed. The reference may be a value when the fourth object is a gift, or may be set by the first user or the administrator side.

If it is determined that a fourth object is not displayed in association with a specified position of the character object of the first user, the second video generator 440 executes a step of displaying the first object in association with a specified position (S404).

As another example, when there is a request to display the first object that should be displayed in association with a specified position of the character object of first user, if it is determined by the determination portion 437 that the fourth object is already displayed in association with the specified position of the character object of the first user, the second video generator 434 can display the first object in place of the fourth object based on an instruction from the first user terminal.

At this time, the display instruction object for giving the above instruction may be displayed on the screen of the first user. As a result, the first user can display the first object, which is a gift from the second user, at his/her preferred timing.

In the above example, it is determined whether the fourth object is already displayed, but the reverse is also true.

Figure 44:
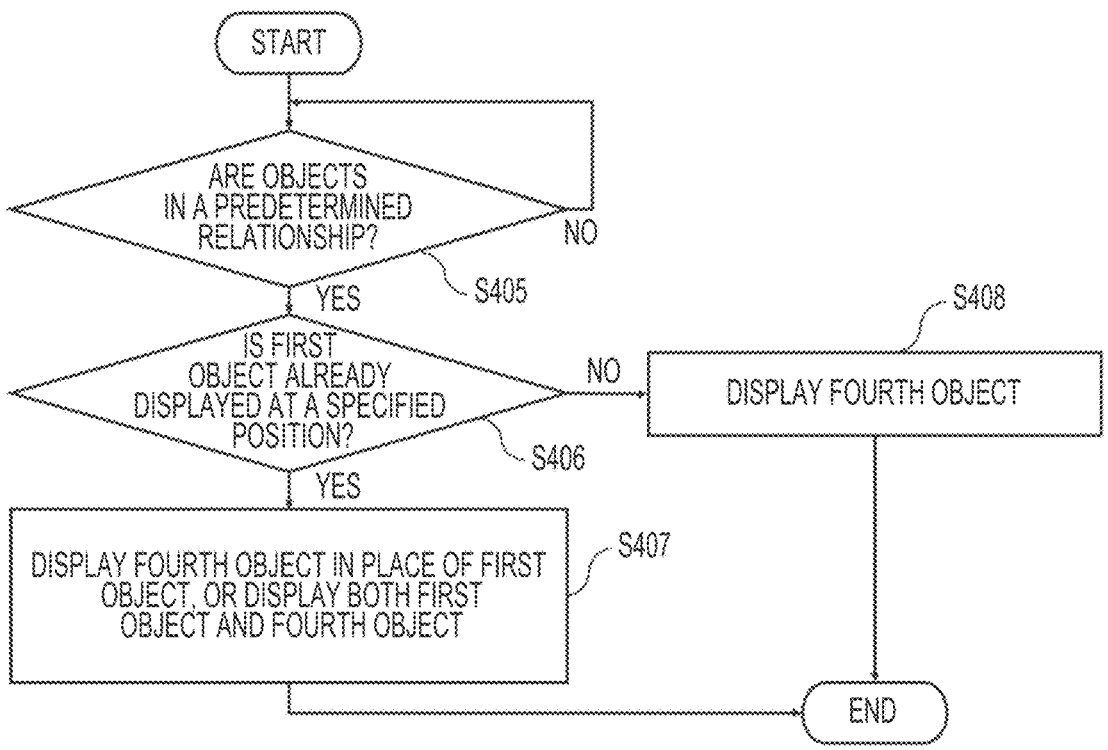
FIG. 44 is a flowchart showing an example of a processing flow in this disclosure.

That is, as shown in FIG. 44, the one or more computer processors execute a step of determining whether the character object CO of the first user and the third object P1 have a predetermined relationship (S405).

Then, if it is determined that the character object CO of the first user and the third object P1 have a predetermined relationship, a step of determining whether the first object is displayed in association with a specified position of the character object of the first user is executed (S406). The specified position may be the same position or include substantially the same position.

Then, if it is determined that the first object is displayed in association with a specified position of the character object of the first user, the second video generator 440 executes a step of displaying the fourth object in place of the first object, or displaying both the fourth object and the first object in association with a specified position (S407).

Whether to display the fourth object in place of the first object, or to display both the fourth object and the first object, can be determined by the nature of the fourth object. For example, if the value of the fourth object is higher than the value of the first object, the fourth object is displayed instead of the first object; if the value of the fourth object is lower than the value of the first object, both are displayed; or the like. The value of the fourth object can be the value when the fourth object is a gift.

If it is determined that the first object is not displayed in association with the specified position of the character object of the first user, the second video generator 440 executes a step of displaying the fourth object in association with a specified position (S408).

As another example, when the determination portion 437 determines that the first object is already displayed in association with a specified position of the character object of the first user, the second video generator 434 can display the fourth object in place of the first object based on an instruction from the first user terminal.

At this time, a display instruction object for providing the above instruction may be displayed on the screen of the first user. As a result, the first user can display the fourth object at his/her preferred timing.

As shown in FIG. 38, the second video generator 440 can display a fifth object P2 different from the second objects S1 and the third objects P1, in the second region R20.

Figure 45:
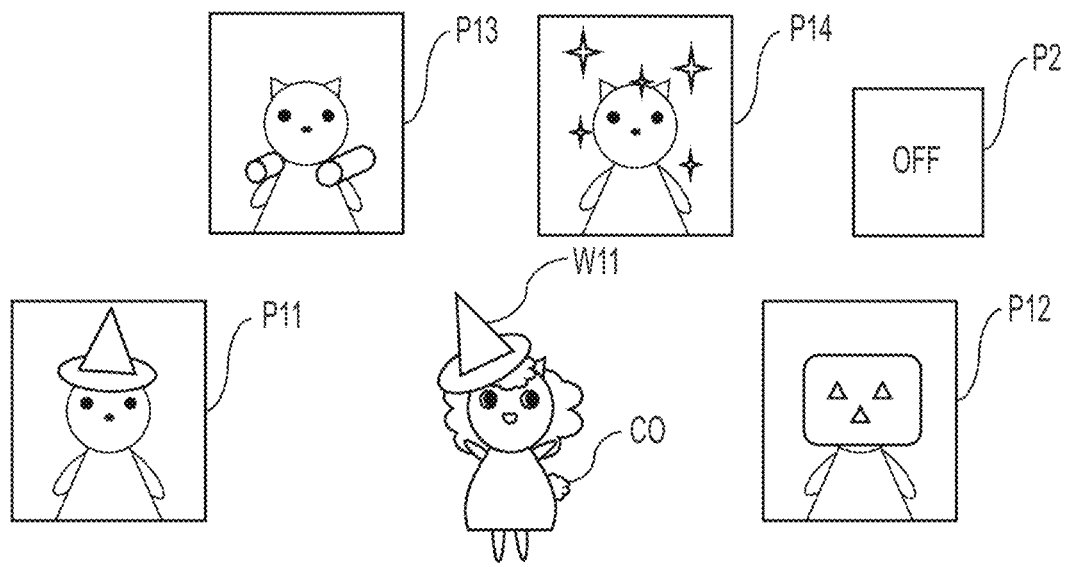
FIG. 45 is a conceptual diagram showing an image of a fifth object in this disclosure.

The fifth object P2 is a release object as shown in FIG. 45 as an example.

Then, when the character object of the first user and the fifth object P2 have a predetermined relationship, the association portion 435 can release the association of the fourth object associated with the character object of the first user.

That is, the fifth object P2 is an object for breaking the association between the fourth object W1 and the character object CO and making it "non-display." The predetermined relationship can be the same as described in the description of the third object.

Further, when the fourth object W1 is associated with the character object CO of the first user, when the character object CO of the first user and the third object P1 have a predetermined relationship again, the association of the fourth object W1 associated with the character object CO of the first user can be released.

That is, when the character object CO steps on the third object P1 once, the fourth object W1 is associated, and when the character object CO steps on the third object P1 for the second time, the association of the fourth object W1 is released and the object W1 becomes "non-display." When the character object CO steps on the third object P1 for the third time, the fourth object W1 is associated with the character object again, but an upper limit may be set for the number of times that the objects can be associated.

As shown in FIG. 45, for example, in a state in which the fourth object W11 is associated and displayed by having the character object CO step on the third object P11, if the character object CO steps on another third object P12, the association of the fourth object W11 is released and the fourth object corresponding to another third object P12 is attached.

Alternatively, for example, in a state in which the fourth object W11 is associated and displayed by having the character object CO step on the third object P11, if the character object CO steps on another third object P12, the association of the fourth object W11 is not released, and the fourth object W12 corresponding to another third object P12 may be further attached.

Further, as described above, also when the character object CO moves out of the region and reappears, the association of all the fourth objects may be released.

If a display period is not set for the fourth object W1, the configuration may be such that the association is not released without the above operations.

When the theme of the world is changed (when the second object S1 is changed), the third object P1 is changed to another third object P1 according to the theme of the world. When there is a plurality of third objects P1, all or part of them may be changed.

Then, even if the theme of the world is changed, the attached fourth object W1 will continue to be displayed.

Using such a configuration, a mission using the fourth object may be generated, and a predetermined effect may be generated when the mission is cleared.

An example of a mission is to attach a fourth object that has a specified relationship to a fourth object that was attached before the theme was changed, after the theme is changed, and the like. It is also possible to continue such a mission over a plurality of theme changes.

For example, in each theme, when a fourth object that is an ice cream object can be attached, the mission can be to make the head of the character object clog up with ice cream every time the theme is changed.

Predetermined effects include, but are not limited to, displaying another object, generating a sound effect, and the like. Another object can be a production object such as a confetti object, a cracker object, a decorated vessel object, or the like.

Such a predetermined effect can be configured to be magnificent each time the theme is changed.

According to the above configuration, the distribution time of the first user can be lengthened, and the entertainment of the video can be improved, so that the viewing motivation of the second user can be improved.

According to the configuration of the third embodiment, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Fourth Embodiment

Subsequently, various functions that can be executed in the first user terminal 100, the second user terminals 200, and/or the server device 400 included in the information processing system 3000 according to a fourth embodiment of this disclosure will be described with reference to the drawings.

Figure 46:
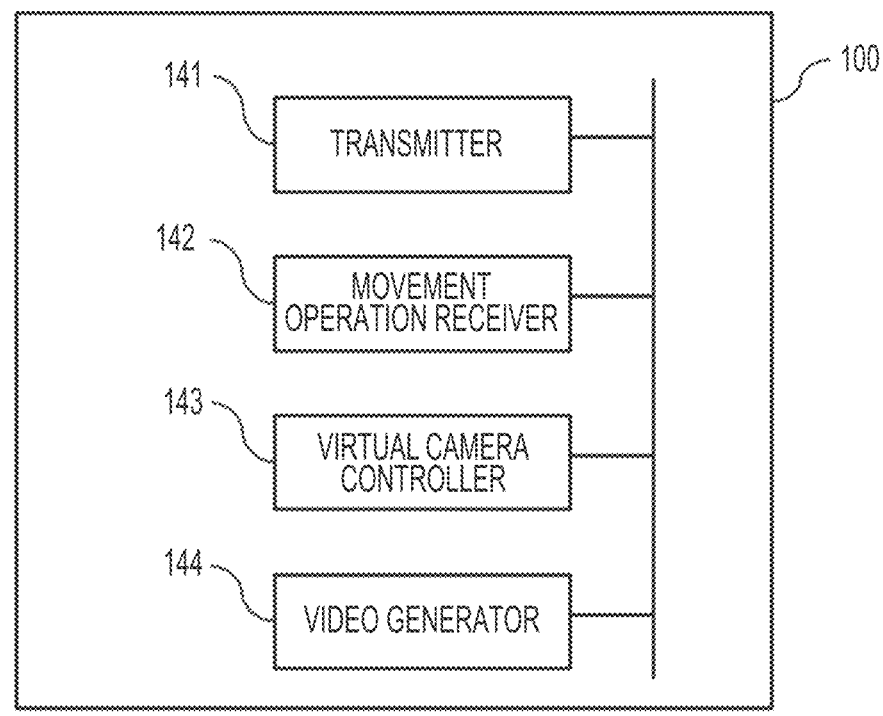
FIG. 46 is a configuration diagram showing an example of a functional configuration of a first user terminal according to a fourth embodiment of this disclosure.

As shown in FIG. 46, one or more computer processors included in the information processing system 3000 according to the fourth embodiment of this disclosure includes a transmitter 141, a movement operation receiver 142, a virtual camera controller 143, and a video generator 144.

Here, the transmitter 141, the movement operation receiver 142, the virtual camera controller 143, and the video generator 144 are all described as being provided by the first user terminal 100, but this disclosure is not limited thereto.

The transmitter 141 transmits, to the second user terminal 200 of a second user, information about the video including the character object of the first user.

As an example, the video can be a video distributed in real time by the first user.

As an example, the information regarding the video may be any information that enables the video to be viewed on the second user terminal 200. The rendering of the video may be performed by the first user terminal 100 or the server device 400, or may be performed in the second user terminal 200.

At least the face of a character object included in the video may reflect the movement of the face of the first user captured by a camera provided in the first user terminal.

The movement operation receiver 142 accepts the movement operation of the character object of the first user in the virtual space. The virtual space can be the space shown in FIG. 22.

The method of accepting the movement operation will be described later.

The virtual camera controller 143 accepts camera operations of a virtual camera that captures in the virtual space. The method of accepting camera operations will be described later.

The video generator 144 generates information for making the character object of the first user movable in the virtual space based on the movement operation and the camera operation.

The information generated here is the above-mentioned second information, the above-mentioned video is displayed based on the second information. That is, the video transmitted to the second user terminal 200 is the second video.

Then, in this embodiment, a first movement operation is applied to the character object of the first user in response to a predetermined operation on a first operation UI displayed on the first user terminal 100 of the first user.

Furthermore, a second movement operation is applied to the character object of the first user in response to a predetermined operation on a second operation UI displayed on the first user terminal 100.

Additionally, a viewpoint of the virtual camera can be switched to a first person viewpoint or a third person viewpoint according to a predetermined operation on a third operation UI displayed on the first user terminal 100.

Figure 47:
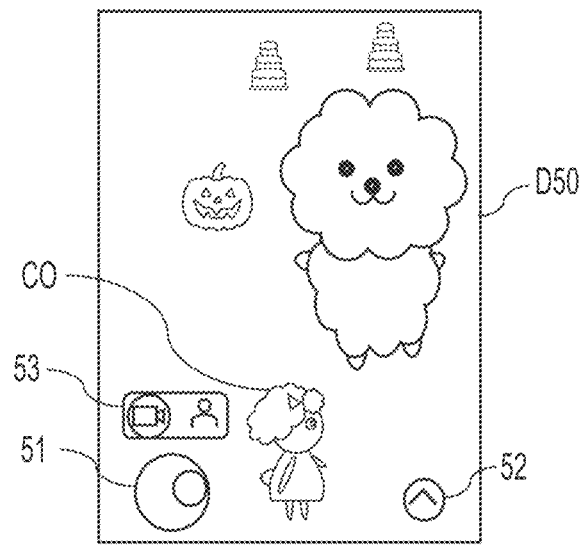
FIG. 47 is a conceptual diagram showing an image of a screen displayed on a user terminal.

FIG. 47 shows an image in which a first operation UI 51, a second operation UI 52, and a third operation UI 53 are displayed on a screen D50 displayed on the first user terminal 100.

The first operation UI 51 is a virtual joystick and can move the target horizontally in the virtual space according to a swipe direction from an initial position of a touch in an outer circle region of the first operation UI 51. An inner circle in the outer circle region is displayed so as to move in the outer circle region according to the touch position. A movement speed of the character object may be changed according to the moving distance from the initial position. Also, it is acceptable not to change the movement speed of the character object according to the movement distance from the initial position. In this case, it is possible to provide an easy-to-see screen with a constant speed change.

The second operation UI 52 may move the character object vertically in the virtual space in response to a tap in a circular region of the second operation UI 52.

The third operation UI 53 switches between the first-person viewpoint and the third-person viewpoint by a tap operation. FIG. 47 is an image of a screen displaying a video of a third-person viewpoint, and shows an image of a screen displaying a video of the first-person viewpoint of FIG. 48.

Then, the virtual camera movement, rotation, and/or scale operations are applied in response to predetermined operations on a region (fifth region) in which the first operation UI 51, the second operation UI 52, and the third operation UI 53 are not displayed in the first user terminal 100.

Specifically, the rotation operation is applied to the virtual camera in response to a one-finger swipe operation on the fifth region.

Also, the movement operation is applied to the virtual camera in response to a two-finger swipe operation on the fifth region.

Further, the scale operation is applied to the virtual camera in response to a two-finger pinch-in/pinch-out operation on the fifth region.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Specifically, the presence of the second video improves the quality of the video content.

Furthermore, the above configuration improves the operability of the character object in the second video.

Furthermore, by improving the quality of the video, the viewing motivation of viewing users is improved, and as the number of viewing users increases, the distribution motivation of distributing users is also improved.

Then, as the motivation for distribution and the motivation for viewing are improved, the interaction between distributing users and viewing users, and further the interaction among viewing users are revitalized.

The virtual space displayed by executing the above-mentioned world function has been described as a space for distributing the second video (world function), but it is not limited to the space for distributing the second video, and can also be used as a virtual space for a plurality of avatars corresponding to a plurality of users to freely walk around and communicate with each other.

Additionally, one avatar (one user) among the plurality of avatars in the virtual space may be configured to be able to distribute the first video as a distributing user. That is, one-to-many video distribution can be performed in a many-to-many metaverse virtual space.

It is possible to switch whether to display a comment on a video displayed on the first user terminal according to a predetermined operation on the first user terminal.

Figure 48:
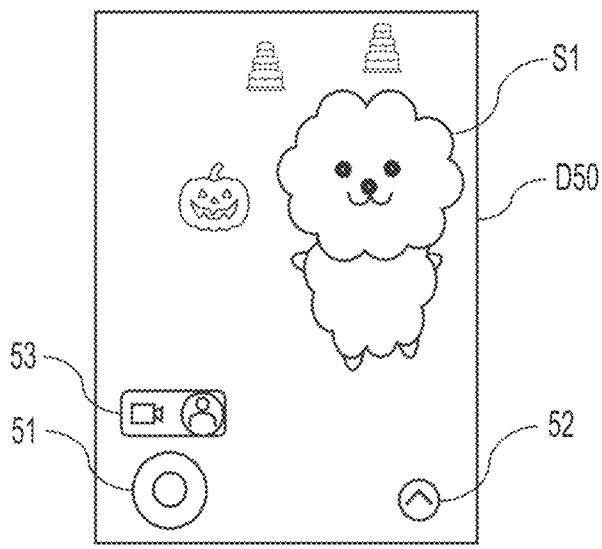
FIG. 48 is a conceptual diagram showing an image of a screen displayed on a user terminal.
Figure 49:
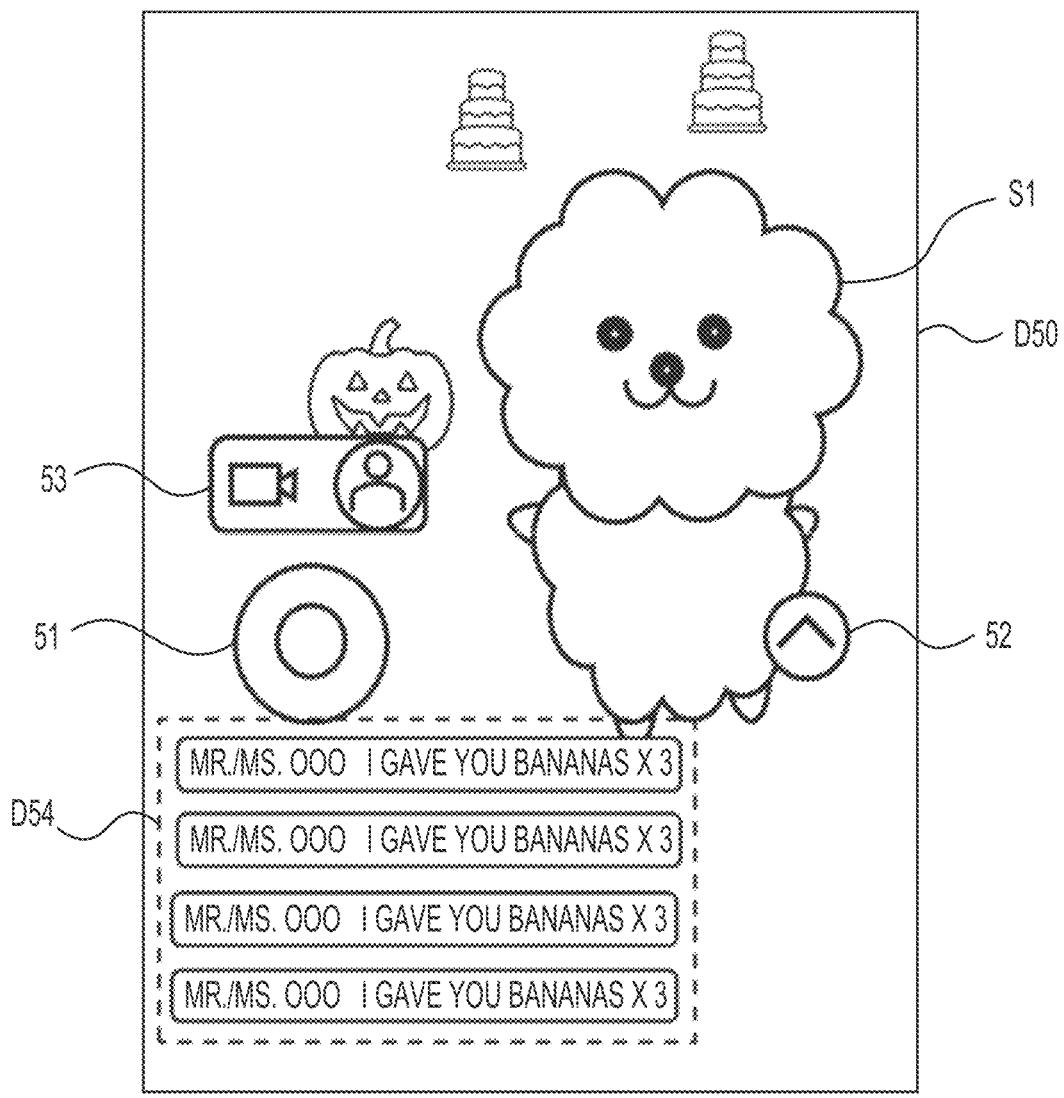
FIG. 49 is a conceptual diagram showing an image of a screen displayed on a user terminal.

FIG. 49 shows a comment field D54 displayed on the screen D50 shown in FIG. 48.

Furthermore, when the one or more computer processors switch the display/non-display of the comment on the video, the display positions of the first operation UI and the second operation UI are changed, or the first operation UI 51, the second operation UI 52, and the third operation UI 53 may not be displayed.

Figure 50:
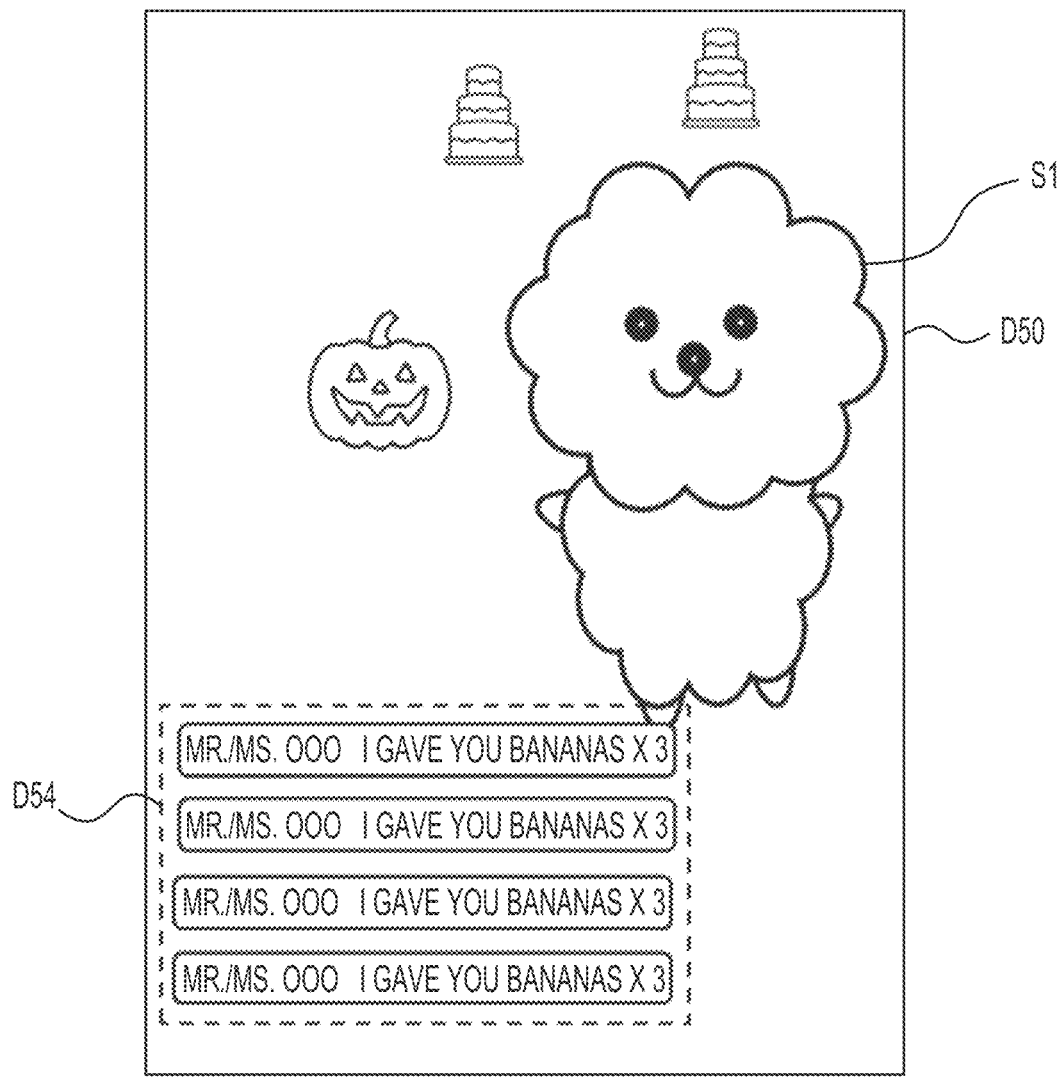
FIG. 50 is a conceptual diagram showing an image of a screen displayed on a user terminal.

Specifically, the display position is changed in the example shown in FIGS. 48 and 49, but the first operation UI 51, the second operation UI 52, and the third operation UI 53 are not displayed in the example shown in FIGS. 48 and 50.

Further, as described above, a first movement operation can be horizontal movement (walking or the like), and a second movement operation can be vertical movement (jumping or the like).

Also, the one or more computer processors apply a rotation operation to the virtual camera in response to a one-finger swipe operation on the region (fifth region).

Also, the one or more computer processors apply a movement operation to the virtual camera in response to a two-finger swipe operation on the region (fifth region).

Also, the one or more computer processors apply a scale operation to the virtual camera in response to a two-finger pinch-in/pinch-out operation on the region (fifth region).

By these operations, it becomes possible to freely reflect the inside of the virtual space.

The virtual camera controller 143 can accept camera operations from the first user or a user authorized by the first user.

The user authorized by the first user can be, for example, one of the guest users, but the details will be described later.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Fifth Embodiment

Subsequently, various functions that can be executed in the first user terminal 100, the second user terminals 200, and/or the server device 400 included in the information processing system 3000 according to a fifth embodiment of this disclosure will be described with reference to the drawings.

Figure 51:
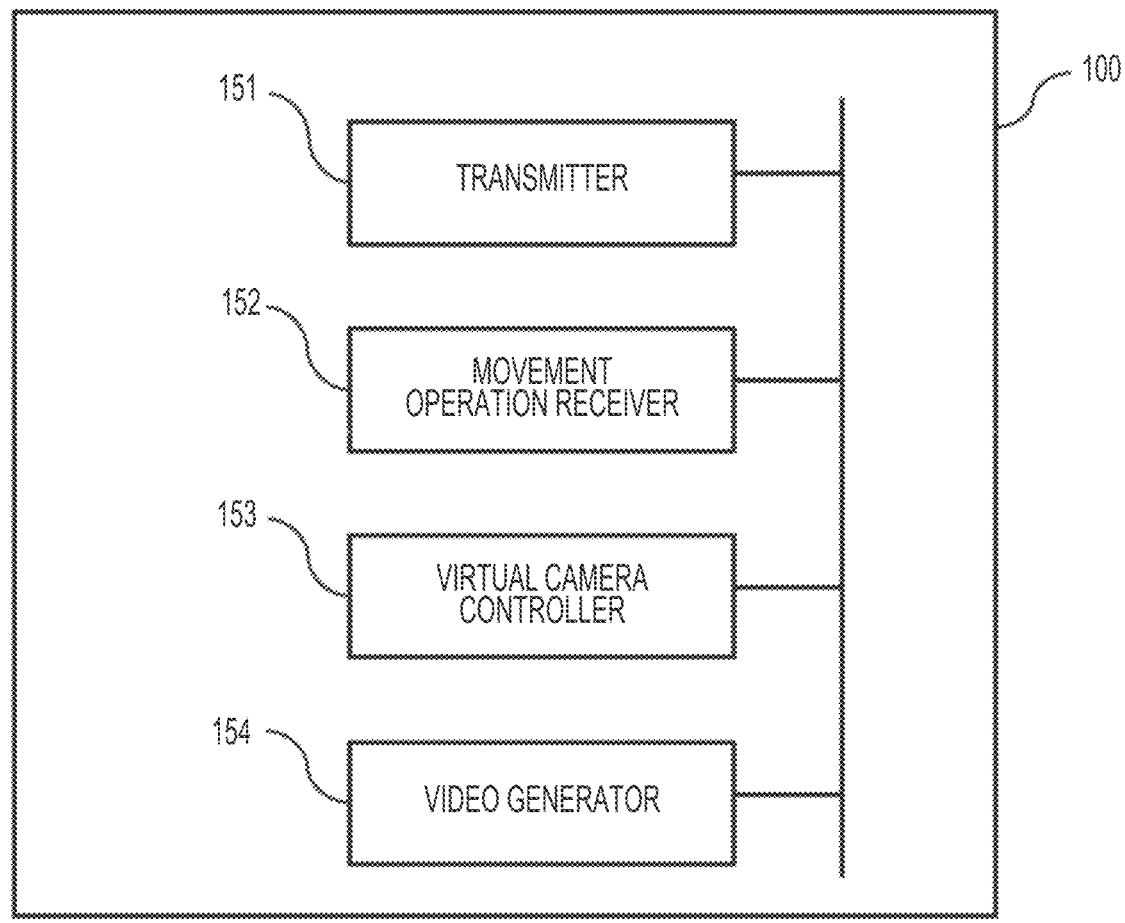
FIG. 51 is a configuration diagram showing an example of a functional configuration of a first user terminal according to a fifth embodiment of this disclosure.

As shown in FIG. 51, one or a plurality of computer processors included in the information processing system 3000 according to the fifth embodiment of this disclosure includes a transmitter 151, a movement operation receiver 152, a virtual camera controller 153, and a video generator 154.

The transmitter 151 transmits, to the second user terminal 200 of a second user, information about a video including a character object of a first user. The transmitter 151 can have the same configuration as the transmitter 141 described above.

The movement operation receiver 152 accepts a movement operation of the character object of the first user in the virtual space. The movement operation receiver 152 can have the same configuration as the movement operation receiver 142 described above.

The virtual camera controller 153 accepts camera operations of the virtual camera that captures in the virtual space. The virtual camera controller 153 can have the same configuration as the virtual camera controller 143 described above.

The video generator 154 generates information for making the character object of the first user movable in the virtual space based on the movement operation and the camera operation. The video generator 154 can have the same configuration as the video generator 144 described above.

Additionally, the video generator 154 in this disclosure can generate information for displaying the character object of one or more other users in the video.

The video thus generated is called a collaborative video, and the first user is a "host user" and the other users are "guest users." Details of the collaborative video are mentioned above. A viewing user (second user) sends a request to participate in the above-mentioned video via a collaborative distribution participation request confirmation screen displayed by pressing the collaboration request button V15 shown in FIG. 12. The video generator 154 causes the character object of the viewing user (other user) who made the participation request to be displayed on the video in response to the participation request received by the receiver. The character object of the other user may be generated based on the movement of the other user, or may be based on the operation of the other user. Hereinafter, a guest user who is participating in the collaboration is referred to as an "other user", and a viewing user who is not participating in the collaboration is referred to as a "second user."

Figure 52:
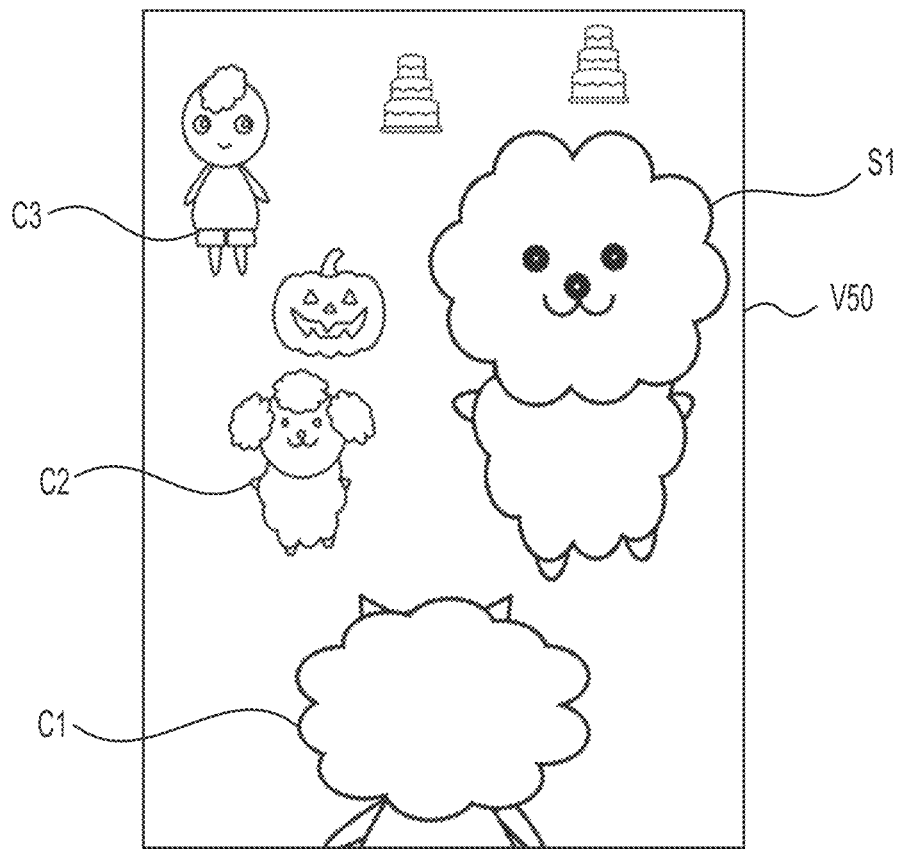
FIG. 52 is a conceptual diagram showing an image of a screen displayed on a user terminal.

FIG. 52 shows an image of the screen V50 displaying a video in which the character object C1 of the first user (host user) and the character objects C2 and C3 of other users (guest users) are displayed.

The display start position of the character object of another user is set to the first region. When the display request is made during the display of the first video, the character objects are displayed in an aligned state because all the character objects are in the first region (FIGS. 15 and 16). When the display request is made during the display of the second video, the user other than the other user who made the display request can freely move in the first region or the second region, and therefore can be displayed in a scattered state.

If the video is switched to the second video during the collaboration in the first video, the second video starts from a state in which all the character objects are in the first region. Specifically, in the first video, a virtual camera VC1 that captures a character object from the center side of the virtual space is applied (FIG. 24), and in the second video, a virtual camera VC2 that captures a character object from the edge side of the virtual space (the side facing the virtual camera VC1) is applied (FIG. 25). Therefore, at the start of the second video, a video in a state of being captured by the virtual camera VC2 is displayed from behind the character object.

Then, the transmitter 151 in this disclosure transmits, to the second user terminal 200, a video of the first-person viewpoint or the third-person viewpoint of the character object C1 of the first user.

Here, the video transmitted to the second user terminal 200 is a second video. That is, the collaborative video in the fifth embodiment is a video in which the world function is being executed.

Figure 53:
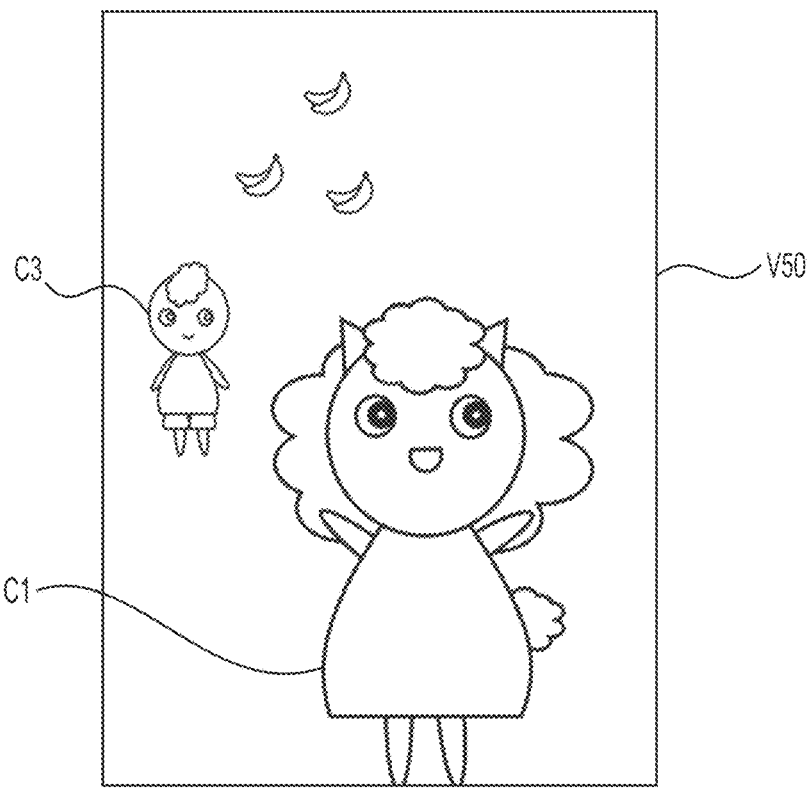
FIG. 53 is a conceptual diagram showing an image of a screen displayed on a user terminal.

FIG. 52 is an example showing a video of the third-person viewpoint of the character object C1 of the first user, and the back of the head of the character object C1 of the first user and the character objects C2 and 3 of another user are displayed. Meanwhile, FIG. 53 is an example showing a video of the first-person viewpoint of the character object C2 of another user, and the character object C1 of the first user and the character object C3 of another user are displayed. The positions of the character object and other objects are not related in FIGS. 52 and 53.

The switching between the first-person viewpoint and the third-person viewpoint can be performed by operating the third operation UI 53 shown in FIG. 47. Other users can operate their own character object while their own character object participates in the collaboration, and the first operation UI 51, the second operation UI 52, and the third operation UI 53 shown on the screen D50 are displayed on the screens of their own terminals.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Specifically, by providing the collaboration function also in the second video, the quality of the video as the content is further improved. Also, this leads to revitalization of interaction among users participating in the collaboration, interaction between users participating in the collaboration and viewing users, and further interaction among viewing users.

Furthermore, by improving the quality of the video, the viewing motivation of viewing users is improved, and as the number of viewing users increases, the distribution motivation of distributing users is also improved.

Additionally, the transmitter 151 can transmit, to the second user terminal 200, information about a plurality of videos of the first-person viewpoint or the third-person viewpoint of the character object of the first user, and the first-person viewpoint or the third-person viewpoint of the character object of another user.

Figure 54:
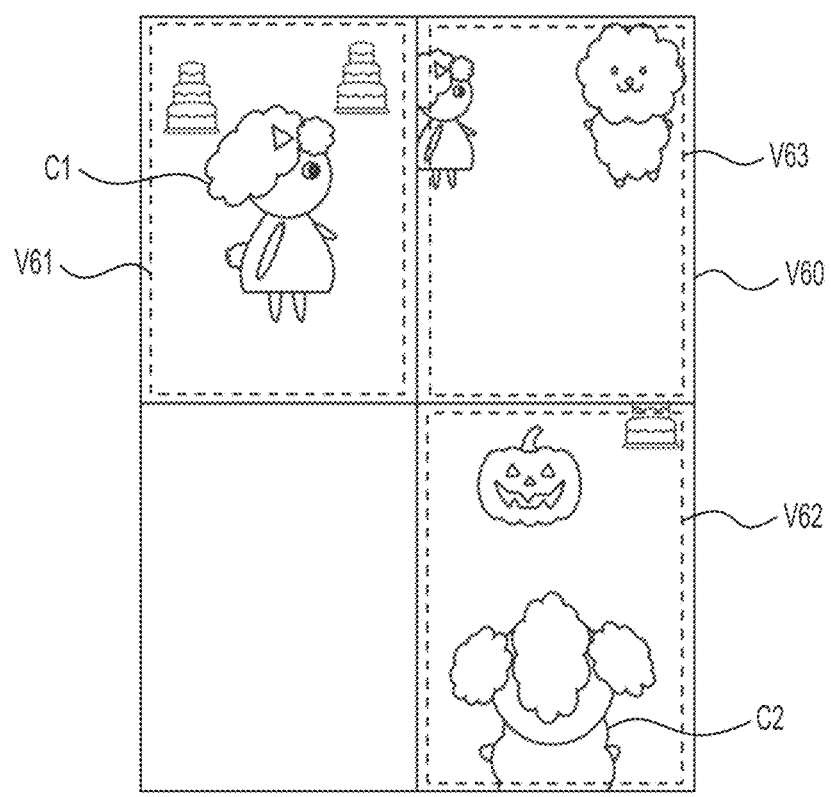
FIG. 54 is a conceptual diagram showing an image of a screen displayed on a user terminal.

FIG. 54 shows, as an example, an example in which (i) a display field V61 of a video of the third-person viewpoint of the character object C1 of the first user, (ii) a display field V62 of a video of the third-person viewpoint of the character object C2 of another user, and (iii) a display field V63 of a video of the first-person viewpoint of the character object C3 of another user are displayed on one screen V60.

(i) Whether to display only the screen of the viewpoint of the character object of the first user as in the example shown in FIGS. 52 and 53, or (ii) whether to display the screens of the viewpoints of the character objects of all users in a divided manner as in the example shown in FIG. 54, can be determined by the selection of the first user or the second user, as will be described later. In FIG. 54, there are blanks because there are two guests participating in the collaboration, but a third guest can be displayed here.

FIG. 54 shows an example in which the display field is equally divided by quadrangles. The shape of the display field is not particularly limited, and the size of the display field may be such that the first user is large and the other users are small.

FIG. 54 shows a state in which various display and operation UIs are not displayed, but as shown in FIGS. 8 and 12, various display and operation UIs may be superimposed and displayed.

The screens of the users participating in the collaboration (first user and other users) may display only their own first-person/third-person screens, respectively. The first/third person screens of all may be displayed as shown in FIG. 54. These may be switchable by the selection of each user participating in the collaboration.

Figure 55:
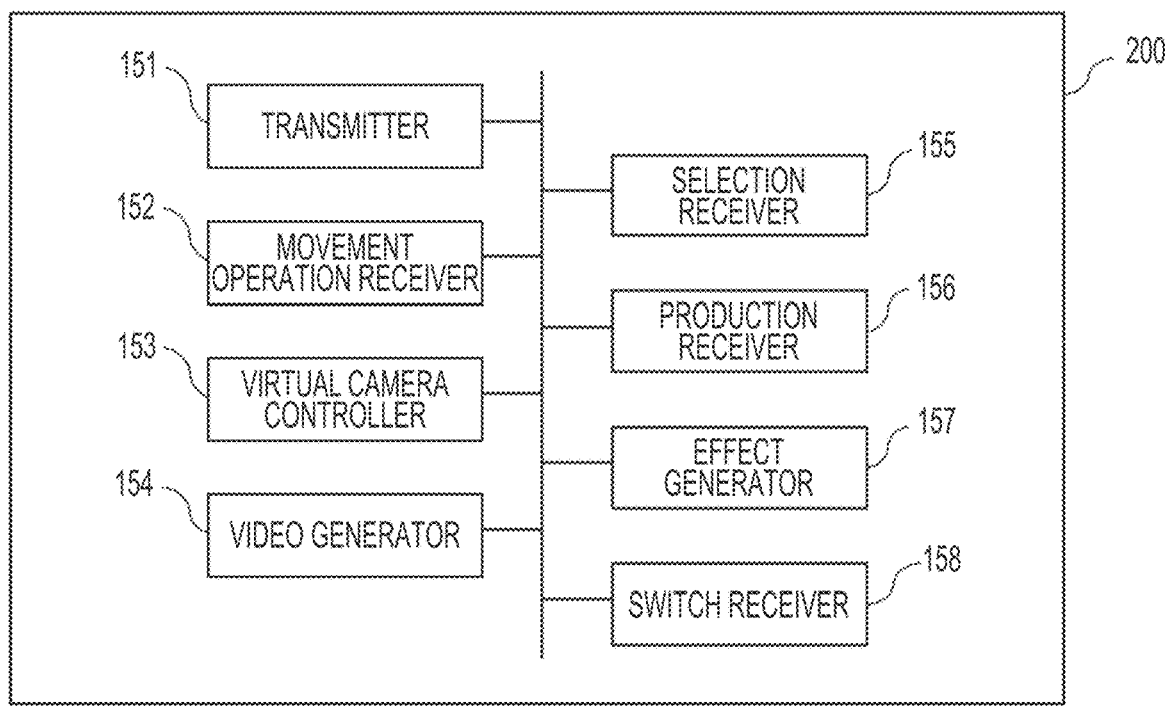
FIG. 55 is a configuration diagram showing another example of the functional configuration of the first user terminal according to the fifth embodiment of this disclosure.

Additionally, the one or more computer processors in this disclosure may include a selection receiver 155, as shown in FIG. 55.

The selection receiver 155 accepts the selection of one user from among the first user and one or more other users, by the first user or the second user.

That is, the first user who is the host user or the second user who is the viewing user can select one user from among the users participating in the collaboration.

At this time, the transmitter 151 can transmit information about the video according to the selection accepted by the selection receiver 155.

Specifically, when the selection receiver 155 accepts the selection of one other user from among one or more other users by the first user, the transmitter 151 transmits information about the first-person viewpoint video of the one other user.

This assumes, for example, that the character object of the first user is a performer and the other selected user is a cameraman. Normally, the first user needs to operate the virtual camera at the same time as operating his/her own movement and/or the character object. However, in order to generate a higher quality video, it is easier to delegate the authority to operate the camera to another user. At this time, since the character object of the selected other user is the staff behind the scenes, the video is automatically set as the first-person view instead of the third-person view.

When the selection receiver 155 accepts the selection of one user from the first user and one or more other users by the second user, the transmitter 151 may transmit, to the second user terminal, information about the video of the first-person viewpoint or the third-person viewpoint of the character object of the selected user.

The screen of the second user may display (i) a video of the viewpoint of the character object of the user selected by the user, or (ii) a video of the viewpoint of the character object of the user having the largest number of selections (voting) by a plurality of second users including himself/herself and other second users. The type of viewpoint displayed at this time (first-person viewpoint/third-person viewpoint) may be the type of viewpoint selected by the user who provides the video of the viewpoint, and may be further selected by the first user or the second user.

Further, in the above example, a plurality of second users votes fairly, but the configuration may be such that a specified second user can determine a video to be displayed to all other second users. The specified second user is, for example, (i) a user who has many points calculated based on gift display requests, the value of the gifts for which the display requests are made, or the like (for example, a user who has a large gifting amount), (ii) a user who has viewed the video distributed by the first user many times, or the like.

Further, when the selection receiver 155 accepts the selection of one other user from among one or more other users by the first user, as shown in FIG. 55, the one or more computer processors in this disclosure may further include a production receiver 156 and an effect generator 157.

The production receiver 156 receives a request from other users to display a production effect on the video.

The effect generator 157 generates the production effect on the video in response to the display request received by the production receiver 156.

Figure 56:
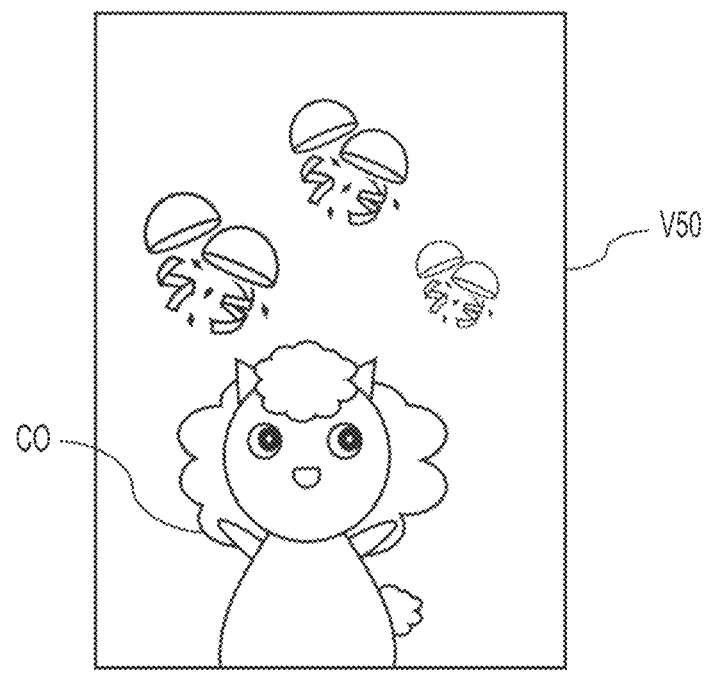
FIG. 56 is a conceptual diagram showing an image of a screen displayed on a user terminal.

As an example, as shown in FIG. 56, the production effect includes, but is not limited to, displaying another object or generating a sound effect. The other object can be a production object such as a confetti object, a cracker object, a decorated vessel object, or the like.

Then, the transmitter 151 transmits information about the video in which the production effect is generated.

This assumes, for example, that the character object of the first user is a performer and the other selected user is a special effects staff member. Normally, the first user needs to perform the operation of activating the production effect while performing his/her own movement and/or the operation of the character object. However, in order to generate a higher quality video, it is easier to delegate the authority of the activation operation to another user.

Furthermore, when the selection receiver 155 accepts the selection of one other user from among one or more other users by the first user, the one or more computer processors in this disclosure may further include a switching receiver 158.

The switch receiver 158 receives a request for switching an object to a video from another user.

The object switching request is a request to change the above-mentioned second object to another second object. In the above example, the condition for changing the second object is described as the arrival of a scheduled time, the lapse of a scheduled period, or a change instruction from the first user or another user. However, the change instruction from another user corresponds to this example.

Figure 57:
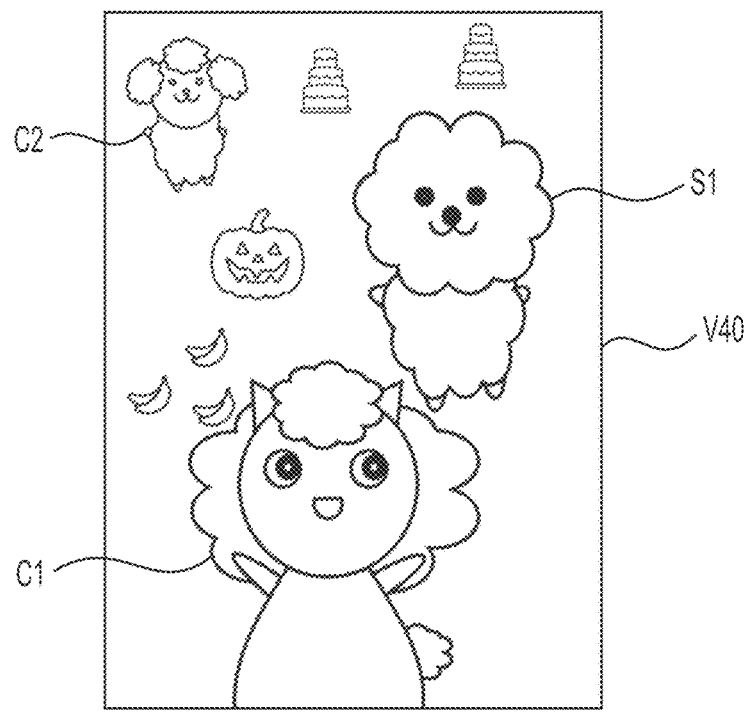
FIG. 57 is a conceptual diagram showing an image of a screen displayed on a user terminal.
Figure 58:
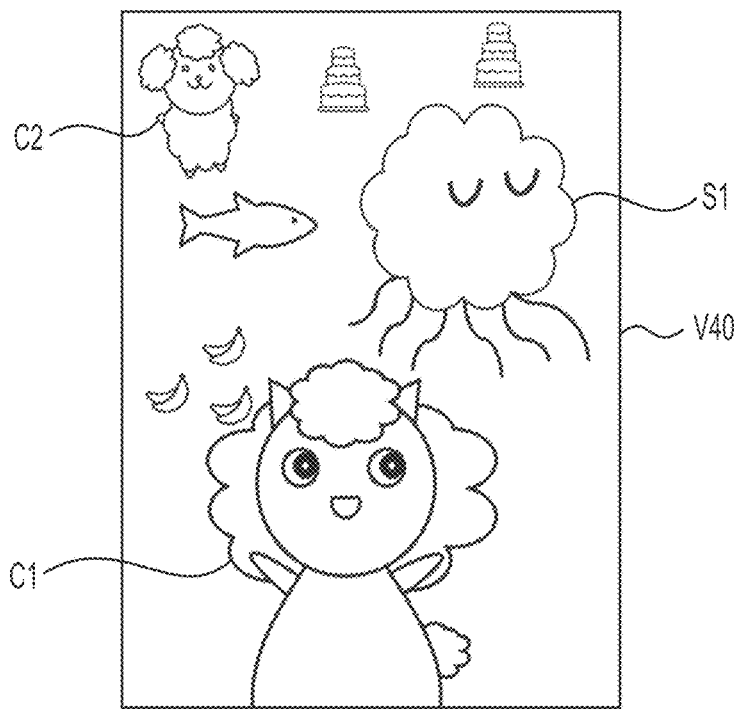
FIG. 58 is a conceptual diagram showing an image of a screen displayed on a user terminal.

In response to the switching request received by the switching receiver 158, the video generator 154 can change an object other than the character object C1 of the first user and the character object C2 of another user displayed in the virtual space to another object (FIGS. 57 and 58).

As shown in FIGS. 57 and 58, there may be objects that are partially unchanged (tower cake objects, or the like).

When the viewing user requests the display of an attached gift, a display instruction object for displaying a gift object corresponding to the attached gift in a video in response to such a display request may be displayed on the screen of one other user whose selection by the first user or the second user is accepted by the selection receiver 155. This allows other users to cause the first user (or a guest user other than other users) to wear and display the attached gift object at their own preferred timing.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or the users' motivation to interact with each other.

The first to fifth embodiments described above can be combined with each other, or some of these embodiments can be combined with each other.

Subsequently, an information processing method in the embodiment of this disclosure will be described.

The information processing method in the embodiment of this disclosure is the information processing method in the information processing system 3000 shown in FIG. 3. The information processing system 3000 includes one or more first user terminals 100, the second user terminals 200, and the server device 400.

Figure 59:
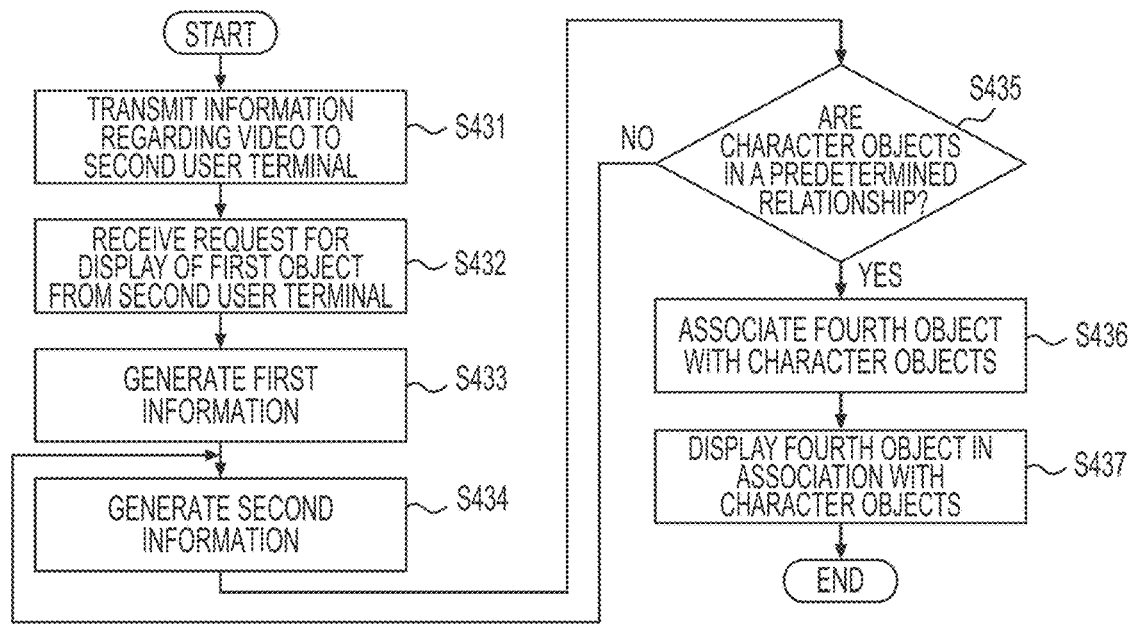
FIG. 59 is a flowchart showing an example of a flow of an information processing method in this disclosure.

In an information processing method in this disclosure, as shown as an example in FIG. 59, one or more computer processors included in the information processing system 3000 are caused to execute steps S431-S437.

Step S431 transmits, to the second user terminal 200 of a second user, information about a video including a character object of a first user. Step S431 can be executed by the transmitter 431 described above.

Step S431 may be executed at the server side (server device 400) or may be executed at the client side (first user terminal 100).

Step S432 receives a display request for a first object from the second user terminal 200. The step S432 can be executed by the receiver 432 described above.

Step S432 may be executed at the server side (server device 400) or may be executed at a client side (first user terminal 100).

Step S433 generates first information for displaying, as a first video, the character object of the first user and the first object in a first region in a virtual space. The step S433 can be executed by the first video generator 433 described above.

Step S433 may be executed at the server side (server device 400) or may be executed at the client side (first user terminal 100).

Step S434 generates second information for (i) causing a second object different from the first object, and a third object different from the first object and the second object, to be displayed in a second region in the virtual space, as a second video, and (ii) displaying the character object of the first user so as to be movable in the first region and the second region. The step 434 can be executed by the second video generator 434 described above.

Step S434 may be executed at the server side (server device 400) or may be executed at the client side (first user terminal 100).

When the character object of the first user and the third object have a predetermined relationship (YES in step S435), step S436 associates, with the character object of the first user, a fourth object associated with the third object. The steps S435 and S436 can be executed by the association section 435 described above.

Steps S435 and S436 may be executed at the server side (server device 400) or at the client side (first user terminal 100).

Then, in step S437, when the fourth object is associated with the character object of the first user in step S436, the fourth object is displayed in association with the character object of the first user. The step S437 can be executed by the second video generator 434 described above.

Step S437 may be executed at the server side (server device 400) or may be executed at the client side (first user terminal 100).

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, a computer program according to an embodiment of this disclosure will be described.

As shown in FIG. 3, a computer program according to an embodiment of this disclosure is a computer program executed by the information processing system 3000 that distributes videos. The information processing system 3000 includes one or more first user terminals 100, the second user terminals 200, and the server device 400.

A computer program in this disclosure causes one or more computer processors provided with the information processing system 3000 to realize a transmission function, a reception function, a first video generation function, a second video generation function, and an association function.

The transmission function transmits, to the second user terminal 200 of a second user, information about a video including a character object of a first user.

The reception function receives, from the second user terminal 200, a display request for a first object.

The first video generation function generates first information for displaying the character object of the first user and the first object in the first region in a virtual space, as a first video.

The second video generation function generates a second information for (i) causing a second object different from the first object, and a third object different from the first object and the second object, to be displayed in a second region in the virtual space, as a second video, and (ii) displaying the character object of the first user so as to be movable in the first region and the second region.

The association function associates, with the character object of the first user, a fourth object associated with the third object, when the character object of the first user and the third object have a predetermined relationship.

Then, when the fourth object is associated with the character object of the first user by the association function, the second video generation function displays the fourth object in association with the character object of the first user.

Figure 60:
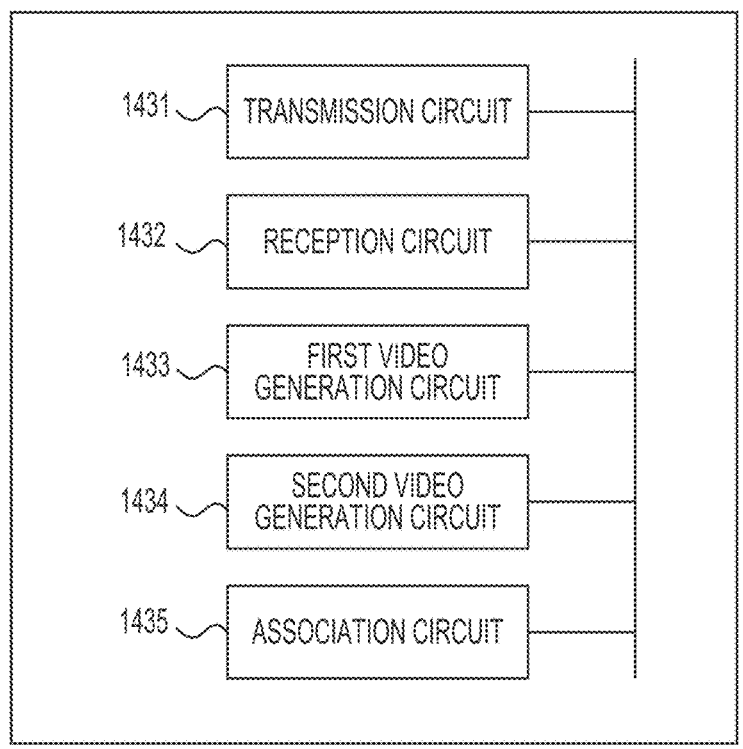
FIG. 60 is a circuit configuration diagram showing an example of a circuit configuration for realizing a computer program in this disclosure.

The above functions can be realized by a transmission circuit 1431, a reception circuit 1432, a first video generation circuit 1433, a second video generation circuit 1434, and an association circuit 1435 that are shown in FIG. 60. The transmission circuit 1431, the reception circuit 1432, the first video generation circuit 1443, the second video generation circuit 1434, and the association circuit 1435 are realized by the transmitter 431, the receiver 432, the first video generator 433, the second video generator 434, and the association portion 435 described above, respectively. Details of each component are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing device according to an embodiment of this disclosure will be described. The information processing device corresponds to the first user terminal 100 in the information processing system 3000 described above.

Figure 61:
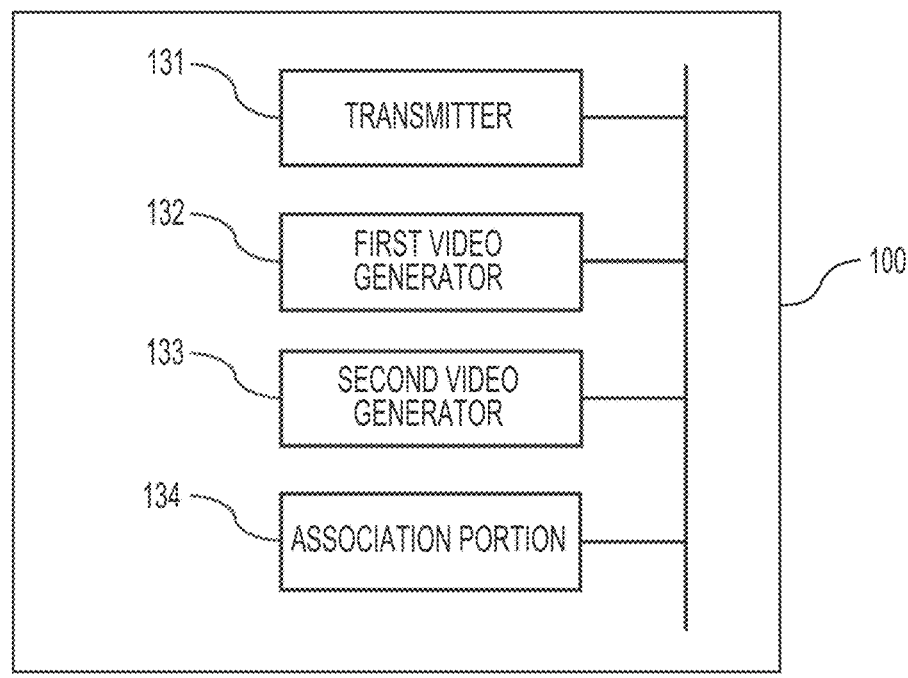
FIG. 61 is a configuration diagram showing an example of a functional configuration of the first user terminal in this disclosure.

As shown in FIG. 61, the information processing device includes a transmitter 131, a first video generator 132, a second video generator 133, and an association portion 134.

The transmitter 131 transmits, to the server device 400, information about a video including a character object of a first user.

The first video generator 132 generates first information for displaying, as a first video, the character object of the first user and a first object for which a display request has been made from a second user terminal, in a first region in a virtual space. The first video generator 132 can have the same configuration as the first video generator 433 described above.

The second video generator 133 generates second information for (i) causing a second object different from the first object, and a third object different from the first object and the second object to be displayed in a second region in the virtual space, as a second video, and (ii) displaying the character object of the first user so as to be movable in the first region and the second region. The second video generator 133 may have the same configuration as the second video generator 434 described above.

The association portion 134 associates, with the character object of the first user, a fourth object associated with the third object, when the character object of the first user and the third object have a predetermined relationship. The association portion 134 may have the same configuration as the association portion 435 described above.

When the fourth object is associated with the character object of the first user by the association portion 134, the second video generator 133 displays the fourth object in association with the character object of the first user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing method in an embodiment of this disclosure will be described. The information processing method is an information processing method executed by the information processing device (first user terminal 100) described above.

Figure 62:
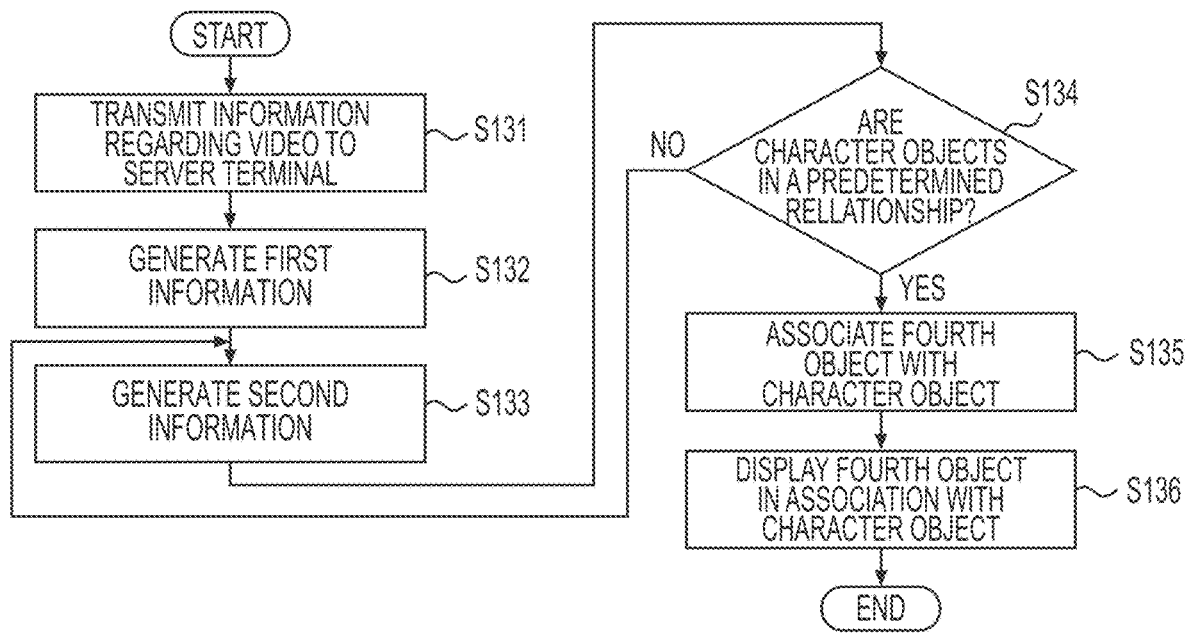
FIG. 62 is a flow chart showing an example of a flow of an information processing method in the first user terminal in this disclosure.

As shown in FIG. 62 as an example, an information processing method in this disclosure causes one or more computer processors provided with the information processing device to execute steps S131-136.

Step S131 transmits, to the server device 400, information about a video including a character object of a first user. The step S131 can be executed by the transmitter 131 described above.

Step S132 generates first information for causing the character object of the first user and a first object for which a display request has been made from a second user terminal to be displayed in a first region in a virtual space, as a first video. The step S132 can be executed by the first video generator 132 described above.

Step S133 generates second information for (i) displaying, as a second video, a second object different from the first object, and a third object different from the first object and the second object, in a second region in the virtual space, and (ii) displaying the character object of the first user so as to be movable in the first region and the second region. The step S133 can be executed by the second video generator 133 described above.

When the character object of the first user and the third object have a predetermined relationship (YES in step S134), step S135 associates, with the character object of the first user, a fourth object associated with the third object.

When the fourth object is associated with the character object of the first user in step S135, step S136 displays the fourth object in association with the character object of the first user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, a computer program according to an embodiment of this disclosure will be described. The computer program is a computer program executed in the information processing device (first user terminal 100) described above.

A computer program in this disclosure causes one or more computer processors provided with the information processing system to realize a transmission function, a first video generation function, a second video generation function, and an association function.

The transmission function transmits, to the server device 400, information about a video including a character object of a first user.

The first video generation function generates first information for causing the character object of the first user and a first object for which a display request has been made from the second user terminal 200 to be displayed in the first region in the virtual space, as a first video.

The second video generation function generates second information for (i) causing a second object different from the first object, and the third object different from the first object and the second object, to be displayed in a second region in the virtual space, as a second video, and (ii) displaying the character object of the first user so as to be movable in the first region and the second region.

When the character object of the first user and the third object have a predetermined relationship, the association function associates, with the character object of the first user, a fourth object associated with the third object.

When the fourth object is associated with the character object of the first user by the association function, the second video generation function displays the fourth object in association with the character object of the first user.

Figure 63:
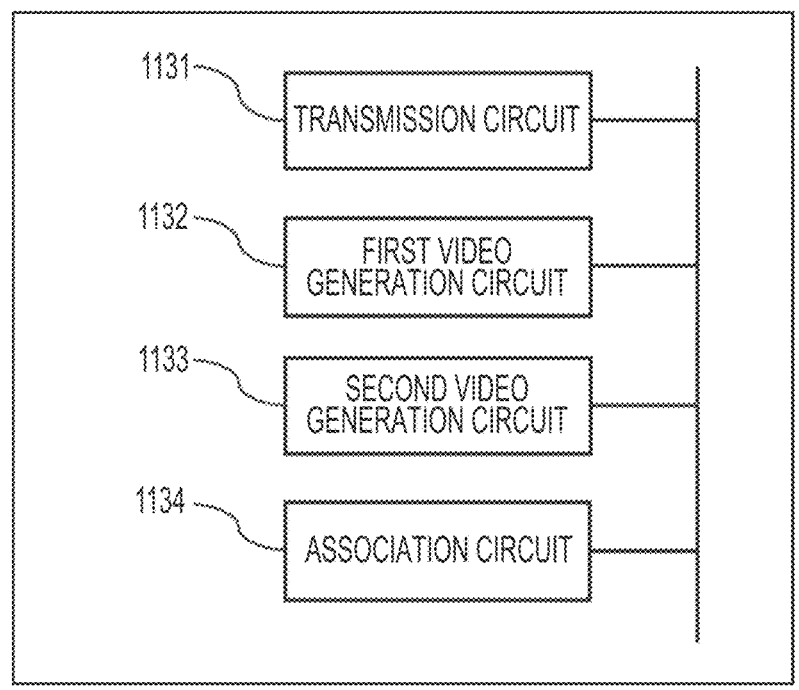
FIG. 63 is a circuit configuration diagram showing an example of a circuit configuration for realizing a computer program executed by the first user terminal in this disclosure.

The above functions can be realized by a transmission circuit 1131, a first video generation circuit 1132, a second video generation circuit 1133, and an association circuit 1134 that are shown in FIG. 63. The transmission circuit 1131, the first video generation circuit 1132, the second video generation circuit 1133, and the association circuit 1134 are realized by the transmitter 131, the first video generator 132, the second video generator 133, and the association portion 134 described above, respectively. Details of each component are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users motivation' to interact with each other.

Next, an information processing device according to an embodiment of this disclosure will be described. The information processing device corresponds to the second user terminal 200 in the information processing system 3000 described above.

Figure 64:
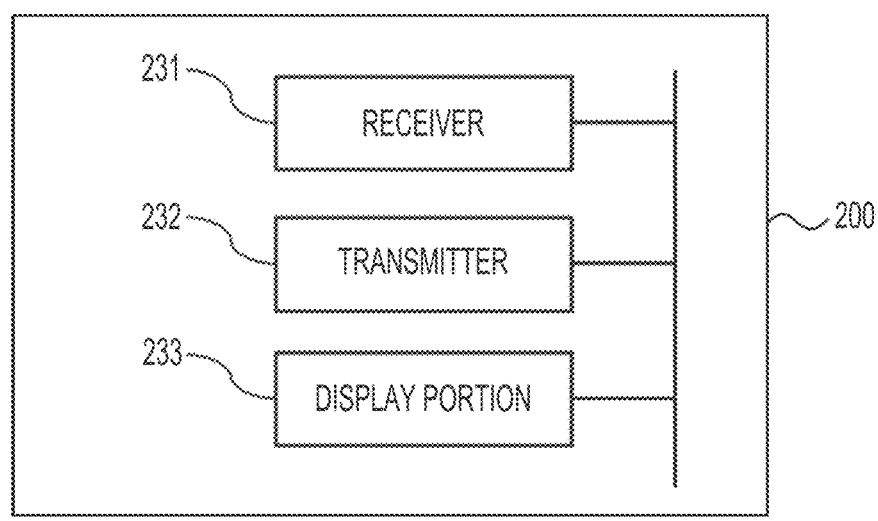
FIG. 64 is a configuration diagram showing an example of the functional configuration of the second user terminal in this disclosure.

As shown in FIG. 64, the information processing device includes a receiver 231, a transmitter 232, and a display portion 233.

The receiver 231 receives, from the server device 400, information about a video including a character object of a first user.

The transmitter 232 transmits, to the server device 400, a display request for a first object.

The display portion 233 (i) displays, as a first video, the character object of the first user and the first object in the first region in a virtual space, (ii) displays, as a second video, a second object different from the first object, and the third object different from the first object and the second object, in a second region in the virtual space, and (iii) displays the character object of the first user so as to be movable in the first region and the second region.

When the character object of the first user and the third object have a predetermined relationship, the display portion 233 displays the character object of the first user in association with a fourth object.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing method in an embodiment of this disclosure will be described. The information processing method is an information processing method executed by the information processing device (second user terminal 200) described above.

Figure 65:
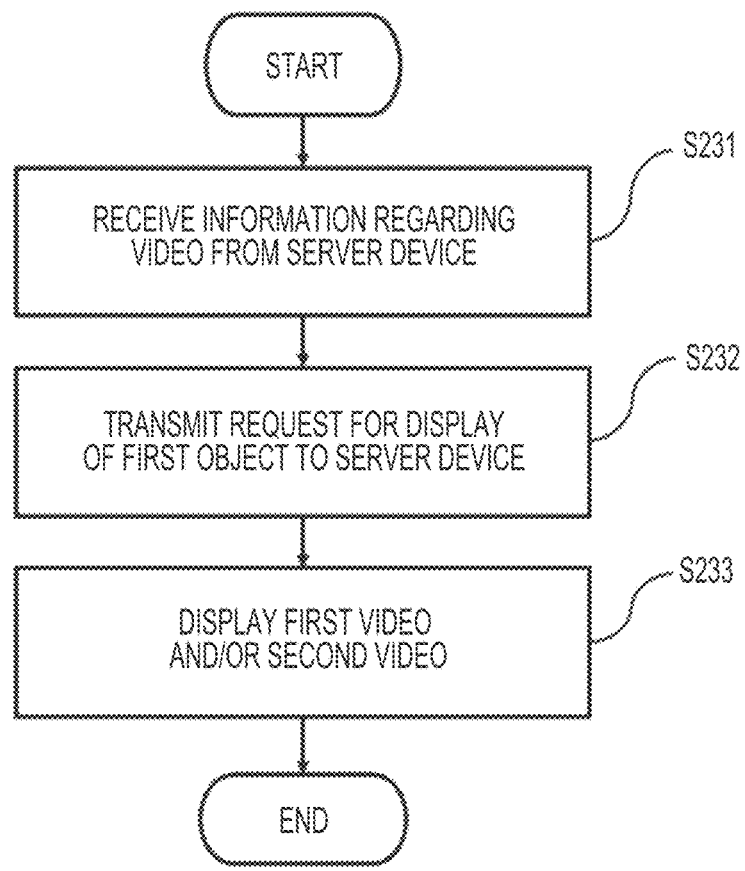
FIG. 65 is a flow chart showing an example of a flow of an information processing method in the second user terminal in this disclosure.

As shown in FIG. 65 as an example, an information processing method in this disclosure causes one or more computer processors provided with the information processing device to execute steps S231 to S233.

The reception step S231 receives, from the server device 400, information about a video including a character object of a first user. The reception step S231 can be executed by the receiver 231 described above.

The transmission step S232 transmits, to the server device 400, a display request for a first object. The transmission step S232 can be executed by the transmitter 232 described above.

The display step S233 (i) displays, as a first video, the character object of the first user and a first object in the first region in the virtual space, (ii) displays, as a second video, a second object different from the first object, and the third object different from the first object and the second object, in a second region in the virtual space, and (iii) displays the character object of the first user so as to be movable in the first region and the second region. The display step S233 can be executed by the display portion 233 described above.

When the character object of the first user and the third object have a predetermined relationship, the display step S233 displays the character object of the first user in association with a fourth object associated with the third object.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

A computer program according to an embodiment of this disclosure will be described. The computer program is a computer program executed by the information processing device (second user terminal 200) described above.

A computer program in this disclosure causes one or more processors included in an information processing system to realize a reception function, a transmission function, and a display function.

The reception function receives, from the server device 400, information about a video including a character object of a first user.

The transmission function transmits, to the server device 400, a display request for a first object.

The display function (i) displays, as a first video, the character object of the first user and the first object in a first region in a virtual space, (ii) displays, as a second video, a second object different from the first object, and the third object different from the first object and the second object, in a second region in the virtual space, and (iii) displays the character object of the first user so as to be movable in the first region and the second region.

When the character object of the first user and the third object have a predetermined relationship, the display function displays the character object of the first user in association with a fourth object associated with the third object.

Figure 66:
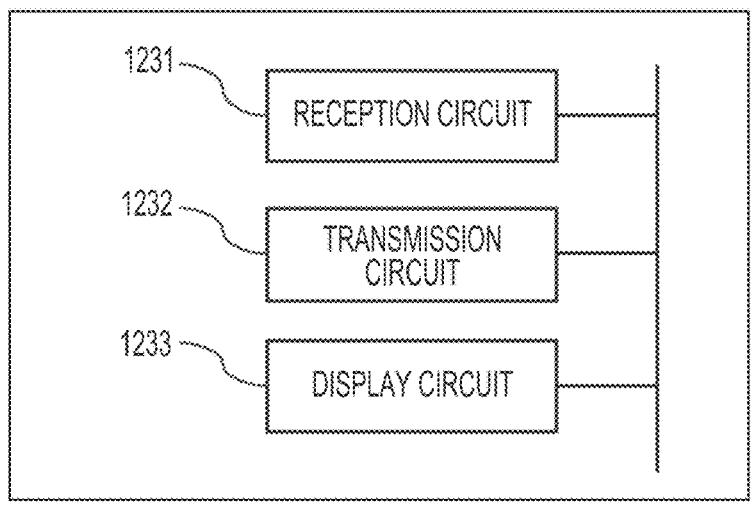
FIG. 66 is a circuit configuration diagram showing an example of a circuit configuration for realizing a computer program executed by the second user terminal in this disclosure.

The above functions can be realized by a reception circuit 1231, a transmission circuit 1232, and a display circuit 1233 that are shown in FIG. 66. The reception circuit 1231, the transmission circuit 1232, and the display circuit 1233 are realized by the receiver 231, the transmitter 232, and the display portion 233 described above, respectively. Details of each component are as described above.

Alternative configurations of this disclosure include the following.

Figure 67:
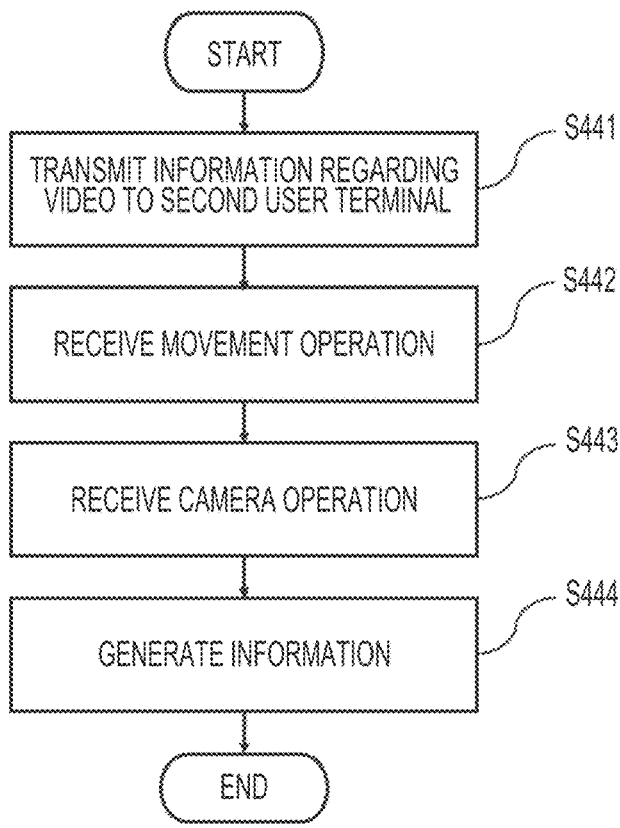
FIG. 67 is a flowchart showing an example of a flow of an information processing method in this disclosure.

An information processing method in this disclosure causes one or more computer processors provided with the information processing system 3000 to perform a transmission step S441, a movement operation reception step S442, a virtual camera control step (receive camera operation step) S443, and a video generation step S444, as shown in FIG. 67, as an example.

The transmission step S441 transmits, to the second user terminal 200 of a second user, information about a video including a character object of a first user. Such transmission step S441 can be executed by the transmitter 141 described above.

The transmission step S441 may be executed at the server side (server device 400) or may be executed at the client side (first user terminal 100).

The movement operation reception step S442 accepts a movement operation of the character object of the first user in the virtual space. The movement operation reception step S442 can be executed by the movement operation receiver 142 described above.

The movement operation reception step S442 may be executed at the server side (server device 400) or may be executed at the client side (first user terminal 100).

The virtual camera control step S443 accepts camera operations of a virtual camera that captures in the virtual space. The virtual camera control step S443 can be executed by the virtual camera controller 143 described above.

The virtual camera control step S443 may be executed at the server side (server device 400) or may be executed at the client side (first user terminal 100).

The video generation step S444 generates information for making the character object of the first user movable in the virtual space based on the movement operation and the camera operation. The video generation step S444 can be executed by the video generator 144 described above.

The video generation step S444 may be executed at the server side (server device 400) or may be executed at the client side (first user terminal 100).

In the video generation step S444, (i) a first movement operation is applied to the character object of the first user in response to a predetermined operation on a first operation UI displayed on the first user terminal 100 of the first user, (ii) a second movement operation is applied to the character object of the first user in response to a predetermined operation on a second operation UI displayed on the first user terminal, (iii) the viewpoint of the virtual camera is switched to the first-person or third-person viewpoint in response to a predetermined operation on a third operation UI displayed on the first user terminal, and (iv) virtual camera movement, rotation and/or scale operations are applied in response to predetermined operations on a region where the first operation UI, the second operation UI, and the third operation UI are not displayed on the first user terminal.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Subsequently, a computer program according to an embodiment of this disclosure will be described.

As shown in FIG. 3, a computer program according to an embodiment of this disclosure is a computer program executed by the information processing system 3000 that distributes videos. The information processing system 3000 includes one or more first user terminals 100, the second user terminals 200, and the server device 400.

The computer program in this disclosure causes one or more computer processors provided with the information processing system 3000 to realize a transmission function, a movement operation reception function, a virtual camera control function, and a video generation function.

The transmission function transmits, to the second user terminal 200 of a second user, information about a video including a character object of the first user.

The movement operation reception function accepts a movement operation of the character object of the first user in the virtual space.

The virtual camera control function accepts a camera operation of the virtual camera that captures in the virtual space.

The video generation function generates information for making the character object of the first user movable in the virtual space based on the movement operation and the camera operation.

In the video generation function, (i) a first movement operation is applied to the character object of a first user in response to a predetermined operation on a first operation UI displayed on the first user terminal 100 of the first user, (ii) a second movement operation is applied to the character object of the first user in response to a predetermined operation on a second operation UI displayed on the first user terminal, (iii) the viewpoint of the virtual camera is switched to the first-person or third-person viewpoint in response to a predetermined operation on a third operation UI displayed on the first user terminal, and (iv) virtual camera movement, rotation and/or scale operations are applied in response to predetermined operations on a region where the first operation UI, the second operation UI, and the third operation UI are not displayed on the first user terminal.

Figure 68:
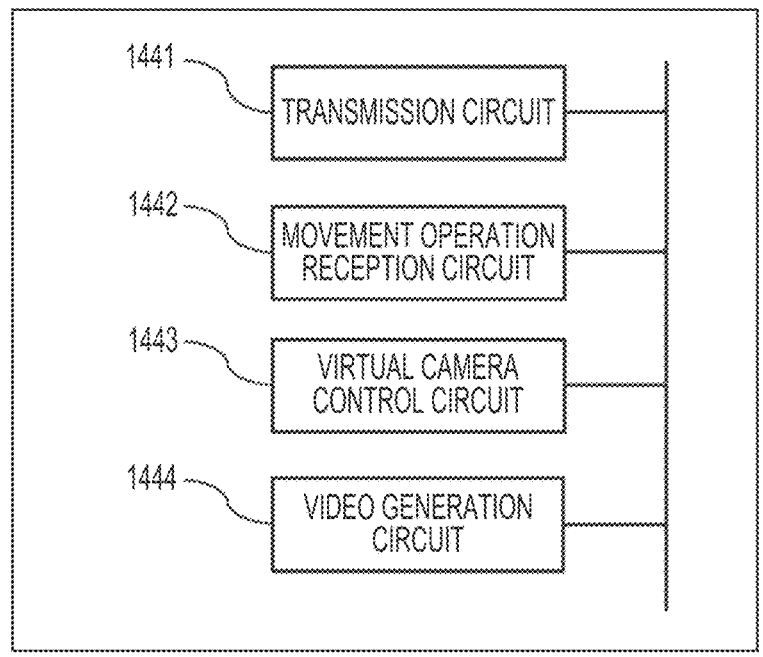
FIG. 68 is a circuit configuration diagram showing an example of a circuit configuration for realizing a computer program in this disclosure.

The above functions can be realized by a transmission circuit 1441, a movement operation reception circuit 1432, a virtual camera control circuit 1443, and a video generation circuit 1444 that are shown in FIG. 68. The transmission circuit 1441, the movement operation reception circuit 1432, the virtual camera control circuit 1443, and the video generation circuit 1444 are realized by the transmitter 141, the movement operation receiver 142, the virtual camera controller 143, and the video generator 144 described above, respectively. The details of each part are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or the users' motivation to interact with each other.

Subsequently, an information processing device according to an embodiment of this disclosure will be described. The information processing device corresponds to the first user terminal 100 in the above-mentioned information processing system 3000.

As shown in FIG. 46, the information processing device includes the transmitter 141, the movement operation receiver 142, the virtual camera controller 143, and the video generator 144.

The transmitter 141 transmits, to the server device, information about a video including a character object of a first user. The details of the transmitter 141 are as described above.

The movement operation receiver 142 accepts a movement operation of the character object of the first user in the virtual space. The details of the transmitter 141 are as described above.

The virtual camera controller 143 accepts a camera operation of the virtual camera that captures in the virtual space. The details of the virtual camera controller 143 are as described above.

The video generator 144 generates information for making the character object of the first user movable in the virtual space based on the movement operation and the camera operation. The details of the video generator 144 are as described above.

(i) A first movement operation is applied to the character object of the first user in response to a predetermined operation on a first operation UI displayed on the first user terminal 100 of the first user, (ii) a second movement operation is applied to the character object of the first user in response to a predetermined operation on a second operation UI displayed on the first user terminal, (iii) the viewpoint of the virtual camera is switched to the first-person or third-person viewpoint in response to a predetermined operation on a third operation UI displayed on the first user terminal, and (iv) virtual camera movement, rotation and/or scale operations are applied in response to predetermined operations on the region where the first operation UI, the second operation UI, and the third operation UI are not displayed on the first user terminal.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Subsequently, an information processing method in an embodiment of this disclosure will be described. Such an information processing method is an information processing method executed by the above-mentioned information processing device (first user terminal 100).

Figure 69:
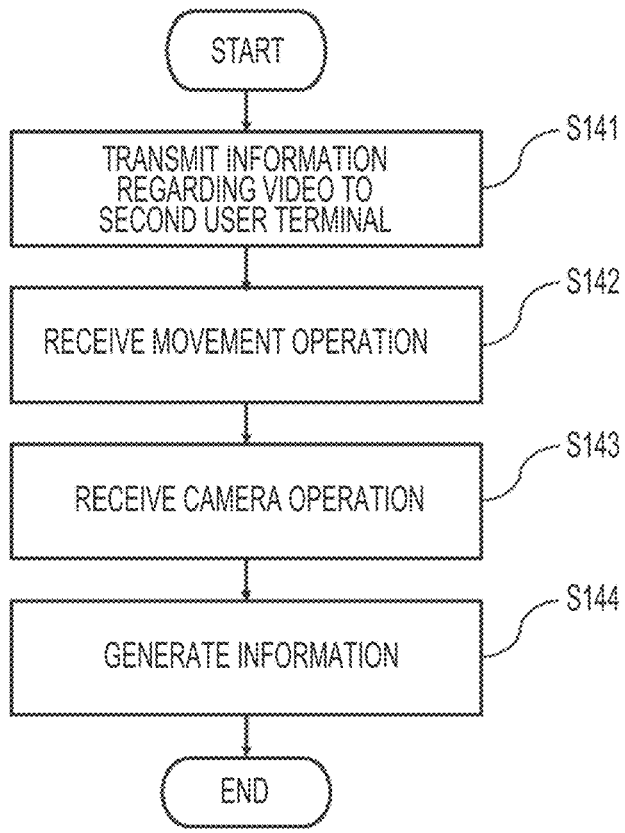
FIG. 69 is a flowchart showing an example of a flow of an information processing method in the first user terminal in this disclosure.

As shown in FIG. 69 as an example, an information processing method in this disclosure causes one or more computer processors provided with the information processing device to execute a transmission step S141, a movement operation reception step S142, a virtual camera control step (receive camera operation step) S143, and a video generation step S144.

The transmission step S141 transmits, to the server device, 400, information about a video including a character object of a first user. The transmission step S141 can be executed by the transmitter 141 described above.

The movement operation reception step S142 accepts a movement operation of the character object of the first user in the virtual space. The movement operation reception step S142 can be executed by the movement operation receiver 142 described above.

The virtual camera control step S143 accepts a camera operation of a virtual camera that captures in the virtual space. The virtual camera control step S143 can be executed by the virtual camera controller 143 described above.

The video generation step S144 generates information for making the character object of the first user movable in the virtual space based on the movement operation and the camera operation. The video generation step S144 can be executed by the video generator 144 described above.

In the video generation step S144, (i) a first movement operation is applied to the character object of the first user in response to a predetermined operation on a first operation UI displayed on the first user terminal 100 of the first user, (ii) a second movement operation is applied to the character object of the first user in response to a predetermined operation on a second operation UI displayed on the first user terminal, (iii) the viewpoint of the virtual camera is switched to the first-person or third-person viewpoint in response to a predetermined operation on a third operation UI displayed on the first user terminal 100, and (iv) virtual camera movement, rotation and/or scale operations are applied in response to predetermined operations on the region where the first operation UI, the second operation UI, and the third operation UI are not displayed on the first user terminal.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Subsequently, a computer program according to an embodiment of this disclosure will be described. The computer program is a computer program executed in the above-mentioned information processing device (first user terminal 100).

The computer program in this disclosure causes one or more processors provided with the information processing system to realize a transmission function, a movement operation reception function, a virtual camera control function, and a video generation function.

The transmission function transmits, to the server device 400, information about a video including a character object of a first user.

The movement operation reception function accepts a movement operation of the character object of the first user in a virtual space.

The virtual camera control function accepts a camera operation of a virtual camera that captures in the virtual space.

The video generation function generates information for making the character object of the first user movable in the virtual space based on the movement operation and the camera operation.

The video generation function (ii) applies a first movement operation to the character object of the first user in response to a predetermined operation on a first operation UI displayed on the first user terminal 100 of the first user, (ii) applies a second movement operation to the character object of the first user in response to a predetermined operation on a second operation UI displayed on the first user terminal 100, (iii) switches the viewpoint of the virtual camera to the first-person or third-person viewpoint in response to a predetermined operation on a third operation UI displayed on the first user terminal 100, and (iv) applies virtual camera movement, rotation and/or scale operations in response to predetermined operations on a region where the first operation UI, the second operation UI, and the third operation UI are not displayed on the first user terminal.

Figure 70:
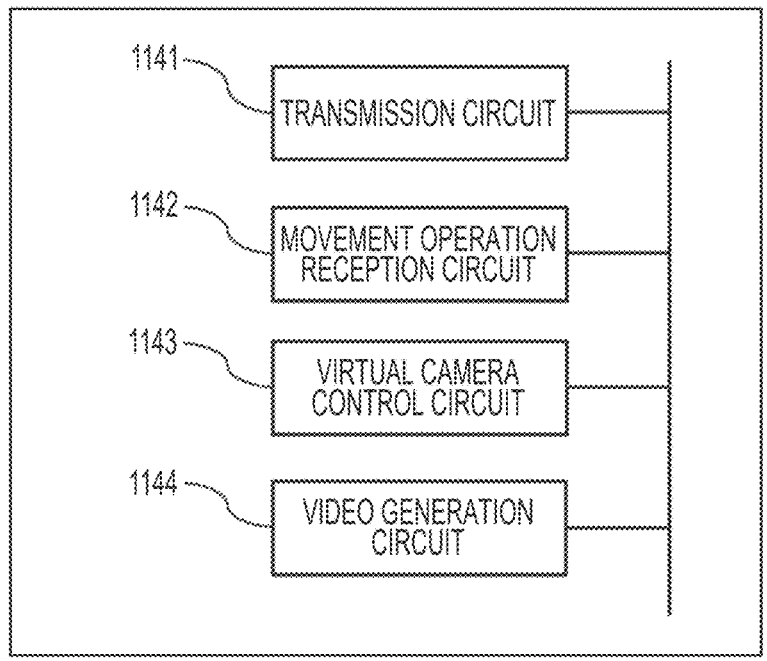
FIG. 70 is a circuit configuration diagram showing an example of a circuit configuration for realizing a computer program executed by the first user terminal in this disclosure.

The above functions can be realized by a transmission circuit 1441, a movement operation reception circuit 1142, a virtual camera control circuit 1143, and a video generation circuit 1144 that are shown in FIG. 70. The transmission circuit 1141, the movement operation reception circuit 1142, the virtual camera control circuit 1143, and the video generation circuit 1144 are realized by the transmitter 141, the movement operation receiver 142, the virtual camera controller 143, and the video generator 144 described above, respectively. The details of each part are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Subsequently, an information processing device according to an embodiment of this disclosure will be described. The information processing device is the second user terminal 200 in the information processing system 3000 described above, and corresponds to the second user terminal 200 of a second user who is the guest user described above.

Figure 71:
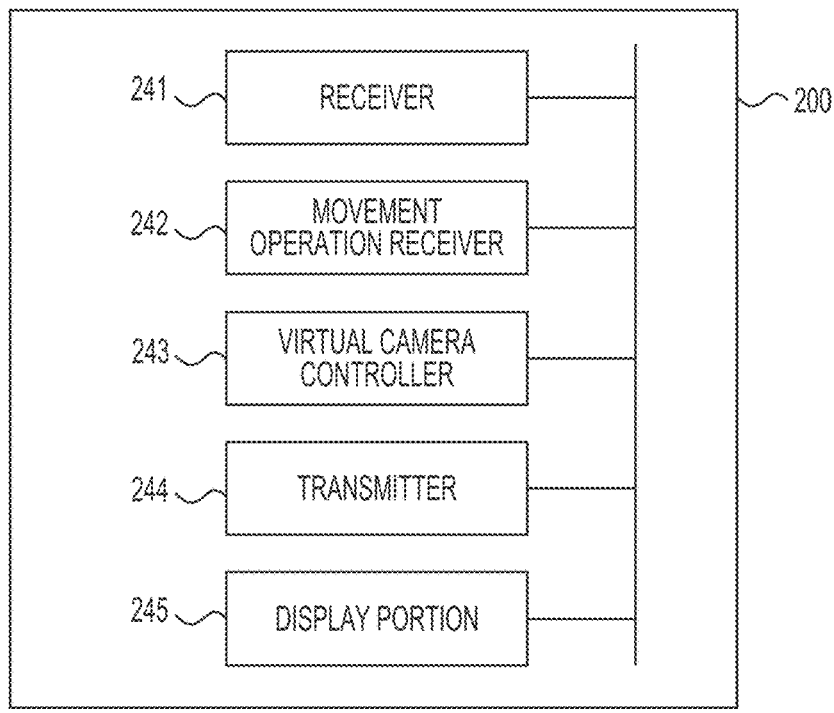
FIG. 71 is a configuration diagram showing an example of a functional configuration of the second user terminal in this disclosure.

As shown in FIG. 71, the information processing device includes a receiver 241, a movement operation receiver 242, a virtual camera controller 243, a transmitter 244, and a display portion 245.

The receiver 241 receives, from the server device 400, information about a video including a character object of a first user and a character object of a second user.

The movement operation receiver 242 accepts a movement operation of the character object of the second user in the virtual space.

The virtual camera controller 243 accepts a camera operation of the virtual camera that captures in the virtual space.

The transmitter 244 transmits, to the server device 400, information about the movement operation and the camera operation.

The display portion 245 displays the character object of the first user and the character object of the second user so as to be movable in the virtual space.

(i) A first movement operation is applied to the character object of the second user in response to a predetermined operation on a first operation UI displayed on the second user terminal 200 of the second user, (ii) a second movement operation is applied to the character object of the first user in response to a predetermined operation on a second operation UI displayed on the second user terminal 200, (iii) the viewpoint of the virtual camera is switched to the first-person or third-person viewpoint in response to a predetermined operation on a third operation UI displayed on the second user terminal 200, and (iv) virtual camera movement, rotation and/or scale operations are applied in response to predetermined operations on a region where the first operation UI, the second operation UI, and the third operation UI are not displayed on the second user terminal 200.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Subsequently, an information processing method in an embodiment of this disclosure will be described. The information processing method is an information processing method executed in the above-mentioned information processing device (second user terminal 200).

Figure 72:
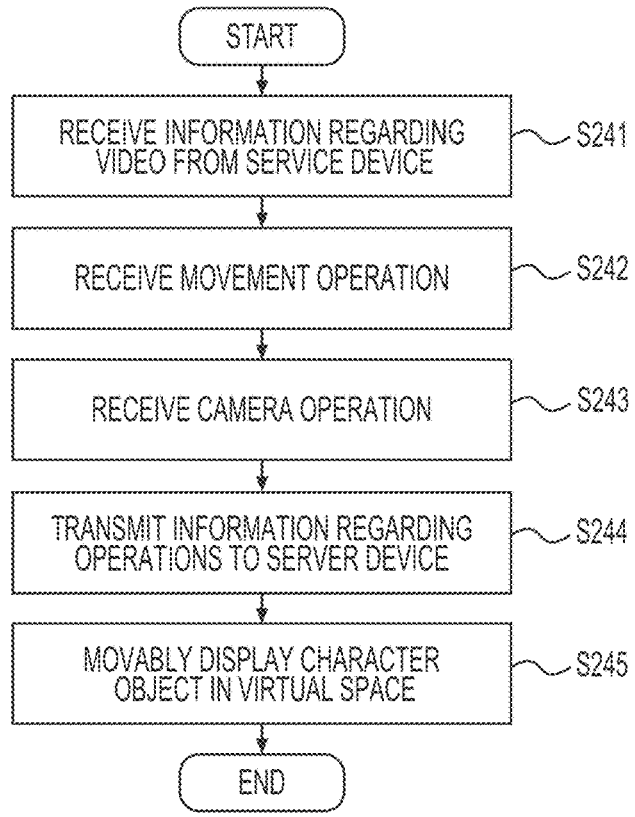
FIG. 72 is a flowchart showing an example of a flow of an information processing method in the second user terminal in this disclosure.

As shown in FIG. 72 as an example, an information processing method in this disclosure causes one or more computer processors provided with the information processing device to execute a receiving step S241, a movement operation reception step S242, a virtual camera control step (receive camera operation step) S243, a transmission step S244, and a display step S245.

The reception step S241 receives, from the server device 400, information about a video including a character object of a first user and a character object of a second user. The reception step S241 can be executed by the receiver 241 described above.

The movement operation reception step S242 accepts a movement operation of the character object of the second user in the virtual space. The movement operation reception step S242 can be executed by the movement operation receiver 242 described above.

The virtual camera control step S243 accepts a camera operation of a virtual camera that captures in the virtual space. The virtual camera control step S243 can be executed by the virtual camera controller 243 described above.

The transmission step S244 transmits, to the server device 400, information about the movement operation and the camera operation. The transmission step S244 can be executed by the transmitter 244 described above.

The display step S245 displays the character object of the first user and the character object of the second user so as to be movable in the virtual space. The display step S245 can be executed by the display portion 245 described above.

(i) A first movement operation is applied to the character object of the second user in response to a predetermined operation on a first operation UI displayed on the second user terminal 200 of a second user, (ii) a second movement operation is applied to the character object of the first user in response to a predetermined operation on a second operation UI displayed on the second user terminal 200, (iii)

the viewpoint of the virtual camera is switched to the first-person or third-person viewpoint in response to a predetermined operation on a third operation UI displayed on the second user terminal 200, and (iv) virtual camera movement, rotation and/or scale operations are applied in response to predetermined operations on a region where the first operation UI, the second operation UI, and the third operation UI are not displayed on the second user terminal 200.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

A computer program according to an embodiment of this disclosure will be described. The computer program is a computer program executed by the above-mentioned information processing device (second user terminal 200).

A computer program in this disclosure causes one or more processors provided with the information processing system to realize a receiving function, a movement operation reception function, a virtual camera control function, a transmission function, and a display function.

The receiving function receives, from the server device 400, information about a video including a character object of a first user and a character object of a second user.

The movement operation reception function accepts a movement operation of the character object of the second user in the virtual space.

The virtual camera control function accepts a camera operation of a virtual camera that captures in the virtual space.

The transmission function transmits, to the server device 400, information about the movement operation and the camera operation.

The display function displays the character object of the first user and the character object of the second user so as to be movable in the virtual space.

(i) A first movement operation is applied to the character object of the second user in response to a predetermined operation on a first operation UI displayed on the second user terminal 200 of the second user, (ii) a second movement operation is applied to the character object of the first user in response to a predetermined operation on a second operation UI displayed on the second user terminal 200, (iii) the viewpoint of the virtual camera is switched to the first-person or third-person viewpoint in response to a predetermined operation on a third operation UI displayed on the second user terminal 200, and (iv) virtual camera movement, rotation and/or scale operations are applied in response to predetermined operations on a region where the first operation UI, the second operation UI, and the third operation UI are not displayed on the second user terminal 200.

Figure 73:
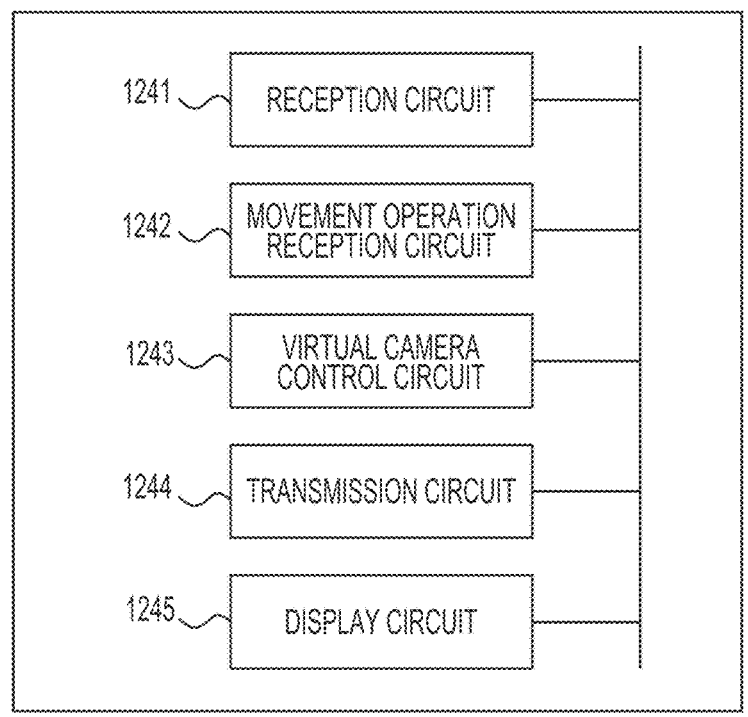
FIG. 73 is a circuit configuration diagram showing an example of a circuit configuration for realizing a computer program executed by the second user terminal in this disclosure.

The above functions can be realized by a reception circuit 1241, a movement operation reception circuit 1242, a virtual camera control circuit 1243, a transmission circuit 1244, and a display circuit 1245 that are shown in FIG. 73. The reception circuit 1241, the movement operation reception circuit 1242, the virtual camera control circuit 1243, the transmission circuit 1244, and the display circuit 1245 can be realized by the receiver 241, the movement operation receiver 242, the virtual camera controller 243, the transmitter 244, and the display portion, respectively. The details of each part are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Alternative configurations of this disclosure include the following.

Figure 74:
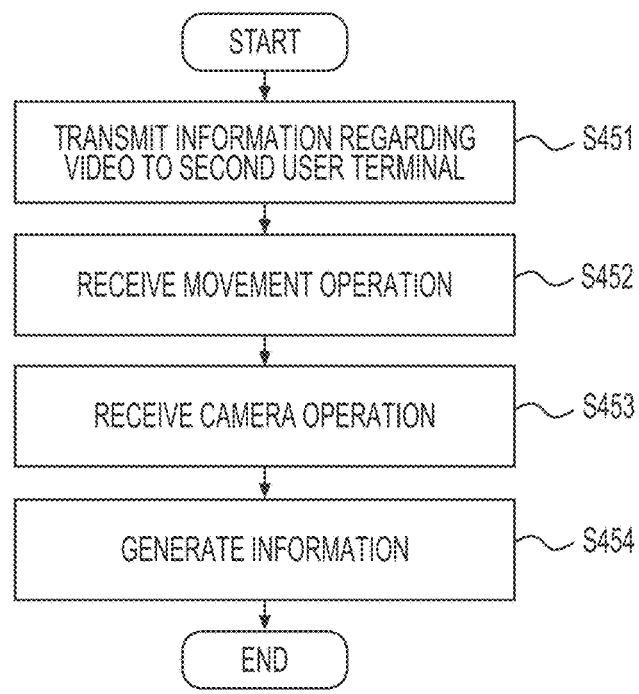
FIG. 74 is a flowchart showing an example of a flow of an information processing method in this disclosure.

As shown in FIG. 74 as an example, an information processing method in this disclosure causes one or more computer processors provided with the information processing system 3000 to execute a transmission step S451, a movement operation reception step S452, a virtual camera control step S453, and a video generation step S454.

The transmission step S451 transmits, to a second user terminal of a second user, information about a video including a character object of a first user. The transmission step S451 can be executed by the transmitter 151 described above.

The transmission step S451 may be executed at the server side (server device 400) or may be executed at the client side (first user terminal 100).

The movement operation reception step S452 accepts a movement operation of the character object of the first user in a virtual space. The movement operation reception step S452 can be executed by the movement operation receiver 152 described above.

The movement operation reception step S452 may be executed at the server side (server device 400) or may be executed at the client side (first user terminal 100).

The virtual camera control step S453 accepts a camera operation of a virtual camera that captures in the virtual space. The virtual camera control step S453 can be executed by the virtual camera controller 153 described above.

The virtual camera control step S453 may be executed at the server side (server device 400) or may be executed at the client side (first user terminal 100).

The video generation step S454 generates information for making the character object of the first user movable in the virtual space, based on the movement operation and the camera operation. The video generation step S454 can be executed by the video generator 154 described above.

The video generation step S454 may be executed at the server side (server device 400) or may be executed at the client side (first user terminal 100).

Then, in the video generation step S454, it is possible to generate information for displaying, in a video, a character object of one or more other users. In the transmission step S451, information about (i) a video of a first-person viewpoint or a third-person viewpoint of the character object of the first user, (ii) a video of the first-person viewpoint or the third-person viewpoint of the character object of one other user from among the one or more other users, or (iii) a plurality of videos of (a) the first-person viewpoint or the third-person viewpoint of the character object of the first user, and (b) the first-person viewpoint or the third-person viewpoint of the character object of another user, is transmitted to a second user terminal.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, a computer program according to an embodiment of this disclosure will be described.

As shown in FIG. 3, the computer program according to an embodiment of this disclosure is a computer program executed by the information processing system 3000 that distributes videos. The information processing system 3000 includes one or more first user terminals 100, second user terminals 200, and a server device 400.

A computer program in this disclosure causes one or more computer processors provided with the information processing system 3000 to realize a transmission function, a movement operation reception function, a virtual camera control function, and a video generation function.

The transmission function transmits, to the second user terminal of a second user, information about a video including a character object of a first user.

The movement operation reception function accepts a movement operation of the character object of the first user in a virtual space.

The virtual camera control function accepts a camera operation of a virtual camera that captures in the virtual space.

The video generation function generates information for making the character object of the first user movable in the virtual space, based on the movement operation and the camera operation.

Then, in the video generation function, it is possible to generate information for displaying, in the video, a character object of one or more other users. The transmission function transmits, to the second user terminal, information about (i) a video of a first-person viewpoint or a third-person viewpoint of the character object of the first user, (ii) a video of the first-person viewpoint or the third-person viewpoint of the character object of one other user from among the one or more other users, or (iii) a plurality of videos of (a) the first-person viewpoint or the third-person viewpoint of the character object of the first user, and (b) the first-person viewpoint or the third-person viewpoint of the character object of another user.

Figure 75:
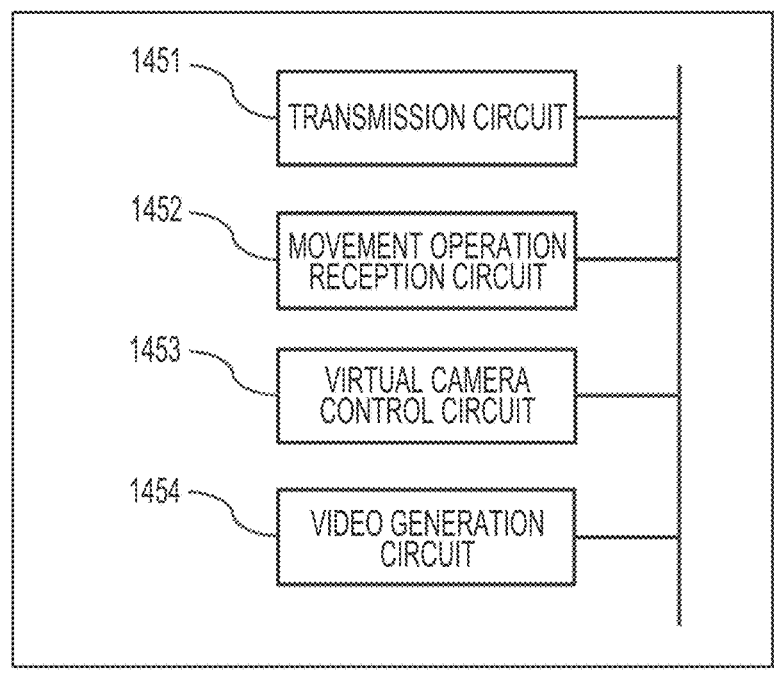
FIG. 75 is a circuit configuration diagram showing an example of a circuit configuration for realizing a computer program in this disclosure.

The above functions can be realized by a transmission circuit 1451, a movement operation reception circuit 1452, a virtual camera control circuit 1453, and a video generation circuit 1454 that are shown in FIG. 75. The transmission circuit 1451, the movement operation reception circuit 1452, the virtual camera control circuit 1453, and the video generation circuit 1454 are realized by the transmitter 151, the movement operation receiver 152, the virtual camera controller 153, and the video generator 154 described above, respectively. Details of each component are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing device according to an embodiment of this disclosure will be described. The information processing device corresponds to the first user terminal 100 in the above-mentioned information processing system 3000.

Figure 76:
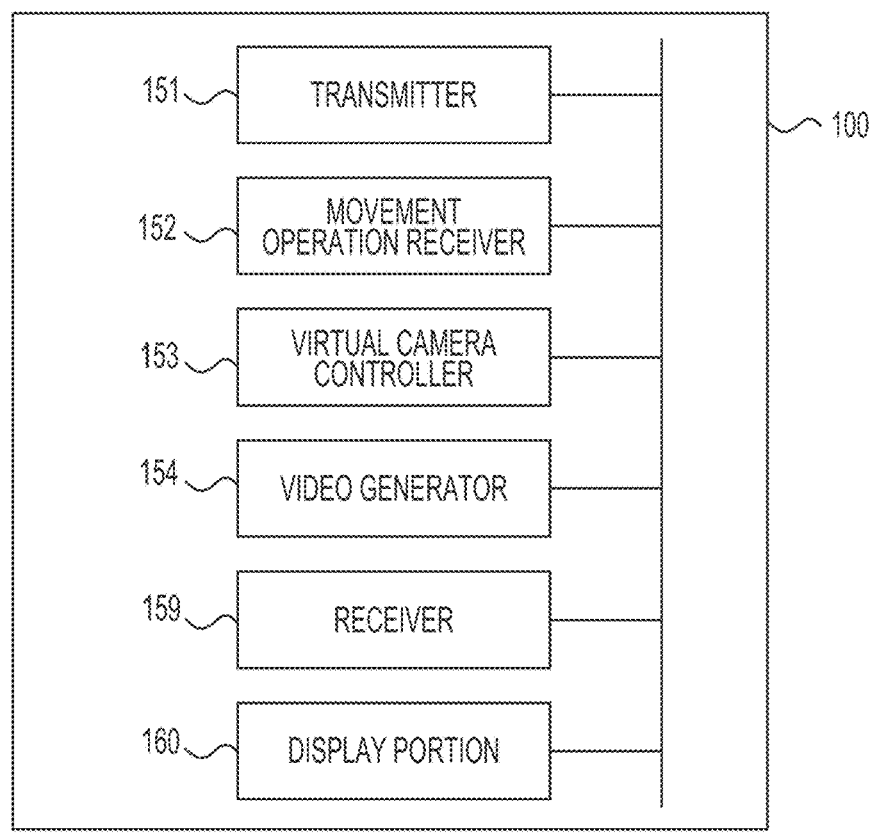
FIG. 76 is a configuration diagram showing an example of a functional configuration of the first user terminal in this disclosure.

As shown in FIG. 76, the information processing device is provided with a transmitter 151, a movement operation receiver 152, a virtual camera controller 153, a video generator 154, a receiver 159, and a display portion 160.

The transmitter 151 transmits, to the server device, information about a video including a character object of a first user. Details of the transmitter 151 are as described above.

The movement operation receiver 152 accepts a movement operation of the character object of the first user in a virtual space. Details of the transmitter 151 are as described above.

The virtual camera controller 153 accepts a camera operation of a virtual camera that captures in the virtual space. Details of the virtual camera controller 153 are as described above.

The video generator 154 generates information for making the character object of the first user movable in the virtual space, based on the movement operation and the camera operation. Details of the video generator 154 are as described above.

The receiver 159 receives, from the server device 400, information for displaying a character object of one or more other users in the video.

The display portion 160 displays (i) a video of a first-person viewpoint or a third-person viewpoint of the character object of the first user, (ii) a video of the first-person viewpoint or the third-person viewpoint of a character object of one other user from among the one or more other users, or (iii) a plurality of videos of (a) the first-person viewpoint or the third-person viewpoint of the character object of the first user, and (b) the first-person viewpoint or the third-person viewpoint of the character object of another user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing method in an embodiment of this disclosure will be described. The information processing method is an information processing method executed by the information processing device (first user terminal 100) described above.

Figure 77:
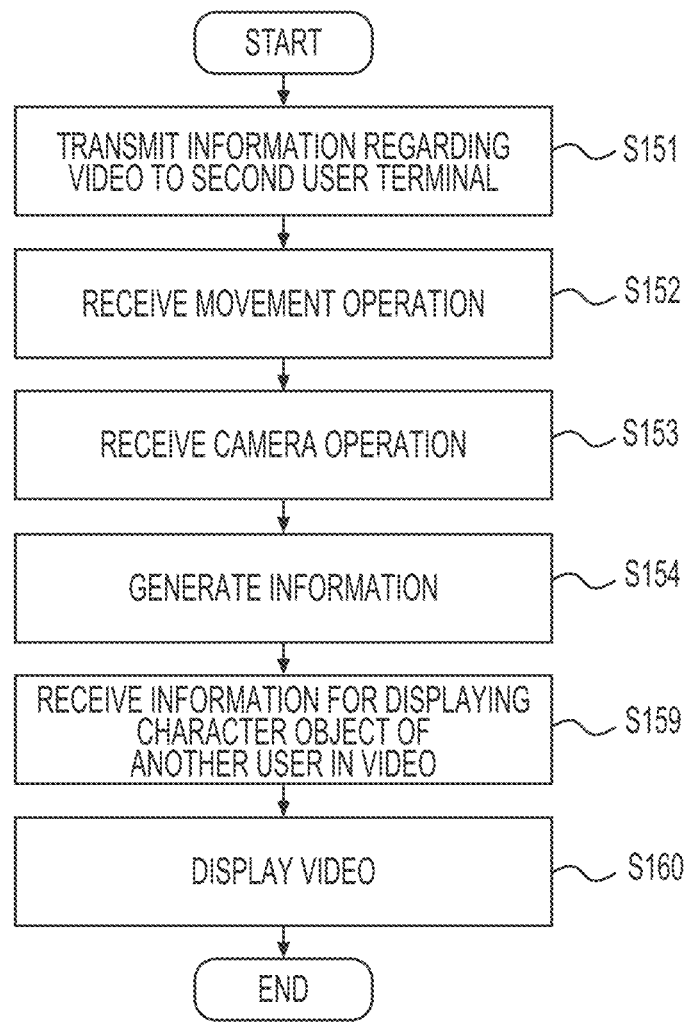
FIG. 77 is a flowchart showing an example of a flow of an information processing method in the first user terminal in this disclosure.

As shown in FIG. 77 as an example, an information processing method in this disclosure causes one or more computer processors provided with the information processing device to execute a transmission step S151, a movement operation reception step S152, a virtual camera control step S153, a video generation step S154, a reception step S159, and a display step S160.

The transmission step S151 transmits, to the server device, information about a video including a character object of a first user. The transmission step S151 can be executed by the transmitter 151 described above.

The movement operation reception step S152 accepts a movement operation of the character object of the first user in a virtual space. The movement operation reception step S152 can be executed by the movement operation receiver 152 described above.

The virtual camera control step S153 accepts a camera operation of a virtual camera that captures in the virtual space. The virtual camera control step S153 can be executed by the virtual camera controller 153 described above.

The video generation step S154 generates information for making the character object of the first user movable in the virtual space based on the movement operation and the camera operation. The video generation step S154 can be executed by the video generator 154 described above.

The reception step S159 receives information for causing a character object of one or more other users to be displayed in the video. The reception step S159 can be executed by the receiver 159 described above.

The display step S160 displays (i) a video of a first-person viewpoint or a third-person viewpoint of the character object of the first user, (ii) a video of the first-person viewpoint or the third-person viewpoint of the character object of one other user from among the one or more other users, or (iii) a plurality of videos of (a) the first-person viewpoint or the third-person viewpoint of the character object of the first user, and (b) the first-person viewpoint or the third-person viewpoint of the character object of another user. The display step S160 can be executed by the display portion 160 described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, a computer program according to an embodiment of this disclosure will be described. The computer program is a computer program executed by the information processing device (first user terminal 100) described above.

A computer program in this disclosure causes one or more processors provided with the information processing system to realize a transmission function, a movement operation reception function, a virtual camera control function, a video generation function, a reception function, and a display function.

The transmission function transmits, to a server device, information about a video including a character object of a first user.

The movement operation reception function accepts a movement operation of the character object of the first user in a virtual space.

The virtual camera control function accepts a camera operation of a virtual camera that captures in the virtual space.

The video generation function generates information for making the character object of the first user movable in the virtual space, based on the movement operation and the camera operation.

The reception function receives, from the server device, information for causing the character object of one or more other users to be displayed in the video.

The display function displays (i) a video of a first-person viewpoint or a third-person viewpoint of the character object of the first user, (ii) a video of the first-person viewpoint or the third-person viewpoint of the character object of one other user from among the one or more other users, or (iii) a plurality of videos of (a) the first-person viewpoint or the third-person viewpoint of the character object of the first user, and (b) the first-person viewpoint or the third-person viewpoint of the character object of another user.

Figure 78:
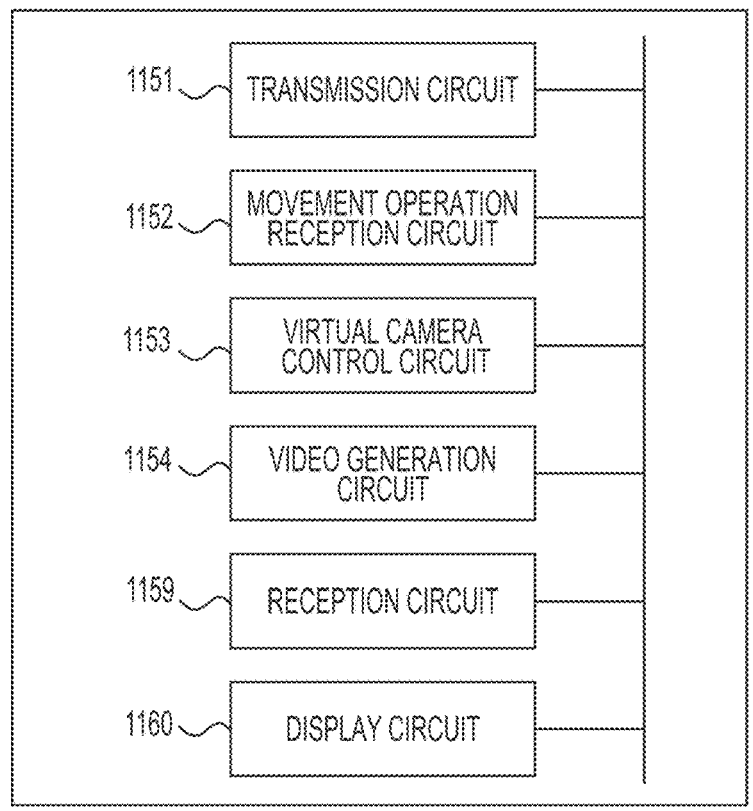
FIG. 78 is a circuit configuration diagram showing an example of a circuit configuration for realizing a computer program executed by the first user terminal in this disclosure.

The above functions can be realized by a transmission circuit 1151, a movement operation reception circuit 1152, a virtual camera control circuit 1153, a video generation circuit 1154, a reception circuit 1155, and a display circuit 1156 that are shown in FIG. 78. The transmission circuit 1151, the movement operation reception circuit 1152, the virtual camera control circuit 1153, the video generation circuit 1154, the reception circuit 1155, and the display circuit 1156 are realized by the transmitter 151, the movement operation receiver 152, the virtual camera controller 153, the video generator 154, the receiver 159, and the display portion 160 described above, respectively. Details of each component are as described above.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing device according to an embodiment of this disclosure will be described. The information processing device is the second user terminal 200 in the information processing system 3000 described above, and corresponds to the second user terminal 200 of a second user who is the guest user described above.

Figure 79:
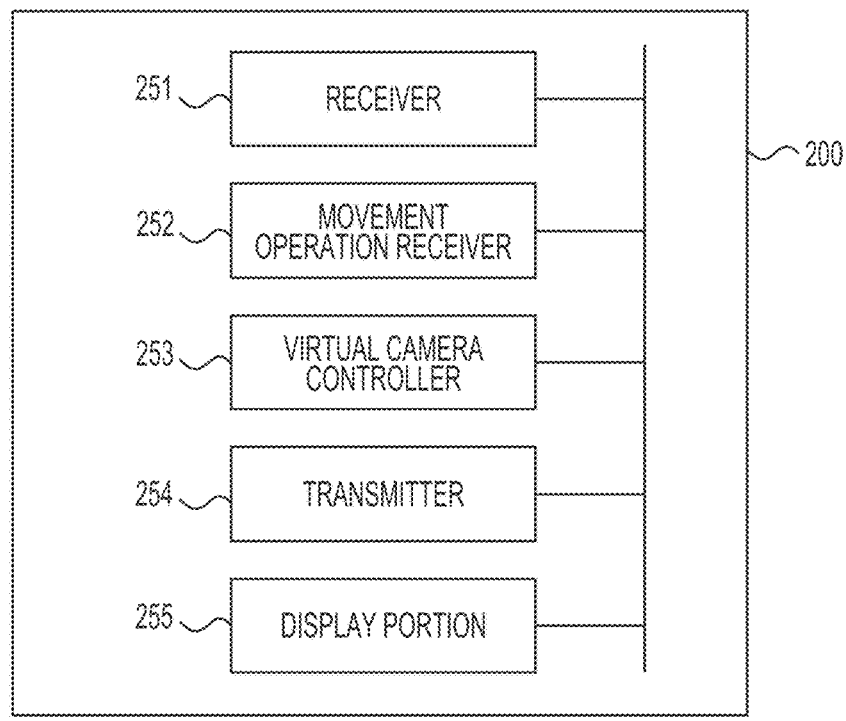
FIG. 79 is a configuration diagram showing an example of a functional configuration of a second user terminal in this disclosure.

As shown in FIG. 79, the information processing device includes a receiver 251, a movement operation receiver 252, a virtual camera controller 253, a transmitter 254, and a display portion 255.

The receiver 251 receives, from the server device, information about a video including a character object of a first user and a character object of a second user.

The movement operation receiver 252 accepts a movement operation of the character object of the second user in a virtual space.

The virtual camera controller 253 accepts a camera operation of a virtual camera that captures in the virtual space.

The transmitter 254 transmits, to a server device, information about the movement operation and the camera operation.

The display portion 255 displays the character object of the first user and the character object of the second user so as to be movable in the virtual space.

The display portion 255 displays (i) a video of a first-person viewpoint or a third-person viewpoint of the character object of the first user, (ii) a video of the first-person viewpoint or the third-person viewpoint of the character object of the second user, or (iii) a plurality of videos of (a) the first-person viewpoint or the third-person viewpoint of the character object of the first user, and (b) the first-person viewpoint or the third-person viewpoint of the character object of the second user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Next, an information processing method in an embodiment of this disclosure will be described. The information processing method is an information processing method executed by the information processing device (second user terminal 200) described above.

Figure 80:
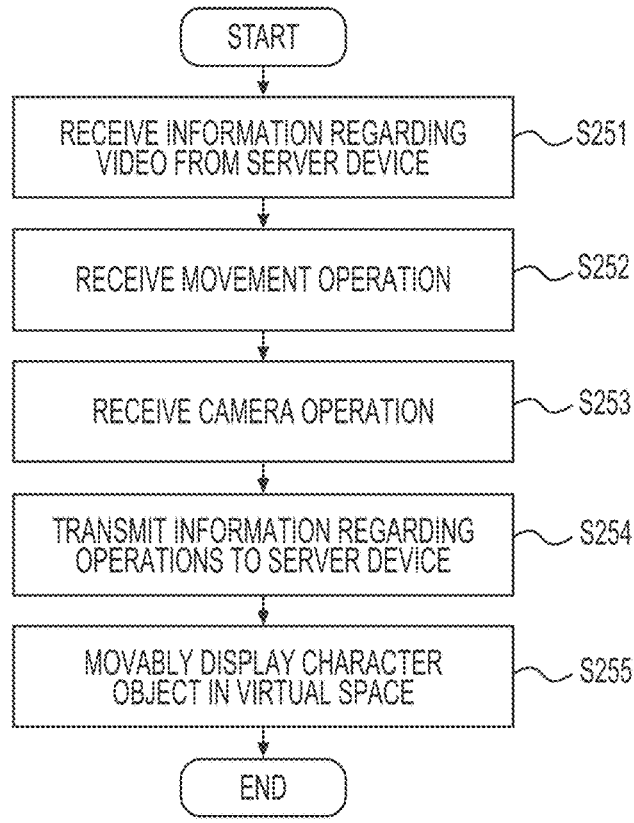
FIG. 80 is a flowchart showing an example of a flow of an information processing method in the second user terminal in this disclosure.

As shown in FIG. 80 as an example, an information processing method in this disclosure causes one or more computer processors provided with the information processing device to execute a reception step S251, a movement operation reception step S252, a virtual camera control step S253, a transmission step S254, and a display step S255.

The reception step S251 receives, from a server device, information about a video including a character object of a first user and a character object of a second user. The reception step S251 can be executed by the receiver 251 described above.

The movement operation reception step S252 accepts a movement operation of the character object of the second user in the virtual space. The movement operation reception step S252 can be executed by the movement operation receiver 252 described above.

The virtual camera control step S253 accepts a camera operation of a virtual camera that captures in the virtual space. The virtual camera control step S253 can be executed by the virtual camera controller 253 described above.

The transmission step S254 transmits, to the server device, information about the movement operation and the camera operation. The transmission step S254 can be executed by the transmitter 254 described above.

The display step S255 displays the character object of the first user and the character object of the second user so as to be movable in the virtual space. The display step S255 can be executed by the display portion 255 described above.

The display step S255 displays (i) a video of a first-person viewpoint or a third-person viewpoint of the character object of the first user, (ii) a video of the first-person viewpoint or the third-person viewpoint of the character object of the second user, or (iii) a plurality of videos of (a) the first-person viewpoint or the third-person viewpoint of the character object of the first user, and (b) the first-person viewpoint or the third-person viewpoint of the character object of the second user.

According to the above configuration, it is possible to provide a technical improvement that solves or alleviates at least part of the above-mentioned problems of the conventional technology. Specifically, according to the above configuration, it is possible to improve distributing users' distribution motivation, viewing users' viewing motivation, and/or users' motivation to interact with each other.

Finally, a computer program according to an embodiment of this disclosure will be described. The computer program is a computer program executed by the information processing device (second user terminal 200) described above.

A computer program in this disclosure causes one or more processors provided with the information processing system to realize a reception function, a movement operation reception function, a virtual camera control function, a transmission function, and a display function.

The reception function receives, from a server device, information about a video including a character object of a first user and a character object of a second user.

The movement operation reception function accepts the movement operation of the character object of the second user in the virtual space.

The virtual camera control function accepts the camera operation of a virtual camera that captures in the virtual space.

The transmission function transmits, to the server device, information about the movement operation and the camera operation.

The display function displays the character object of the first user and the character object of the second user so as to be movable in the virtual space.

The display function displays (i) a video of a first-person viewpoint or a third-person viewpoint of the character object of the first user, (ii) a video of the first-person viewpoint or the third-person viewpoint of the character object of the second user, or (iii) a plurality of videos of (a) the first-person viewpoint or the third-person viewpoint of the character object of the first user, and (b) the first-person viewpoint or the third-person viewpoint of the character object of the second user.

Figure 81:
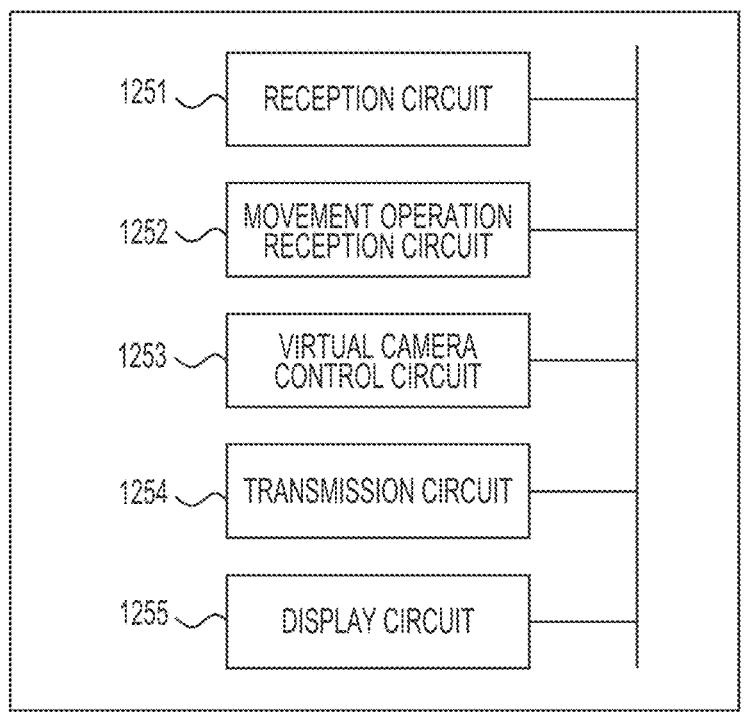
FIG. 81 is a circuit configuration diagram showing an example of a circuit configuration for realizing a computer program executed by the second user terminal in this disclosure.

The above functions can be realized by a reception circuit 1251, a movement operation reception circuit 1252, a virtual camera control circuit 1253, a transmission circuit 1254, and a display circuit 1255 that are shown in FIG. 81. The reception circuit 1251, the movement operation reception circuit 1252, the virtual camera control circuit 1253, the transmission circuit 1254, and the display circuit 1255 are realized by the receiver 251, the movement operation receiver 252, the virtual camera controller 253, the transmitter 254, and the display portion 255 described above, respectively. Details of each component are as described above.

In order to function as the server device or terminal device according to the above-described embodiments, an information processing device such as a computer or a cell phone can be preferably used. Such an information processing device can be realized by (i) storing a program describing the processing content that realizes each function of the server device or the terminal device according to the embodiment in the storage portion of an information processing device, and (ii) reading and executing the program by the CPU of the information processing device.

Although some embodiments have been described, these embodiments are presented by way of example only and are not intended to limit the scope of the disclosure. These novel embodiments can be implemented in various other forms, and various omissions, substitutions, and modifications can be made without departing from the content of the disclosure. These embodiments and variations thereof are included in the scope and content of the disclosure as well as in the scope of the claims and their equivalents.

Additionally, the methods described in the embodiments can be stored on a recording medium, for example, a magnetic disk (a floppy (registered trademark) disk, a hard disk, or the like), an optical disk (CD-ROM, DVD, MO, or the like), a semiconductor memory (ROM, RAM, flash memory, or the like), or the like, as programs that can be executed by a computer, or can be transmitted and distributed by a communication medium. A program stored on the medium side also includes a setting program for configuring software means (including not only an execution program, but also a table and a data structure) to be executed by the computer. A computer that realizes this device reads a program recorded on a recording medium, constructs software means by a setting program in some cases, and executes the above-mentioned processing by controlling the operation by the software means. The recording medium referred to in this specification is not limited to recording media for distribution, and includes storage media such as a magnetic disk and a semiconductor memory provided in devices connected inside a computer or via a network. Also, for example, it may function as a main storage device, an auxiliary storage device, or a cache memory.

All objects transmitted or received in the information processing system in this disclosure, such as the above-mentioned "gifts" and "comments", are electronic "data."

The above [Summary] section is provided to introduce the various selected concepts in a simplified form. These various concepts are described afterward in the "Mode to Implement Embodiments" section. All trademarks used in this specification are the property of the owners of these trademarks. The descriptions in this [Summary] section are not intended to identify the important or indispensable features of the disclosure described in the scope of the claims, and are not intended to limit the technical scope of the disclosure described in the scope of the claims.

The above or other objects, features, and effects of the disclosure as described in the scope of the claims will become more apparent from the description in the "Mode to Implement Embodiments" section shown with reference to the attached drawings.

A communication line for realizing the above-mentioned network may include, but is not limited to, a mobile network, a wireless network (for example, RF connection via Bluetooth, Wi-Fi (such as IEEE 802.11a/b/n), WiMax, cellular, satellite, laser, or infrared), a fixed telephone network, the Internet, an intranet, a Local Area Network (LAN), a Wide Area Network (WAN) and/or an Ethernet network.

The above-mentioned memory may include, but is not limited to, a computer-readable medium, such as a volatile memory (for example, register, cache, random access memory (RAM)), non-volatile memory (for example, read-only memory (ROM), EEPROM, flash memory), or a storage (for example, a hard disk drive (HDD), a solid state drive (SSD), a magnetic tape, an optical medium). As is easily understood, the term "computer-readable recording medium" may include a medium for data storage such as a memory and a storage rather than a transmission medium, such as a modulated data signal, that is, a transient signal.

This specification is described in the sense of various representative embodiments that are not intended to be limited in any way. As used in this application, "one", "said", "above-described", "corresponding", "the", "this", "that" can include the plural unless explicitly indicated that it is not the plural. Additionally, the term "include" may mean "to have" or "to be provided with." Furthermore, the terms "have been combined", "combined", "have been tied", "tied", "have been connected", or "connected" include mechanical, electrical, magnetic and optical methods of combining, connecting, or tying objects to each other, along with other methods and do not exclude the presence of intermediate elements between objects thus "having been combined," "combined," having been tied," "tied," "having been connected," or "connected."

The various systems, methods and devices described in this specification should not be construed as being limited in any way. In fact, this disclosure is directed to any novel features and aspects of each of the various embodiments disclosed, of combinations of these various embodiments with each other, and of combinations of portions of these various embodiments with each other. The various systems, methods and devices described in this specification are not limited to any particular state, any particular feature, or any combination of such particular state and particular feature. The objects and methods described in this specification do not require that one or more specified effects exist or that the problem be resolved. Furthermore, various features or embodiments of the various embodiments described in this specification, or some of such features or embodiments, may be used in combination with each other.

The operation of some of the various methods disclosed in this specification is described, for convenience, in a particular order. It should be understood that the description in such a manner encompasses rearranging the order of the above-described operation unless the particular order is required by the following particular text. For example, a plurality of sequentially described operations may be rearranged or executed simultaneously in some cases. Further, for the purpose of simplification, the attached drawings do not show the various methods by which the various items and methods described in this specification may be used in conjunction with other items and methods. Additionally, this specification may use "generate," "produce," "display," "receive," "evaluate," and "distribute." These terms are high-level descriptions of the various actual operations executed. The various actual operations corresponding to these terms may vary depending on the specific implementation and may be readily recognized by those of skill in the art who have the benefit of the disclosure of this specification.

The operation theories, scientific principles, or other theoretical statements presented in this specification in connection with the devices or methods of this disclosure are provided for the purpose of better understanding and are not intended to limit the technical scope. The devices and methods within the attached scope of the claims are not limited to the devices and methods that operate by the methods described by such a theory of operation.

Any of the various methods disclosed in this specification are implemented using a plurality of computer-executable commands stored on one or more computer-readable media (for example, a non-transient computer readable storage medium, such as one or more optical media disks, a plurality of volatile memory components, or a plurality of non-volatile memory components) and can be further executed on a computer. Here, the plurality of volatile memory components include, for example, DRAM or SRAM. Further, the plurality of non-volatile memory components include, for example, a hard drive and a solid state drive (SSD). Additionally, the above computer may include any computer available on the market, including, for example, a smartphone and other mobile devices having hardware that performs calculations.

Any of a plurality of computer-executable commands for implementing the technology disclosed in this specification can be stored any of such on one or more computer-readable media (for example, a non-transient computer readable recording medium), along with any data generated and used in the implementation of the various embodiments disclosed in this specification. A plurality of commands that can be executed by such a computer, for example, may be part of a separate software application, or may be part of a software application that is accessed or downloaded via a web browser or other software application (such as a remote computing application). Such software can be run, for example, on a single local computer (for example, as an agent running on any other desired, suitable computer available on the market) or in a network environment (for example, the Internet, a wide area network, a local area network, a client-server network (such as cloud computing networks), or other such networks) using one or more network computers.

For clarity, only certain selected different aspects of the various software-based implementations are described. Other details well known in the art are omitted. For example, the technology disclosed in this specification is not limited to a particular computer language or program. For example, the technology disclosed in this specification can be executed by software written in C, C++, Java, or any other desired, suitable programming language. Similarly, the technology disclosed in this specification is not limited to a particular computer or a particular type of hardware. Specific details of suitable computers and hardware are well known and need not be described in detail in this specification.

Furthermore, any of the various embodiments based on such software (for example, including a plurality of commands that can be executed by a computer to cause the computer to execute any of the various methods disclosed in this specification) may be uploaded, downloaded, or accessed remotely by suitable communication means. Such suitable means of communication include, for example, the Internet, the World Wide Web, an intranet, a software application, a cable (including a fiber optic cable), magnetic communication, electromagnetic communication (including RF communication, microwave communication, and infrared communication), electronic communication, or other such means of communication.

EXPLANATION OF SYMBOLS

1000 Information processing system
2000 Information processing system
3000 Information processing system
100 First user terminal
200 Second user terminal
300 Network
400 Server device

The invention claimed is:

1. An information processing system comprising:
one or more computer processors functioning as:
   a transmitter that transmits, to a second user terminal of a second user, information about a video including a character object of a first user;
   a movement operation receiver that accepts a movement operation of the character object of the first user in a virtual space;
   a virtual camera controller that accepts an operation of a virtual camera that captures images in the virtual space; and
   a video generator that, based on the movement operation and the operation of the virtual camera, generates information about a video of the character object of the first user moving within the virtual space, wherein
the virtual camera controller accepts the operation of the virtual camera from a user authorized by the first user, and
the operation of the virtual camera is a user operation different from the movement operation, and wherein
the one or more computer processors
   apply a first movement operation to the character object of the first user in response to a predetermined operation with respect to a first operation UI displayed at a first user terminal of the first user,
   apply a second movement operation to the character object of the first user in response to a predetermined operation with respect to a second operation UI displayed at the first user terminal,
   switch a viewpoint of the virtual camera to a first-person viewpoint or a third-person viewpoint in response to a predetermined operation with respect to a third operation UI displayed at the first user terminal, and
   apply a movement operation, a rotation operation and/or a scale operation of the virtual camera in response to a predetermined operation with respect to a region where the first operation UI, the second operation UI, and the third operation UI are not displayed, at the first user terminal.

2. The information processing system according to claim 1, wherein
the one or more computer processors switch whether or not to display a comment on the video displayed on the first user terminal of the first user in response to a predetermined operation with respect to the first user terminal.

3. The information processing system according to claim 1, wherein
the one or more computer processors switch whether or not to display a comment on the video displayed on the first user terminal in response to a predetermined operation with respect to the first user terminal, and
when the one or more computer processors switch whether or not to display the comment on the video, the one or more computer processors change display positions of the first operation UI and the second operation UI, or place the first operation UI, the second operation UI and the third operation UI in a non-display state.

4. The information processing system according to claim 1, wherein
the first movement operation is a horizontal movement, and the second movement operation is a vertical movement.

5. The information processing system according to claim 1, wherein the one or more computer processors
   apply a rotation operation to the virtual camera in response to a one-finger swipe operation with respect to the region,
   apply a movement operation to the virtual camera in response to a two-finger swipe operation with respect to the region, and
   apply a scale operation to the virtual camera in response to a two-finger pinch-in/pinch-out operation with respect to the region.

6. The information processing system according to claim 1, wherein
a movement of a face of the character object of the first user is generated based on a movement of a face of the first user captured by a front camera of the first user terminal of the first user, and
the video generator generates the movement of the face of the character object of the first user in an inverted state or a non-inverted state according to a positional relationship between the character object of the first user and the virtual camera.

7. The information processing system according to claim 1, wherein
when the character object of the first user moves beyond a movable region, the video generator causes the character object to reappear from another position in the virtual space.

8. An information processing method by one or more computer processors, the method comprising:
transmitting, to a second user terminal of a second user, information about a video including a character object of a first user;
accepting a movement operation of the character object of the first user in a virtual space;
accepting an operation of a virtual camera that captures images in the virtual space; and
based on the movement operation and the operation of the virtual camera, generating information about a video of the character object of the first user moving within the virtual space, wherein
the operation of the virtual camera is accepted from a user authorized by the first user, and
the operation of the virtual camera is a user operation different from the movement operation, and wherein
a first movement operation is applied to the character object of the first user in response to a predetermined operation with respect to a first operation UI displayed at a first user terminal of the first user,
a second movement operation is applied to the character object of the first user in response to a predetermined operation with respect to a second operation UI displayed at the first user terminal, a viewpoint of the virtual camera is switched to a first-person viewpoint or a third-person viewpoint in response to a predetermined operation with respect to a third operation UI displayed at the first user terminal, and a movement operation, a rotation operation and/or a scale operation of the virtual camera is applied in response to a predetermined operation with respect to a region where the first operation UI, the second operation UI, and the third operation UI are not displayed, at the first user terminal.

9. An information processing method by one or more computer processors, the method comprising:

transmitting, to a server, information about a video including a character object of a first user;

accepting a movement operation of the character object of the first user in a virtual space;

accepting an operation of a virtual camera that captures images in the virtual space; and based on the movement operation and the operation of the virtual camera, generating information about a video of the character object of the first user moving within the virtual space, wherein the operation of the virtual camera is accepted from a user authorized by the first user, and the operation of the virtual camera is a user operation different from the movement operation, and wherein a first movement operation is applied to the character object of the first user in response to a predetermined operation with respect to a first operation UI displayed at a first user terminal of the first user, a second movement operation is applied to the character object of the first user in response to a predetermined operation with respect to a second operation UI displayed at the first user terminal, a viewpoint of the virtual camera is switched to a first-person viewpoint or a third-person viewpoint in response to a predetermined operation with respect to a third operation UI displayed at the first user terminal, and a movement operation, a rotation operation and/or a scale operation of the virtual camera is applied in response to a predetermined operation with respect to a region where the first operation UI, the second operation UI, and the third operation UI are not displayed, at the first user terminal.

10. A nontransitory computer-readable medium storing thereon a program that causes one or more computer processors to execute:

transmitting, to a server, information about a video including a character object of a first user;

accepting a movement operation of the character object of the first user in a virtual space;

accepting an operation of a virtual camera that captures images in the virtual space; and based on the movement operation and the operation of the virtual camera, generating information about a video of the character object of the first user moving within the virtual space, wherein the operation of the virtual camera is accepted from a user authorized by the first user, and the operation of the virtual camera is a user operation different from the movement operation, and wherein a first movement operation is applied to the character object of the first user in response to a predetermined operation with respect to a first operation UI displayed at a first user terminal of the first user, a second movement operation is applied to the character object of the first user in response to a predetermined operation with respect to a second operation UI displayed at the first user terminal, a viewpoint of the virtual camera is switched to a first-person viewpoint or a third-person viewpoint in response to a predetermined operation with respect to a third operation UI displayed at the first user terminal, and a movement operation, a rotation operation and/or a scale operation of the virtual camera is applied in response to a predetermined operation with respect to a region where the first operation UI, the second operation UI, and the third operation UI are not displayed, at the first user terminal.

11. An information processing method by one or more computer processors, the method comprising:

receiving, from a server, information about a video including a character object of a first user and a character object of a second user;

accepting a movement operation of the character object of the second user in a virtual space;

accepting an operation of a virtual camera that captures images in the virtual space;

transmitting, to the server, information about the movement operation and the operation of the virtual camera; and displaying the character object of the first user and the character object of the second user as movable within the virtual space, wherein the operation of the virtual camera is accepted from a user authorized by the first user, and the operation of the virtual camera is a user operation different from the movement operation, and wherein a first movement operation is applied to the character object of the first user in response to a predetermined operation with respect to a first operation UI displayed at a first user terminal of the first user, a second movement operation is applied to the character object of the first user in response to a predetermined operation with respect to a second operation UI displayed at the first user terminal, a viewpoint of the virtual camera is switched to a first-person viewpoint or a third-person viewpoint in response to a predetermined operation with respect to a third operation UI displayed at the first user terminal, and a movement operation, a rotation operation and/or a scale operation of the virtual camera is applied in response to a predetermined operation with respect to a region where the first operation UI, the second operation UI, and the third operation UI are not displayed, at the first user terminal.

12. A nontransitory computer-readable medium storing thereon a program that causes one or more computer processors to execute:

receiving, from a server, information about a video including a character object of a first user and a character object of a second user;

accepting a movement operation of the character object of the second user in a virtual space;

accepting an operation of a virtual camera that captures images in the virtual space;

transmitting, to the server, information about the movement operation and the operation of the virtual camera; and displaying the character object of the first user and the character object of the second user as movable within the virtual space, wherein the operation of the virtual camera is accepted from a user authorized by the first user, and the operation of the virtual camera is a user operation different from the movement operation, and wherein a first movement operation is applied to the character object of the first user in response to a predetermined operation with respect to a first operation UI displayed at a first user terminal of the first user, a second movement operation is applied to the character object of the first user in response to a predetermined operation with respect to a second operation UI displayed at the first user terminal, a viewpoint of the virtual camera is switched to a first-person viewpoint or a third-person viewpoint in response to a predetermined operation with respect to a third operation UI displayed at the first user terminal, and a movement operation, a rotation operation and/or a scale operation of the virtual camera is applied in response to a predetermined operation with respect to a region where the first operation UI, the second operation UI, and the third operation UI are not displayed, at the first user terminal.

* * * * *